(12) United States Patent
Park et al.

(10) Patent No.: US 11,496,244 B2
(45) Date of Patent: Nov. 8, 2022

(54) METHOD AND APPARATUS FOR TRANSMITTING PPDU IN BROADBAND HAVING PREAMBLE PUNCTURING PERFORMED IN WIRELESS LAN SYSTEM

(71) Applicant: LG ELECTRONICS INC., Seoul (KR)

(72) Inventors: Eunsung Park, Seoul (KR); Jinmin Kim, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/264,259

(22) PCT Filed: Aug. 26, 2019

(86) PCT No.: PCT/KR2019/010823
§ 371 (c)(1),
(2) Date: Jan. 28, 2021

(87) PCT Pub. No.: WO2020/040622
PCT Pub. Date: Feb. 27, 2020

(65) Prior Publication Data
US 2021/0250125 A1 Aug. 12, 2021

(30) Foreign Application Priority Data
Aug. 24, 2018 (KR) .................. 10-2018-0099506
Sep. 5, 2018 (KR) .................. 10-2018-0106203

(51) Int. Cl.
*H04L 1/00* (2006.01)
*H04L 27/26* (2006.01)
(Continued)

(52) U.S. Cl.
CPC .......... *H04L 1/0068* (2013.01); *H04L 1/0061* (2013.01); *H04L 27/2614* (2013.01); *H04L 27/3872* (2013.01); *H04W 84/12* (2013.01)

(58) Field of Classification Search
None
See application file for complete search history.

(56) References Cited

U.S. PATENT DOCUMENTS

2012/0051454 A1* 3/2012 Zheng ............... H04L 27/20
375/295
2016/0087766 A1 3/2016 Sun et al.
(Continued)

FOREIGN PATENT DOCUMENTS

KR 1020180016603 2/2018

OTHER PUBLICATIONS

PCT International Application No. PCT/KR2019/010823, International Search Report dated Jan. 3, 2020, 4 pages.
(Continued)

*Primary Examiner* — Diane L Lo
(74) *Attorney, Agent, or Firm* — Lee Hong Degerman Kang & Waimey

(57) ABSTRACT

A method and apparatus for transmitting PPDU in a wireless LAN system are proposed. Specifically, a transmitter generates the PPDU, and transmits the PPDU to a receiver through a 320 MHz band in which some bands are punctured. The PPDU includes a legacy preamble and an EHT field. The legacy preamble includes L-STF and L-LTF. The legacy preamble is generated by applying a first phase rotation value or a second phase rotation value. The first phase rotation value is obtained on the basis of a third phase rotation value and a fourth phase rotation value. The third phase rotation value is a phase rotation value having repeated a phase rotation value defined for an 80 MHz band
(Continued)

in an 802.11ax system. The fourth phase rotation value is a phase rotation value defined in units of the 80 MHz band in the 320 MHZ band on the basis of an optimal PAPR of the L-LTF.

13 Claims, 20 Drawing Sheets

(51) Int. Cl.
*H04L 27/38* (2006.01)
*H04W 84/12* (2009.01)

(56) References Cited

U.S. PATENT DOCUMENTS

2016/0286551 A1\* 9/2016 Lee .................. H04L 25/00
2017/0288745 A1  10/2017 Seok
2019/0199491 A1\* 6/2019 Verma ............... H04L 5/0032
2019/0289612 A1\* 9/2019 Chen ................ H04L 27/2614

OTHER PUBLICATIONS

Choi et al., "View on EHT Objectives and Technologies", IEEE 802.11-18/1171r0, Jul. 8, 2018, 13 pages.
Noh et al., "Gamma Phase Rotation for HE PPDU", IEEE 802.11-16/0903r1, Jul. 25, 2016, 26 pages.

\* cited by examiner

FIG. 2

| L-LTF | L-STF | L-SIG | Data |

PPDU Format (IEEE 802.11a/g)

| L-LTF | L-STF | L-SIG | SIG A | HT-SFT | HT-LFT | ... | HT-LFT | Data |

HT PPDU Format (IEEE 802.11n)

| L-LTF | L-STF | L-SIG | VHT-SIG A | VHT-SFT | VHT-LFT | VHT-SIG B | Data |

VHT PPDU Format (IEEE 802.11ac)

METHOD AND APPARATUS FOR TRANSMITTING PPDU IN BROADBAND HAVING PREAMBLE PUNCTURING PERFORMED IN WIRELESS LAN SYSTEM

CROSS-REFERENCE TO RELATED APPLICATIONS

This application is the National Stage filing under 35 U.S.C. 371 of International Application No. PCT/KR2019/010823, filed on Aug. 26, 2019, which claims the benefit of earlier filing date and right of priority to Korean Patent Application Nos. 10-2018-0099506, filed on Aug. 24, 2018 and 10-2018-0106203, filed on Sep. 5, 2018, the contents of which are all hereby incorporated by reference herein in their entirety.

BACKGROUND OF THE DISCLOSURE

Field of the Disclosure

This specification relates to a scheme for transmitting a PPDU in a WLAN system and, more particularly, to a method and apparatus for setting a phase rotation value applied to a legacy preamble for an optimized PAPR when a PPDU is transmitted through a wideband on which preamble puncturing has been performed in a WLAN system.

Related Art

A discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments, such as an environment in which an interference source exists, a dense heterogeneous network environment, and an environment in which a high user load exists, and the like.

An environment chiefly considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

Specifically, scenarios, such as wireless office, smart home, stadium, Hotspot, and building/apartment, are basically concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

This specification proposes a method and apparatus for transmitting a PPDU in a WLAN system.

An example of this specification proposes a method of transmitting a PPDU.

The present embodiment may be performed in a network environment in which a next-generation WLAN system is supported. The next-generation WLAN system is an improved WLAN system of an 802.11ax system, and may satisfy backward compatibility with the 802.11ax system. The next-generation WLAN system may correspond to an extreme high throughput (EHT) WLAN system or an 802.11be WLAN system.

The present embodiment is performed in a transmission apparatus, and the transmission apparatus may correspond to an AP. A reception apparatus may correspond to a (non-AP STA) STA.

The present embodiment relates to a method and apparatus for setting a phase rotation value applied to a legacy preamble for an optimized PAPR if a PPDU is transmitted through an 80, 160, 240, or 320 MHz band and preamble puncturing introduced from 11ax is applied to the band. In this case, only the 320 MHz band is limited and described.

The transmission apparatus generates the physical protocol data unit (PPDU).

The transmission apparatus transmits the PPDU to the reception apparatus through the 320 MHz band having some band punctured.

The PPDU includes a legacy preamble and an extreme high throughput (EHT) field. The legacy preamble includes a legacy-short training field (L-STF) and a legacy-long training field (L-LTF). Furthermore, the legacy preamble may further include a legacy-signal (L-SIG). The EHT field may include an EHT-SIG, an EHT-STF, an EHT-LTF, and a data field. The legacy field is a field supported by a WLAN system prior to 802.11be. The EHT field may be a field supported by an 802.11be WLAN system.

The legacy preamble is generated by applying a first phase rotation value or a second phase rotation value. That is, one of the first phase rotation value or the second phase rotation value may be applied to all the fields included in the legacy preamble in Common. The first phase rotation value is a phase rotation value defined for an optimal PAPR of the L-LTF. The second phase rotation value is a phase rotation value defined for an optimal PAPR of the L-STF. For example, if the PAPR of the L-LTF is great, in order to minimize the PAPR, the first phase rotation value may be applied to the legacy preamble. If the PAPR of the L-STF is great, in order to minimize the PAPR, the second phase rotation value may be applied to the legacy preamble.

The first phase rotation value is obtained based on a third phase rotation value and a fourth phase rotation value.

The third phase rotation value is a phase rotation value obtained by repeating a phase rotation value defined for an 80 MHz band in an 802.11ax system. Since the PPDU is transmitted through the 320 MHz band, the third phase rotation value may be obtained by optimizing a PAPR in the L-LTF and repeating the phase rotation value of the 80 MHz band applied in units of a 20 MHz band four times. If the PPDU is transmitted through the 160 MHz band, the third phase rotation value may be obtained by repeating the phase rotation value of the 80 MHz band (the PAPR is optimized in the L-LTF and the phase rotation value is applied in units of the 20 MHz band). If the PPDU is transmitted through the 240 MHz band, the third phase rotation value may be obtained by repeating the phase rotation value (the PAPR is optimized in the L-LTF and the phase rotation value is applied in in units of the 20 MHz band) three times.

The fourth phase rotation value is a phase rotation value defined in units of an 80 MHz band in the 320 MHz band based on an optimal PAPR of the L-LTF. The 320 MHz band may be divided into four 80 MHz bands. The fourth phase rotation value may be defined for each of the four 80 MHz bands. If the PPDU is transmitted through the 160 MHz band, the fourth phase rotation value may be defined for each of the two 80 MHz bands based on the optimal PAPR of the L-LTF. If the PPDU is transmitted through the 240 MHz band, the fourth phase rotation value may be defined for each of the three 80 MHz bands based on the optimal PAPR of the L-LTF.

That is, the present embodiment proposes a method of additionally performing a phase rotation (the fourth phase rotation value is applied in the L-LTF, and the fifth phase rotation value is applied in the L-STF) in each 80 MHz unit in a full band, while applying a phase rotation value defined in the 80 MHz band (the third phase rotation value is applied).

Hereinafter, a subcarrier range to which a phase rotation value is applied is described.

The 320 MHz band may be composed of subcarriers having subcarrier indices from −512 to 511.

The third phase rotation value may be [1 −1 −1 −1 1 −1 −1 −1 1 −1 −1 −1 1 −1 −1 −1] The reason for this is that the phase rotation value [1 −1 −1 −1] of the 80 MHz band defined in the 802.11ax system has been repeated four times.

The first 1 of the third phase rotation value may be applied to subcarriers having subcarrier indices from −512 to −449, the second −1 of the third phase rotation value may be applied to subcarriers having subcarrier indices from −448 to −385, the third −1 of the third phase rotation value may be applied to subcarriers having subcarrier indices from −384 to −321, the fourth −1 of the third phase rotation value may be applied to subcarriers having subcarrier indices from −320 to −257. That is, [1 −1 −1 −1], that is, the first to fourth values of the third phase rotation value, may be applied to the first 80 MHz band of the 320 MHz band.

The fifth 1 of the third phase rotation value may be applied to subcarriers having subcarrier indices from −256 to −193, the sixth −1 of the third phase rotation value may be applied to subcarriers having subcarrier indices from −192 to −129, the seventh −1 of the third phase rotation value may be applied to subcarriers having subcarrier indices from −128 to −65, and the eighth −1 of the third phase rotation value may be applied to subcarriers having subcarrier indices from −64 to −1. That is, [1 −1 −1 −1], that is, the fifth to eighth values of the third phase rotation value, may be applied to the second 80 MHz band of the 320 MHz band.

The ninth 1 of the third phase rotation value may be applied to subcarriers having subcarrier indices from 0 to 63, the tenth −1 of the third phase rotation value may be applied to subcarriers having subcarrier indices from 64 to 127, the eleventh −1 of the third phase rotation value may be applied to subcarriers having subcarrier indices from 128 to 191, and the twelfth −1 of the third phase rotation value may be applied to subcarriers having subcarrier indices from 192 to 255. That is, [1 −1 −1 −1], that is, the ninth to twelfth values of the third phase rotation value, may be applied to the third 80 MHz band of the 320 MHz band.

The thirteenth 1 of the third phase rotation value may be applied to subcarriers having subcarrier indices from 256 to 319, the fourteenth −1 of the third phase rotation value may be applied to subcarriers having subcarrier indices from 320 to 383, the fifteenth −1 of the third phase rotation value may be applied to subcarriers having subcarrier indices from 384 to 447, and the sixteenth −1 of the third phase rotation value may be applied to subcarriers having subcarrier indices from 448 to 511. That is, [1 −1 −1 −1], that is, the thirteenth to sixteenth values of the third phase rotation value, may be applied to the fourth 80 MHz band of the 320 MHz band:

For example, the fourth phase rotation value may be [1 j 1 j]. Since the 320 MHz band has the four 80 MHz bands, the fourth phase rotation value may be defined for each of the four 80 MHz bands.

The first 1 of the fourth phase rotation value may be applied to the first 80 MHz band of the 320 MHz band, the second j of the fourth phase rotation value may be applied to the second 80 MHz band of the 320 MHz band, the third 1 of the fourth phase rotation value may be applied to the third 80 MHz band of the 320 MHz band, and the fourth j of the fourth phase rotation value may be applied to the fourth 80 MHz band of the 320 MHz band.

The first phase rotation value may be obtained based on the product of the third phase rotation value and the fourth phase rotation value. That is, the first phase rotation value may be obtained by multiplying the third phase rotation value and the fourth phase rotation value in a way to be suitable for a frequency band (or subcarrier index). In this case, the first phase rotation value may be [1 −1 −1 −1 j −j −j −j 1 −1 −1 −1 j −j −j −j].

For another example, the fourth phase rotation value may be [1 −j 1 −j].

The first 1 of the fourth phase rotation value may be'applied to the first 80 MHz band of the 320 MHz band, the second −j of the fourth phase rotation value may be applied to the second 80 MHz band of the 320 MHz band, the third 1 of the fourth phase rotation value may be applied to the third 80 MHz band of the 320 MHz band, and the fourth −j of the fourth phase rotation value may be applied to the fourth 80 MHz band of the 320 MHz band.

The first phase rotation value may be obtained based on the product of the third phase rotation value and the fourth phase rotation value. That is, the first phase rotation value may be obtained by multiplying the third phase rotation value and the fourth phase rotation value in a way to be suitable for a frequency band (or subcarrier index). In this case, the first phase rotation value may be [1 −1 −1 −1 −j j j j 1 −1 −1 −1 −j j j j].

Furthermore, the second phase rotation value may be obtained based on the third phase rotation value and the fifth phase rotation value.

The fifth phase rotation value may be a phase rotation value defined in units of an 80 MHz band in the 320 MHz band based on an optimal PAPR of the L-STF. The 320 MHz band may be divided into four 80 MHz bands. The fifth phase rotation value may be defined for each of the four 80 MHz bands. If the PPDU is transmitted through the 160 MHz band, the fifth phase rotation value may be defined for each of the two 80 MHz bands based on the optimal PAPR of the L-STF. If the PPDU is transmitted through the 240 MHz band, the fifth phase rotation value may be defined for each of the three 80 MHz bands based on the optimal PAPR of the L-STF.

For example, the fifth phase rotation value may be [1 j 1 j]. Since the 320 MHz band has the four 80 MHz bands, the fifth phase rotation value may be defined for each of the four 80 MHz bands.

The first 1 of the fifth phase rotation value may be applied to the first 80 MHz band of the 320 MHz band, the second j of the fifth phase rotation value may be applied to the second 80 MHz band of the 320 MHz band, the third 1 of the fifth phase rotation value may be applied to the third 80 MHz band of the 320 MHz band, and the fourth j of the fifth phase rotation value may be applied to the fourth 80 MHz band of the 320 MHz band.

The second phase rotation value may be obtained based on the product of the third phase rotation value and the fifth phase rotation value. That is, the second phase rotation value may be obtained by multiplying the third phase rotation value and the fifth phase rotation value in a way to be suitable for a frequency band (or subcarrier index). In this case, the second phase rotation value may be [1 −1 −1 −1 j −j −j −j 1 −1 −1 −1 j −j −j −j].

The some band may include all 20 MHz bands except a primary 20 MHz band. That is, the primary 20 MHz band may be always used for PPDU transmission, but the remaining all the 20 MHz bands except the primary 20 MHz band may not be used for PPDU transmission.

The first and second phase rotation values may be obtained based on a preamble puncturing pattern. The preamble puncturing pattern may be a band pattern obtained by puncturing at least one 20 MHz band of all the 20 MHz bands except the primary 20 MHz band in the 320 MHz band. That is, the preamble puncturing pattern may correspond to patterns in all the cases where at least one 20 MHz band is punctured in the 320 MHz band. In this case, the first and second phase rotation values have one unified form, not a method having different values according to the preamble puncturing pattern.

The L-STF may be generated by applying the first phase rotation value or the second phase rotation value to an L-STF sequence. Furthermore, the L-LTF may be generated by applying the first phase rotation value or the second phase rotation value to an L-LTF sequence.

The L-STF sequence may be a sequence in which an L-STF sequence defined for a 20 MHz band is repeated. Since the L-STF is transmitted through the 320 MHz band, the L-STF sequence may be obtained by repeating the L-STF sequence of the 20 MHz band defined in the existing 802.11ax. Likewise, if the L-STF is transmitted through the 160 MHz band, the L-STF sequence of the 20 MHz band defined in the existing 802.11ax may be repeated twice. If the L-STF is transmitted through the 240 MHz band, the L-STF sequence of the 20 MHz band defined in the existing 802.11ax may be repeated three times.

The L-STF sequence defined for the 20 MHz band is sqrt(½)*[0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0].

The L-LTF sequence may be a sequence in which an L-LTF sequence defined for a 20 MHz band is repeated. Since the L-LTF is transmitted through the 320 MHz band, the L-LTF sequence may be obtained by repeating the L-LTF sequence of the 20 MHz band defined in the existing 802.11ax. Likewise, if the L-LTF is transmitted through the 160 MHz band, the L-LTF sequence of the 20 MHz band defined in the existing 802.11ax may be repeated twice. If the L-LTF is transmitted through the 240 MHz band, the L-LTF sequence of the 20 MHz band defined in the existing 802.11ax may be repeated three times.

The L-LTF sequence defined for the 20 MHz band is [0 0 0 0 0 1 1 −1 −1 1 1 −1 1 −1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 −1 −1 0 0 0 0 0].

In the aforementioned embodiment, even if the PPDU is transmitted through the 80 MHz, 160 MHz or 240 MHz band, a phase rotation value may be defined and applied to a legacy preamble in the same way.

The EHT-SIG may include an EHT-SIG-A and an EHT-SIG-B. The EHT-SIG-B may include the RU information. That is, an AP may provide notification of information on a tone plan in 160/240/320 MHz through the EHT-SIG-B within the PPDU. Furthermore, the EHT-STF, the EHT-LTF, and the data field included in the EHT field may be transmitted and received in a band (RU) according to a tone plan in 160/240/320 MHz.

Furthermore, the EHT-SIG may be generated by applying the first phase rotation value or the second phase rotation value. If the EHT PPDU has the same preamble structure as that of 11ax, a field may be generated by applying the same phase rotation value up to the EHT-SIG-B.

Advantageous Effects

According to an embodiment proposed in this specification, if a PPDU is transmitted through the 80, 160, 240, 320 MHz band on which preamble puncturing has been performed, an optimized PAPR can be obtained by defining a phase rotation value applied to a legacy preamble. Accordingly, efficiency and high throughput of a subcarrier can be obtained.

BRIEF DESCRIPTION OF THE DRAWINGS

FIG. 2 is a diagram illustrating an example of a PPDU used in an IEEE standard.

FIG. 16 illustrates an example in which OFDMA transmission is performed in a 160 MHz, 240 MHz or 320 MHz band according to the present embodiment.

DESCRIPTION OF EXEMPLARY EMBODIMENTS

Figure 1:
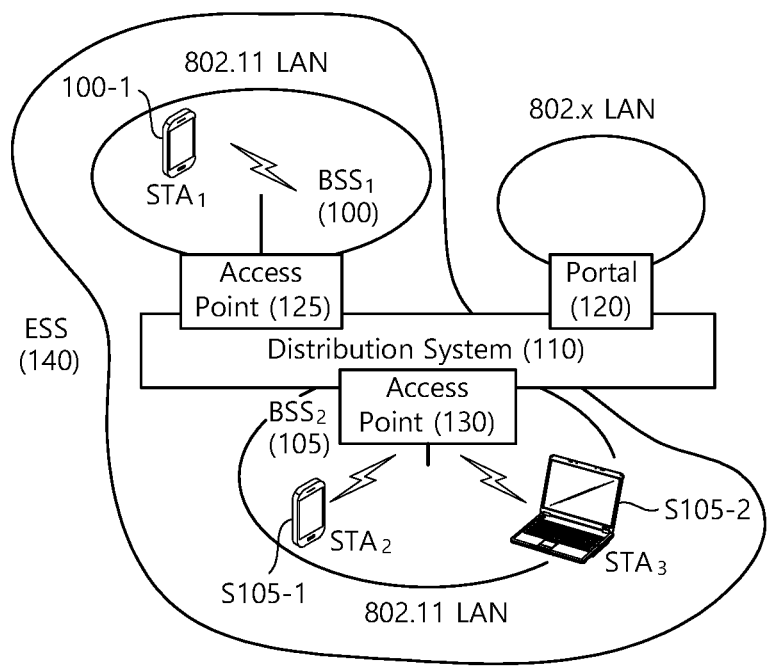
FIG. 1 is a conceptual view illustrating the structure of a wireless local area network (WLAN).
Figure 1:
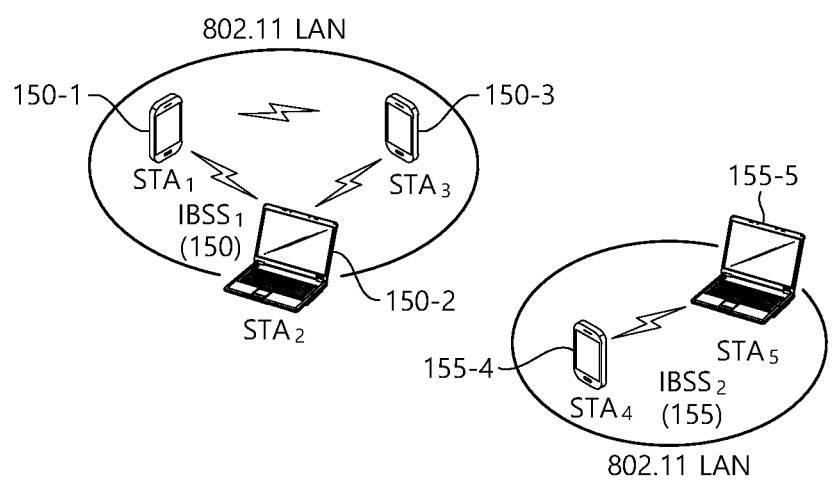

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (or a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
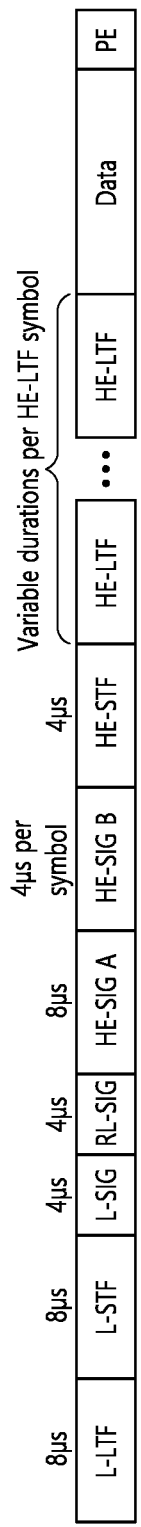
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIGA), a high efficiency-signal-B (HE-SIGB), a high efficiency-short training field (HE-STF), a high efficiency-long training field (HE-LTF), a data field (or an MAC payload), and a packet extension (PE) field. The respective fields may be transmitted during an illustrated time period (that is, 4 or 8 μs).

More detailed description of the respective fields of FIG. 3 will be made below.

Figure 4:
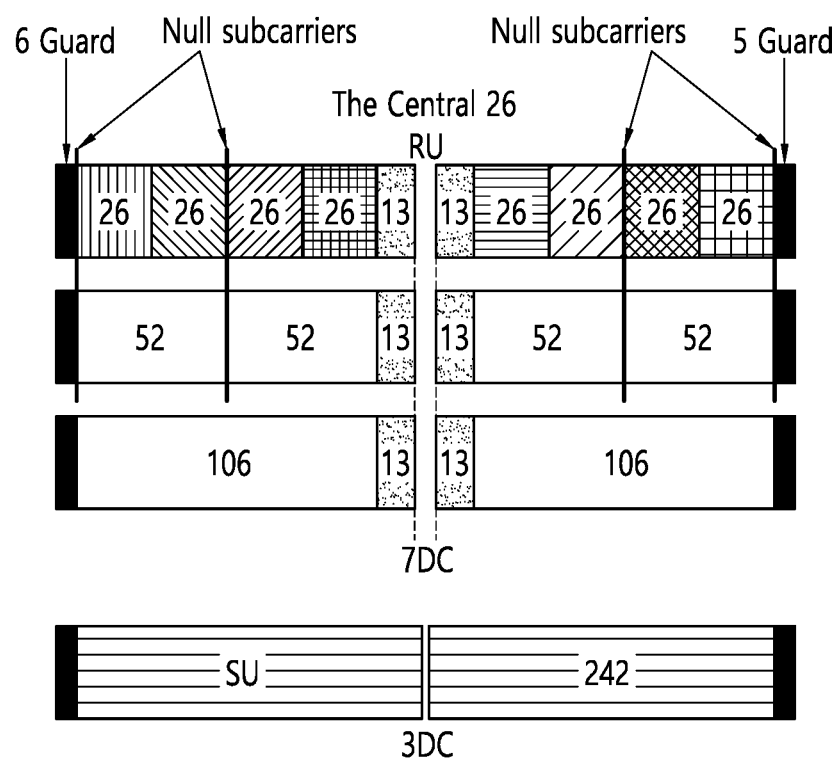
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
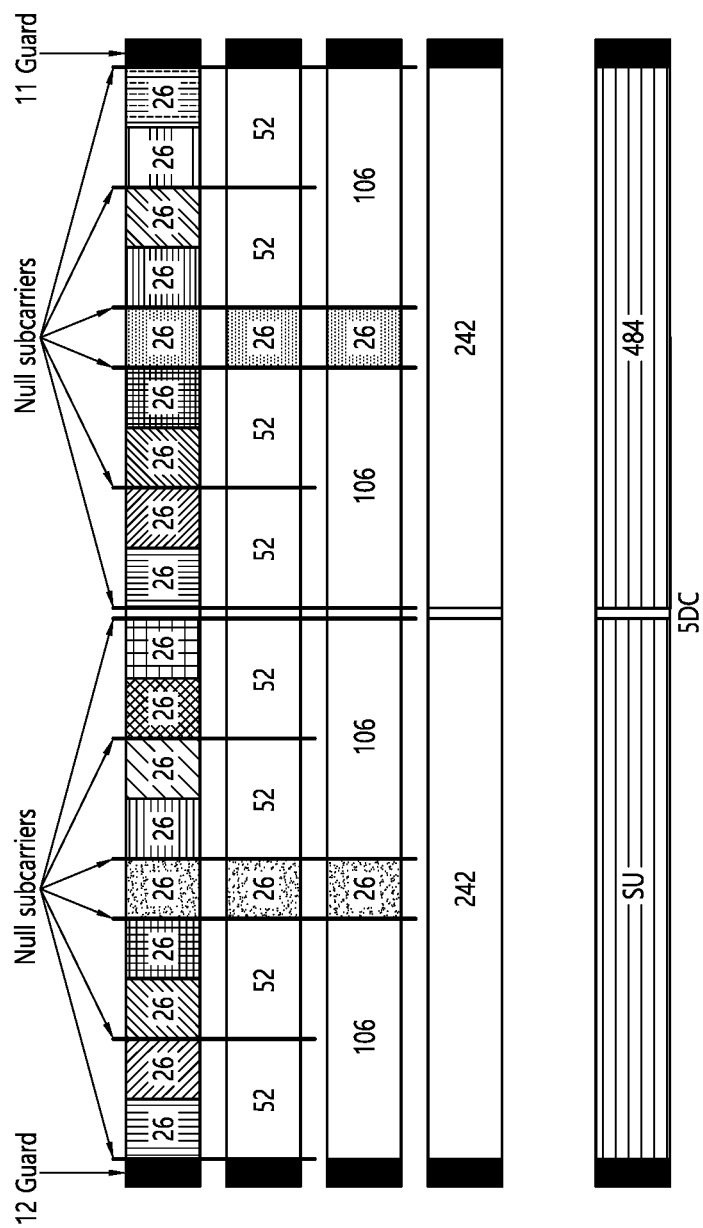
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
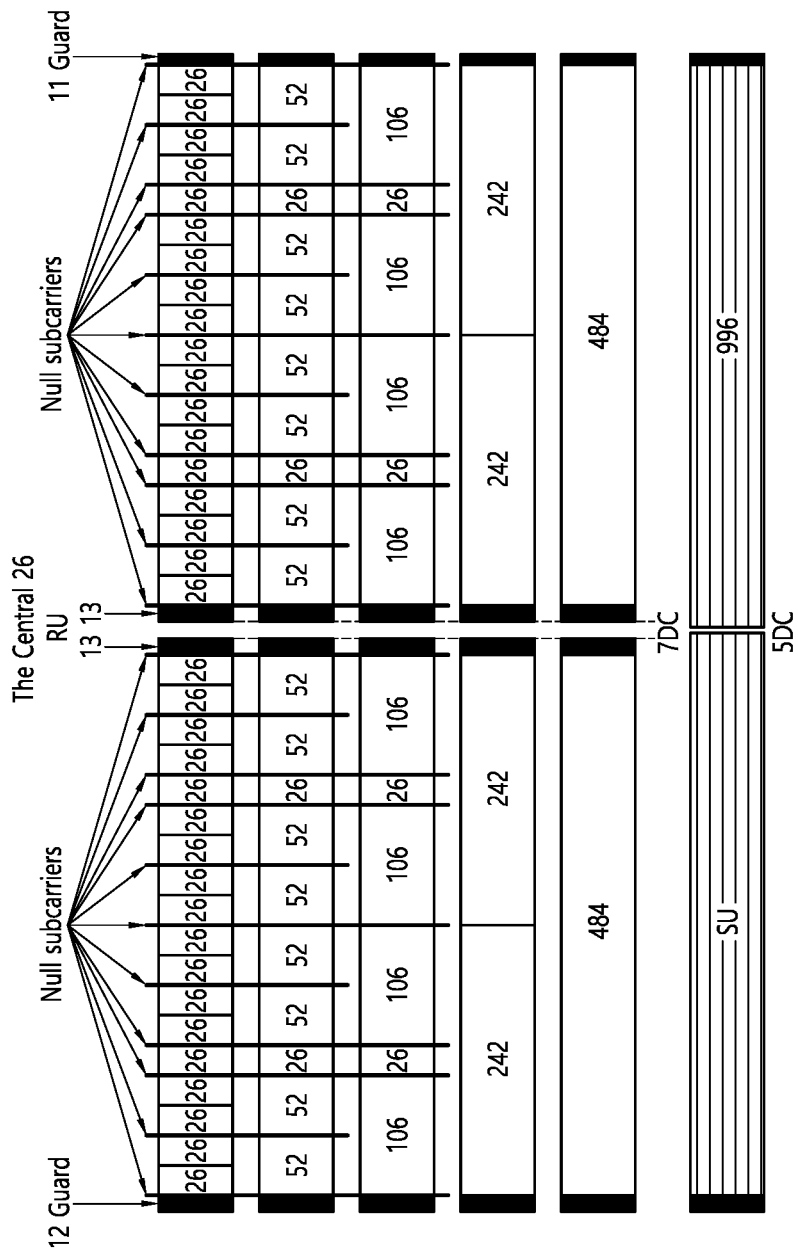
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
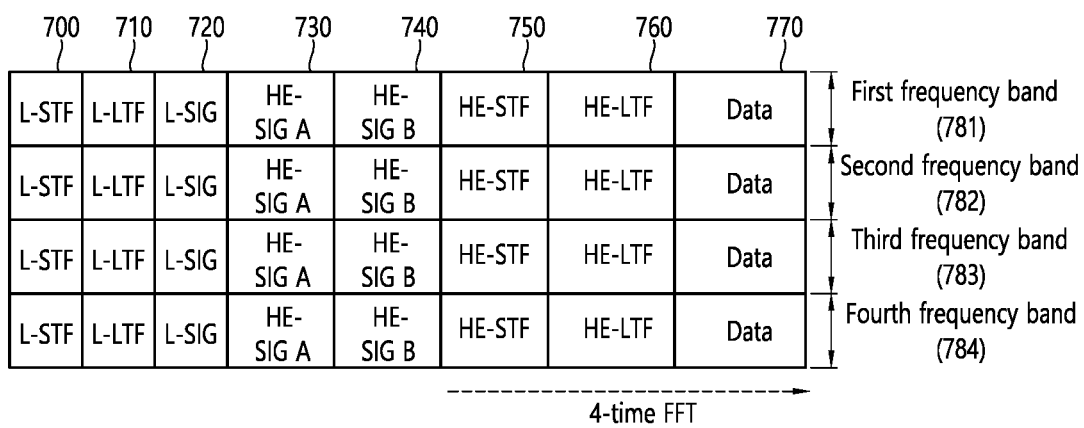
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include along training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (e.g., may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A 730 may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. |
| | B2 | UL/DL | 1 | Indicates whether the PPDU is sent UL or DL. Set to the value indicated by the TXVECTOR parameter UPLINK_FLAG. |

TABLE 1-continued

| Two Parts of HE-SIG-A | Bit | Field | Number of bits | Description |
|---|---|---|---|---|
| | B3-B6 | MCS | 4 | For an HE SU PPDU:<br>Set to n for MCSn, where n = 0, 1, 2, ...., 11<br>Values 12-15 are reserved<br>For HE ER SU PPDU with Bandwidth field set to 0 (242-tone RU):<br>Set to n for MCSn, where n = 0, 1, 2<br>Values 3-15 are reserved<br>For HE ER SU PPDU with Bandwidth field set to 1 (upper frequency 106-tone RU):<br>Set to 0 tbr MCS 0<br>Values 1-15 are reserved |
| | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if both the DCM and STBC are set to 1.<br>Set to 0 to indicate that DCM is not applied to the Data field.<br>NOTE—DCM is applied only to HE-MCSs 0, 1, 3 and 4. DCM is applied only to 1 and 2 spatial streams. DCM is not applied in combination with STBC |
| | B8-B13 | BSS Color | 6 | The BSS Color field is an identifier of the BSS.<br>Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU<br>Set to a value from Table 28-21 (Spatial Reuse field encoding for an HE SU PPDU, HE ER SU PPDU, and HE MU PPDU), see 27.11.6 (SPATIAL_REUSE).<br>Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |
| | B21-B22 | GI + LTF Size | 2 | Indicates the GI duration and HE-LTF size.<br>Set to 0 to indicate a 1x HE-LTF and 0.8 µs GI<br>Set to 1 to indicate a 2x HE-LTF and 0.8 µs GI<br>Set to 2 to indicate a 2x HE-LTF and 1.6 µs GI<br>Set to 3 to indicate:<br>a 4x HE-LTF and 0.8 µs GI if both the DCM and STBC fields are 1. Neither DCM nor STBC shall be applied if both the DCM and STBC fields are set to 1.<br>a 4x HE-LTF and 3.2 µs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or | B0-B6 | TXOP | 7 | Set to 127 to indicate no duration information if TXVECTOR parameter TXOP_DURATION is set to UNSPECIFIED. |

TABLE 1-continued

| Two Parts of HE-SIG-A | Bit | Field | Number of bits | Description |
|---|---|---|---|---|
| HE-S1G-A3 (HE ER SU PPDU) | | | | Set to a value less than 127 to indicate duration information for NAV setting and protection of the TXOP as follows: If TXVECTOR parameter TXOP_DURATION is less than 512, then B0 is set to 0 and B1-B6 is set to floor(TXOP DURATION/8) Otherwise, B0 is set to 1 and B1-B6 is set to floor ((TXOP_DURATION − 512 )/128) where B0 indicates the TXOP length granularity. Set to 0 for 8 μs; otherwise set to 1 for 128 μs. B1-B6 indicates the scaled value of the TXOP_DURATION |
| | B7 | Coding | 1 | Indicates whether BCC or LDPC is used: Set to 0 to indicate BCC Set to 1 to indicate LDPC |
| | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0 |
| | B9 | STBC | 1 | If the DCM field is set to 0, then set to 1 if space time block coding is used. Neither DCM nor STBC shall be applied if both the DCM field and STBC field are set to 1. Set to 0 othenvise. |
| | B10 | Beam-formed(#16038) | 1 | Set to 1 if a beamforming steering matrix is applied to the waveform in an SU transmission. Set to 0 otherwise. |
| | B11-B12 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the chaimel is fast varying. It recommends that midamble may be used for the PPDUs of the reverse link. Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | ITL/DL | 1 | Indicates whether the PPDU is sent UL or DL. Set to the value indicated by the TXVECTOR parameter UPLINK_FLAG. NOTE—The TDLS peer can identify the TDLS frame by To DS and From DS fields in the MAC header of the MPDU. |

TABLE 2-continued

| Two Parts of HE-SIG-A | Bit | Field | Number of bits | Description |
|---|---|---|---|---|
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE—DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case.<br>If the HE-SIG-B Compression field is set to 1, indicates the number of MU-MIMO users and is set to the number of NU-MIMO users minus 1 |

TABLE 2-continued

| Two Parts of HE-SIG-A | Bit | Field | Number of bits | Description |
|---|---|---|---|---|
| | B22 | SIGB Compression | 1 | Set to 0 if the Common field in HE-SIG-B is present. Set to 1 if the Common field in HE-SIG-B is not present. |
| | B23-B24 | GI + LTF Size | 2 | Indicates the GI duration and HE-LTF size:<br>Set to 0 to indicate a 4x HE-LTF and 0.8 µs GI<br>Set to 1 to indicate a 2x HE-LTF and 0.8 µs GI<br>Set to 2 to indicate a 2x HE-LTF and 1.6 µs GI<br>Set to 3 to indicate a 4x HE-LTF and 3.2 µs GI |
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to Indicate no duration information if TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)<br>Otherwise, B0 is set to 1 and B1-B6 is set to floor((TXOP_DURATION − 512)/128)<br>where<br>B0 indicates the TXOP length granularity. Set to 0 for 8 µs; otherwise set to 1 for 128 µs.<br>B1-B6 indicates the scaled value of the TXOP_DURATION |
| | B7 | Reserved | 1 | Reserved and set to 1 |
| | B8-B10 | Number of HE-LTF SymbolsAnd Midamble Periodicity | 3 | If the Doppler field is set to 0 indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1 B8-B9 indicates the number of HE-LTF symbols and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity as defined in 28.3.12 (Packet extension). |

TABLE 2-continued

| Two Parts of HE-SIG-A | Bit | Field | Number of bits | Description |
|---|---|---|---|---|
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TX VECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If the STA operating channel width is 20 MHz, then this field is set to the same value as Spatial Reuse 1 field. If the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an RE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spa- |

TABLE 3-continued

| Two Parts of HE-SIG-A | Bit | Field | Number of bits | Description |
|---|---|---|---|---|
| | | | | tial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the third 20 MHz subband.<br>If the STA operating channel width is 20 MHz or 40 MHz, this field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If the STA operating channel width is 80 + 80 MHz, this field is set to the same value as Spatial Reuse 1 field.<br>Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse dining this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the fourth 20 MHz subband.<br>If the STA operating channel width is 20 MHz, then this field is set to the same value as Spatial Reuse 1 field.<br>If the STA operating channel width is 40 MHz, then this field is set to the mine value as Spatial Reuse 2 field.<br>If the Bandwidth field indicates 160/80 + 80 MHz:<br>This Spatial Reuse field applies to the fourth 40 MHz subband of the 160 MHz operating band.<br>If the STA operating channel width is 80 + 80 MHz, then this field is set to same value as Spatial Reuse 2 field.<br>Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE—Unlike other Reserved fields in HE-SIG-A of the HE TB PPDU, B23 does not have a corresponding bit in the Trigger frame. |
| | B24-B25 | Bandwidth | 2 | Set to 0 for 20 MHz<br>Set to 1 for 40 MHz<br>Set to 2 for 80 MHz<br>Set to 3 for 160 MHz and 80 + 80 MHz |

TABLE 3-continued

| Two Parts of HE-SIG-A | Bit | Field | Number of bits | Description |
|---|---|---|---|---|
| HE-SIG-A2 | B0-B6 | TXOP | 7 | Set to 127 to indicate no duration information if TXVECTOR parameter TXOP_DURA-TION is set to UNSPECIFIED.<br>Set to a value less than 127 to indicate duration information for NAV setting and protection of the TXOP as follows:<br>If TXVECTOR parameter TXOP_DURATION is less than 512, then B0 is set to (land B1-B6 is set to floor(TXOP_DURATION/8)<br>Otherwise. B0 is set to 1 and B1-B6 is set to floor ((TXOP_DURATION − 512)/128) where<br>B0 indicates the TXOP length granularity. Set to 0 for 8 μs; otherwise set to 1 for 128 μs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B 740 may be included only in the case of the PPDU for the multiple users (MUs) as described above. Principally, an HE-SIG-A 750 or an HE-SIG-B 760 may include resource allocation information (or virtual resource allocation information) for at least one receiving STA.

Figure 8:
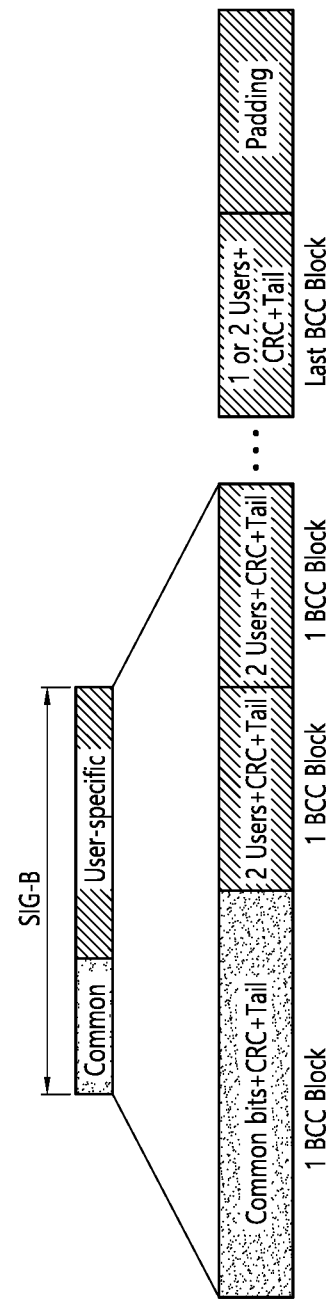
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a foremost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block: The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on a MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present disclosure, data (or or a frame) which the AP transmits to the STA may be expressed as a terms called downlink data (or a downlink frame) and data (or a frame) which the STA transmits to the AP may be expressed as a term called uplink data (or an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (or a MAC protocol data unit (MPDU)). The PPDU header may include a PHY header and a PHY preamble and the PSDU (or MPDU) may include the frame or indicate the frame (or an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (or the downlink frame and the downlink PPDU) to the plurality of respective STAs through the plurality of respective frequency resources on an overlapped time resource. The plurality of frequency resources may be a plurality of subbands (or subchannels) or a plurality of resource units (RUs). The DL MU OFDMA transmission may be used together with the DL MU MIMO transmission. For example, the DL MU MIMO transmission based on a plurality of space-time streams (or spatial streams) may be performed on a specific subband (or subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (or subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (or spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (or spatial streams) may be performed on a specific subband (or subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
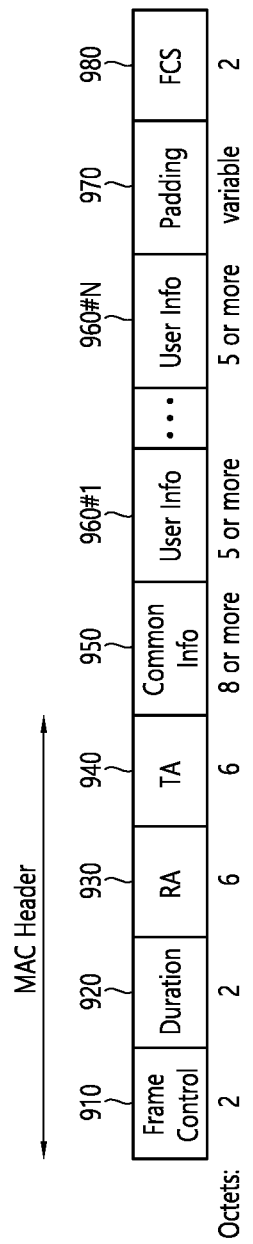
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field. (940) includes address information of an STA triggering the corresponding trigger frame (e.g., an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (i.e., the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960 #1 to 960 #N) shown in FIG. 9 includes a plurality of subfields.

Figure 10:
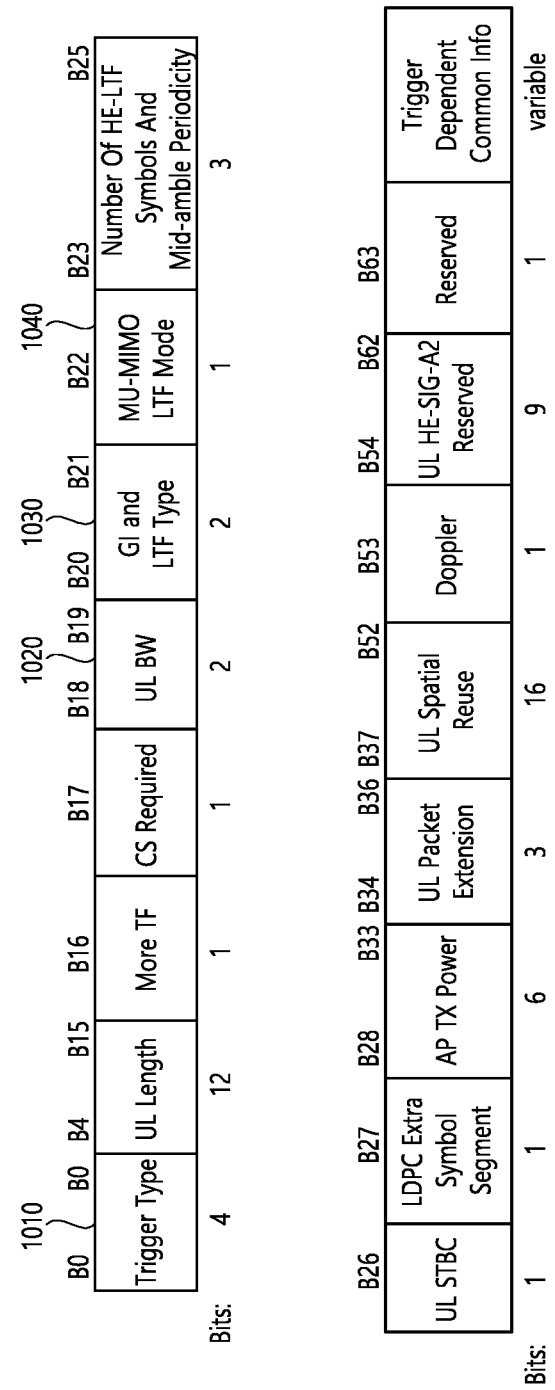
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field 1010 of FIG. 10 may indicate a trigger frame variant and encoding of the trigger frame variant. The trigger type field 1010 may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields 1030 of FIG. 10 indicate the GI and HE-LTF type of the HE TB PPDU response. The GI and LTF type field 1030 may be defined as follows.

TABLE 6

| GI And LTF field value | Description |
|---|---|
| 0 | 1x HE-LTF + 1.6 μs GI |
| 1 | 2x HE-LTF + 1.6 μs GI |
| 2 | 4x HE-LTF + 3.2 μs GI(#15968) |
| 3 | Reserved |

Also, when the GI and LTF type fields 1030 have a value of 2 or 3, the MU-MIMO LTF mode field 1040 of FIG. 10 indicates the LTF mode of a UL MU-MIMO HE TB PPDU response. At this time, the MU-MIMO LTF mode field 1040 may be defined as follows.

If the trigger frame allocates an RU that occupies the whole HE TB PPDU bandwidth and the RU is allocated to one or more STAs, the MU-MIMO LTF mode field 1040 indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field 1040 indicates the HE single stream pilot HE-LTF mode. The MU-MIMO LTF mode field 1040 may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
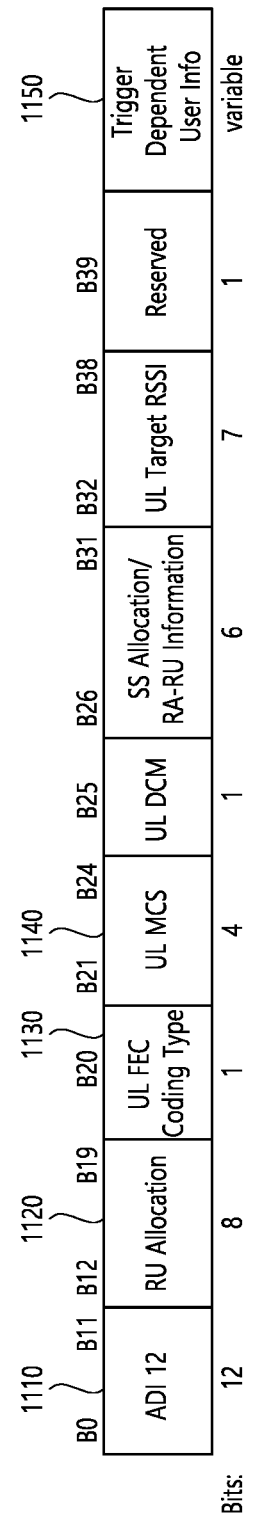
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (i.e., a receiving STA) corresponding to per user information, where an example of the identifier may be the whole or part of the AID.

Also, an RU Allocation field 1120 may be included. In other words, when a receiving STA identified by the User Identifier field 1110 transmits a UL PPDU in response to the trigger frame of FIG. 9, the corresponding UL PPDU is transmitted through an RU indicated by the RU Allocation field 1120. In this case, it is preferable that the RU indicated by the RU Allocation field 1120 indicates the RUs shown in FIGS. 4, 5, and 6. A specific structure of the RU Allocation field 1120 will be described later.

The subfield of FIG. 11 may include a (UL FEC) coding type field 1130. The coding type field 1130 may indicate the coding type of an uplink PPDU transmitted in response to the trigger frame of FIG. 9. For example, when BCC coding is applied to the uplink PPDU, the coding type field 1130 may be set to '1', and when LDPC coding is applied, the coding type field 1130 may be set to '0'.

Additionally, the subfield of FIG. 11 may include a UL MCS field 1140. The MCS field 1140 may indicate an MCS scheme being applied to the uplink PPDU that is transmitted in response to the trigger frame of FIG. 9.

Also, the subfield of FIG. 11 may include a Trigger Dependent User Info field 1150. When the Trigger Type field 1010 of FIG. 10 indicates a basic trigger variant, the Trigger Dependent User Info field 1150 may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A 730 of FIG. 7, and the second control field may be the HE-SIG-B 740 shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (e.g., a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (e.g., a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (i.e., 20 MHz). Accordingly, the control identifier (e.g., 1-bit identifier) may indicate whether a single RU corresponding to the full bandwidth of the transmission frequency band is allocated.

For example, if the transmission frequency band has a bandwidth of 40 MHz, the control identifier (e.g., a 1-bit identifier) may indicate whether a single RU corresponding to the full bandwidth (i.e., bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (e.g., a 1-bit identifier) may indicate whether a single RU corresponding to the full bandwidth (i.e., bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (e.g., 1-bit identifier).

First of all, when a single RU corresponding to the full bandwidth of the transmission frequency band is allocated through the control identifier (e.g., a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (e.g., spatial multiplexing) may be used to multiplex the signals for multiple users in the same, single RU. Accordingly, the control identifier (e.g., a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
| --- | --- | --- | --- | --- | --- | --- | --- | --- | --- | --- |
| 00000000 | 26 | 26 | 26 | 26 | 26 | 26 | 26 | 26 | 26 | 1 |
| 00000001 | 26 | 26 | 26 | 26 | 26 | 26 | 26 |    | 52 | 1 |
| 00000010 | 26 | 26 | 26 | 26 | 26 |    | 52 | 26 | 26 | 1 |
| 00000011 | 26 | 26 | 26 | 26 | 26 |    | 52 |    | 52 | 1 |
| 00000100 | 26 | 26 |    | 52 | 26 | 26 | 26 | 26 | 26 | 1 |
| 00000101 | 26 | 26 |    | 52 | 26 | 26 | 26 |    | 52 | 1 |
| 00000110 | 26 | 26 |    | 52 | 26 |    | 52 | 26 | 26 | 1 |
| 00000111 | 26 | 26 |    | 52 | 26 |    | 52 |    | 52 | 1 |
| 00001000 |    | 52 | 26 | 26 | 26 | 26 | 26 | 26 | 26 | 1 |
| 00001001 |    | 52 | 26 | 26 | 26 | 26 | 26 |    | 52 | 1 |
| 00001010 |    | 52 | 26 | 26 | 26 |    | 52 | 26 | 26 | 1 |
| 00001011 |    | 52 | 26 | 26 | 26 |    | 52 |    | 52 | 1 |
| 00001100 |    | 52 |    | 52 | 26 | 26 | 26 | 26 | 26 | 1 |
| 00001101 |    | 52 |    | 52 | 26 | 26 | 26 |    | 52 | 1 |
| 00001110 |    | 52 |    | 52 | 26 |    | 52 | 26 | 26 | 1 |
| 00001111 |    | 52 |    | 52 | 26 |    | 52 |    | 52 | 1 |
| 00010$y_2y_1y_0$ |    | 52 |    |    | 52 | — |    | 106 |    | 8 |
| 00011$y_2y_1y_0$ |    |    | 106 |    |    | — |    |    | 52 | 8 |
| 00100$y_2y_1y_0$ | 26 | 26 |    | 26 | 26 | 26 |    | 106 |    | 8 |
| 00101$y_2y_1y_0$ | 26 | 26 |    |    | 52 | 26 |    | 106 |    | 8 |
| 00110$y_2y_1y_0$ |    | 52 |    | 26 | 26 | 26 |    | 106 |    | 8 |
| 00111$y_2y_1y_0$ |    | 52 |    |    | 52 | 26 |    | 106 |    | 8 |
| 01000$y_2y_1y_0$ |    |    | 106 |    | 26 | 26 | 26 | 26 | 26 | 8 |
| 01001$y_2y_1y_0$ |    |    | 106 |    | 26 | 26 | 26 |    | 52 | 8 |
| 01010$y_2y_1y_0$ |    |    | 106 |    | 26 |    | 52 | 26 | 26 | 8 |
| 01011$y_2y_1y_0$ |    |    | 106 |    | 26 |    | 52 |    | 52 | 8 |
| 0110$y_1y_0z_1z_0$ |    |    | 106 |    |    | — |    | 106 |    | 16 |
| 01110000 |    | 52 |    | 52 |    | — |    | 52 | 52 | 1 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01110001 | | | | | 242-tone RU empty | | | | | 1 |
| 01110010 | | | | | 484-tone RU with zero User fields indicated in this RU Allocation subfield of the HE-SIG-B content channel | | | | | 1 |
| 01110011 | | | | | 996-tone RU with zero User fields indicated in this RU Allocation subfield of the HE-SIG-B content channel | | | | | 1 |
| 011101$x_1x_0$ | | | | | Reserved | | | | | 4 |
| 01111$y_2y_1y_0$ | | | | | Reserved | | | | | 8 |
| 10$y_2y_1y_0z_2z_1z_0$ | | 106 | | | 26 | | 106 | | | 64 |
| 11000$y_2y_1y_0$ | | | | | 242 | | | | | 8 |
| 11001$y_2y_1y_0$ | | | | | 484 | | | | | 8 |
| 11010$y_2y_1y_0$ | | | | | 996 | | | | | 8 |
| 11011$y_2y_1y_0$ | | | | | Reserved | | | | | 8 |
| 111$x_4x_3x_2x_1x0$ | | | | | Reserved | | | | | 32 |

If (#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y^2 + 2^1 \times y^1 + y^0 + 1$ STAs multiplexed the RU.
$z_2z_1z_0$ = 000-111 indicates number of STAs multiplexed in the higher frequency 106-tone RIT if there are two 106-tone RUs and one 26-tone RU is assigned between two 106-tone RUs. The binary vector $z_2z_1z_0$ indicates $2^2 \times y^2 + 2^1 \times y^1 + y^0 + 1$ STAs multiplexed in the RU.
Similarly, $y_1y_0$ = 00-11 indicates number of STAs multiplexed in the lower frequency 106-tone RU. The binary vector yiyo indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector zizo indicates $2^1 \times z_1 + z_0 + 1$ STAs multiplexed in the RU.
1 to #9 (from left to the right) is ordered in increasing order of the absolute frequency.
$x_1x0$ = 00-11, $x_4x_3x_2x_1x0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 0100 0 0 10 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
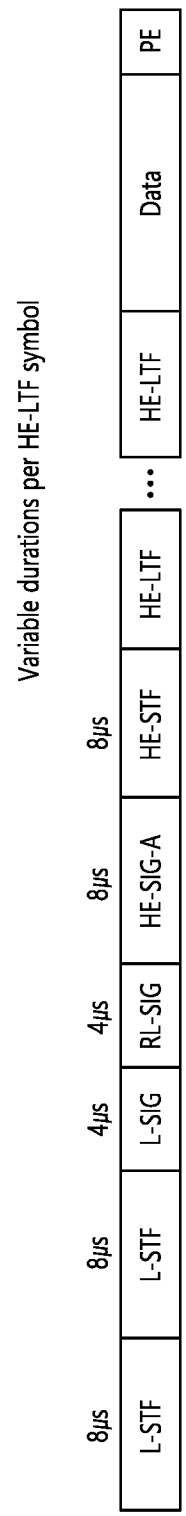
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

In the existing 11ax, tone plans for a full band and OFDMA transmission have been designed in 20/40/80/80+80/160 MHz. The tone plan of 160 MHz simply repeatedly uses the tone plan of the existing 80 MHz twice. This has been designed by considering a case where transmission is performed by considering two RFs, and may be a reasonable tone plan in the case of non-contiguous 80+80 MHz. However, in the case of contiguous 160 MHz, a situation in which transmission is performed using one RF may be considered. In such a case, a new tone plan may be proposed in order to improve efficiency and throughput of a subcarrier used because there are many subcarriers wasted in the existing tone plan.

1. New 160 MHz Tone Plan
<Full Band>
If transmission is performed using a full band, a new RU may be proposed, and the size of a new RU may be determined by considering various DCs based on the influence of a DC offset and a 160 MHz Guard tone of the existing 11ax. The guard tones of the existing 11ax are left 12 and right 11, and the number of DCs of 80 MHz is 5 or 7. If this is considered without any change, a new RU of a full band is 2020RU or 2018RU.

12/11 guard tone, 5 DC, 2020RU
12/11 guard tone, 7 DC, 2018RU

In 160 MHz, if the influence of a DC offset is considered, to use DCs smaller than 5/7, that is, the number of DCs used in the existing 80 MHz, is not preferred. Furthermore, 5/7 DC may be sufficient from a viewpoint of performance, and a maximum of 7 DCs may be appropriate when the following OFDMA tone plan is considered. DC in the following OFDMA tone plan has been designed by considering 7 DC and 5 DC in the existing 80 MHz OFDMA tone plan. If DCs are smaller than 7 DC or 5 DC, it is not preferred, and 5/7 DC may be sufficient from a viewpoint of performance. In the existing 11ax, in 20 MHz and 80 MHz if the center 26RU (13+13RU) is used, 7 DC is used.

<OFDMA Tone Plan>

An OFDMA tone plan may be represented using the existing 996RU and 26RU (13+13RU) as follows. Hereinafter, G means a guard tone, and N means a null tone.

12G+996RU+13RU+7 DC+13RU+996RU+11G
12G+996RU+1N+13RU+5 DC+13RU+1N+996RU+11G

In the above, the number of DCs and the number of null subcarriers on both side may be configured based on a DC offset of the center 26RU (13+13RU) and performance according to the influence of interference. 5 DC and 1 null carrier on both sides may be an advantageous structure by considering the influence of interference.

A configuration of 996RU is proposed as two types as follows.

996RU=484RU+1N+26RU+1N+484RU
996RU=1N+484RU+26RU+484RU+1N

The first is a structure capable of reducing interference influence from/to a neighboring RU by placing null tones both sides of 26RU. The second is a structure capable of reducing interference influence between 484RU and a neighboring RU thereof. It may be preferred that an RU using a small number of subcarriers like 26RU uses the first structure because interference has a great influence on performance.

484RU has a structure of two 242RUs as in the existing 11ax.

484RU=242RU+242RU
242RU has the following structure as in the existing 11ax.
242RU=1N+106RU+1N+26RU+1N+106RU+1N
106RU has the following structure as in the existing 11ax.
106RU=52RU+2N+52RU
52RU has the following structure as in the existing 11ax.
52RU=26RU+26RU 2. 320 MHz tone plan In a configuration of 320 MHz, various options may be considered as follows.

Option 1: A Combination of Four 80 MHz Tone Plans of the Existing 11ax

This considers both contiguous and non-contiguous situations, and may be represented as follows.

80+80+80+80 MHz/160+80+80 MHz/80+160+80 MHz/80+80+160 MHz/240+80 MHz/80+240 MHz/320 MHz

+ means non-contiguous, and 160/240/320 means that 2/3/4 80 MHz tone plans are consecutively and contiguously arranged.

<If a Contiguous Band is Present>

If 160 MHz is used, a tone index of the 80 MHz tone plan on the left is a tone index−512 of the existing 80 MHz tone plan, and a tone index of the 80 MHz tone plan on the right is a tone index+512 of the existing 80 MHz tone plan.

If 240 MHz is used, a tone index of the center 80 MHz tone plan is a tone index of the existing 80 MHz tone plan as it is, a tone index of the 80 MHz tone plan on the leftmost side is a tone index−1024 of the existing 80 MHz tone plan, and a tone index of 80 MHz on the rightmost side is a tone index+1024 of the existing 80 MHz tone plan.

If 320 MHz is used, a tone index of the first 80 MHz tone plan from the left is a tone index−1536 of the existing 80 MHz tone plan, a tone index of the second 80 MHz tone plan is a tone index−512 of the existing 80 MHz tone plan, a tone index of the third 80 MHz tone plan is a tone index+512 of the existing 80 MHz tone plan, and a tone index of the fourth 80 MHz tone plan is a tone index+1536 of the existing 80 MHz tone plan.

The above various non-contiguous combinations may use different bands in addition to the same band. For example, in 80+160+80 MHz, each 80/160/80 MHz bandwidth may be transmitted using a 2.4 GH/5 GHz/6 GHz band.

Option 2: A Combination of Two New 160 MHz Tone Plans

This considers both contiguous and non-contiguous situations, and may be represented as follows.

160+160 MHz/320 MHz

+ means non-contiguous, and 320 MHz means that two new 160 MHz tone plans are contiguously arranged.

<If a Contiguous Band is Present>

If 320 MHz is used, a tone index of the 160 MHz tone plan on the left is a tone index−1024 of a new 160 MHz tone plan, and a tone index of 160 MHz on the right is a tone index+1024 of the new 160 MHz tone plan.

In the above, the non-contiguous combination may use different bands in addition to the same band. For example, in 160+160, each 160 MHz bandwidth may be transmitted using a 2.4 GH/5 GHz band.

Option 3: A Combination of Two 80 MHz Tone Plans of the Existing 11ax and One New 160 MHz This considers both contiguous and non-contiguous situations, and may be represented as follows.

c80+c80+n160 MHz/c80+n160 MHz+c80/n160+c80+c80 MHz/cc160+n160 MHz/n160+cc160 MHz/ncc320 MHz/cnc320 MHz/ccn320 MHz + means non-contiguous, and c80 MHz, cc160 MHz, and n160 MHz mean an 80 MHz tone plan of the existing 11ax, two consecutive 80 MHz tone plans of the existing 11ax, and a new 160 MHz tone plan. ncc320 MHz/cnc320 MHz/ccn320 MHz means contiguous one new 160 MHz tone plan and the existing two 11ax 80 MHz tone plans, and ncc/cnc/ccn indicates a contiguous sequence of the tone plans.

<If a Contiguous Band is Present>

If cc160 MHz is used, a tone index of the 80 MHz tone plan on the left is a tone index−512 of the existing 80 MHz tone plan, a tone index of 80 MHz on the right is a tone index+512 of the existing 80 MHz tone plan.

If ncc320 MHz is used, a tone index of the 160 MHz tone plan on the left is a tone index−1024 of a new 160 MHz tone plan, a tone index of a next 80 MHz tone plan is a tone index+512 of the existing 80 MHz tone plan, and a tone index of the last 80 MHz tone plan is a tone index+1536 of the existing 80 MHz tone plan.

If cnc320 MHz is used, atone index of the 80 MHz tone plan on the left is atone index−1536 of the existing 80 MHz tone plan, a tone index of the center 160 MHz tone plan is a tone index of the new 160 MHz tone plan as it is, and a tone index of the last 80 MHz tone plan is a tone index+1536 of the existing 80 MHz tone plan.

If ccn320 MHz is used, a tone index of the 80 MHz tone plan on the left is a tone index−1536 of the existing 80 MHz tone plan, a tone index of a next 80 MHz tone plan is atone index−512 of the existing 80 MHz tone plan, and a tone index of the last 160 MHz tone plan is a tone index+1024 of the new 160 MHz tone plan.

In the above option, various combinations of tone plans having different structures of c80 and n160e may be considered. In such a case, there is a disadvantage in that indication related to RU allocation may become very complicated. Accordingly, in order to reduce signalling overhead, only a structure having a specific sequence may be limited and used. For example, only c80+c80+n160 MHz/ccn320 MHz may be used.

The above various non-contiguous combination may use different bands in addition to the same band. For example, in c80+n160+c80 MHz, each c80/n160/c 80 MHz bandwidth may be transmitted using 2.4 GH/5 GHz/6 GHz band.

Option 4: An Alternative 320 MHz Tone Plan Considering One RF Use

In the case of contiguous 320 MHz, a situation in which transmission is performed using one RF may be considered. In such a case, many subcarriers are wasted in 320 MHz composed of a combination of a 160 MHz or 80 MHz tone plan. Accordingly, a new tone plan may be proposed in order to improve efficiency and throughput of a subcarrier used. The following proposes various alternative tone plans.

A. Alternative 320 MHz Tone Plan 1

If 320 MHz is produced using two contiguous 160 MHz tone plans, a 12 left/11 right guard tone is used, and may be applied to an alternative 320 MHz tone plan without any change. Furthermore, if transmission is performed using a full band, a new RU may be proposed. Various DCs are considered based on the influence of a DC offset, and the size of a new RU may be determined by considering a guard tone size. The number of DCs of 80 MHz of the existing 11ax is 5 or 7. If this is considered without any change, a new RU of a full band is 4068RU or 4066RU.

12/11 guard tone, 5 DC, 4068RU (RU subcarrier index is −2036:−3, 3:2036)

12/11 guard tone, 7 DC, 4066RU (RU subcarrier index is −2036:−4, 4:2036)

In 320 MHz, if the influence of a DC offset is considered, to use DCs smaller than 5/7, that is, the number of DCs used in the existing 80 MHz, is not preferred. Furthermore, 5/7 DC may be sufficient from a viewpoint of performance. If an OFDMA tone plan using the following 2020RU is considered, a maximum of 7 DCs may be appropriate. In the OFDMA tone plan, the number of DCs has been designed by considering 7 DCs used in the 80 MHz OFDMA tone plan of the existing 11ax. If DCs smaller than 7 DCs, it is not preferred. From a viewpoint of performance, 7 DCs may be sufficient even in 320 MHz.

AN OFDMA tone plan may be represented using 2020RU and 26RU (13+13RU) as follows.

12G+2020RU+13RU+7 DC+13RU+2020RU+11G

A configuration of 2020RU is proposed as two types as follows.

2020RU=996RU+1N+26RU+1N+996RU
2020RU=1N+996RU+26RU+996RU+1N

The first is a structure capable of reducing interference influence to/from a neighboring RU by placing null tones on both sides of 26RU. The second is a structure capable of reducing interference influence between 996RU and a neighboring RU thereof. An RU using a small number of subcarriers like 26RU may preferably use the first structure because interference has a great influence on performance.

A configuration of 996RU is proposed as two types as in new 160 MHz.

996RU=484RU+1N+26RU+1N+484RU
996RU=1N+484RU+26RU+484RU+1N
484RU has a structure of two 242RUs as in the existing 11ax.

484RU=242RU+242RU
242RU has the following structure as in the existing 11ax.
242RU=1N+106RU+1N+26RU+1N+106RU+1N
106RU has the following structure as in the existing 11ax.
106RU=52RU+2N+52RU
52RU has the following structure as in the existing 11ax.
52RU=26RU+26RU 3. 240 MHz An AP may transmit a PPDU using a bandwidth of 240 MHz, and may configure the PPDU by combining three 80 MHz tone plans of the existing 11ax. This considers both contiguous and non-contiguous situations, and may be represented as follows. 80+80+80 MHz/160+80 MHz/80+160 MHz/240 MHz + means non-contiguous, and 160/240 means that an 80 MHz tone plan 2/3 is consecutively and contiguously arranged.

<If a Contiguous Band is Present>

If 160 MHz is used, a tone index of the 80 MHz tone plan on the left is a tone index−512 of the existing 80 MHz tone plan, and a tone index of the 80 MHz tone plan on the right is a tone index+512 of the existing 80 MHz tone plan.

If 240 MHz is used, a tone index of the center 80 MHz tone plan is a tone index of the existing 80 MHz tone plan as it is, a tone index of the 80 MHz tone plan on the leftmost side is a tone index−1024 of the existing 80 MHz tone plan, and a tone index of 80 MHz on the rightmost side is a tone index+1024 of the existing 80 MHz tone plan.

A pilot subcarrier also needs to be corrected based on a location. If 160 MHz is used, a pilot tone index of the 80 MHz tone plan on the left is a pilot tone index−512 of the existing 80 MHz tone plan, and a pilot tone index of the 80 MHz tone plan on the right is a tone index+512 of the existing 80 MHz tone plan.

If 240 MHz is used, a pilot tone index of the center 80 MHz tone plan is a pilot tone index of the existing 80 MHz tone plan as it is, a pilot tone index of the 80 MHz tone plan on the leftmost side is a pilot tone index−1024 of the existing 80 MHz tone plan, and a pilot tone index of 80 MHz on the rightmost side is a pilot tone index+1024 of the existing 80 MHz tone plan.

Or the existing 11ax 80 MHz tone plan and a new 160 MHz tone plan may be used. Both contiguous and non-contiguous situations are considered, and may be represented as follows.

c80+n160 MHz/n160 MHz+c80/nc240 MHz/cn240 MHz

+ means non-contiguous, and c80 MHz and n160 MHz mean an 80 MHz tone plan of the existing 11ax and the new 160 MHz tone plan, respectively. nc240 MHz/cn240 MHz mean a contiguous one new 160 MHz tone plan and the existing one 11ax 80 MHz tone plan, and nc/cn indicates a contiguous sequence of tone plans.

If nc240 MHz is used, a tone index of the 160 MHz tone plan on the left is a tone index−512 of the new 160 MHz tone plan, and a tone index of 80 MHz on the right is a tone index+1024 of the existing 80 MHz tone plan.

If cn240 MHz is used, a tone index of the 80 MHz tone plan on the left is a tone index−1024 of the existing 80 MHz tone plan, and a tone index of 160 MHz on the right is a tone index+512 of the new 160 MHz tone plan.

A pilot subcarrier also needs to be corrected based on a location. If nc240 MHz is used, a pilot tone index of the 160 MHz tone plan on the left is a pilot tone index−512 of the new 160 MHz tone plan, and a pilot tone index of 80 MHz on the right is a pilot tone index+1024 of the existing 80 MHz tone plan.

If cn240 MHz is used, a pilot tone index of the 80 MHz tone plan on the left is a pilot tone index−1024 of the existing 80 MHz tone plan, and a pilot tone index of 160 MHz on the right is a pilot tone index+512 of the new 160 MHz tone plan.

The above various non-contiguous combinations may use different bands in addition to the same band. For example, in 80+80+80 MHz, each 80 MHz bandwidth may be transmitted using a 2.4 GH/5 GHz/6 GHz band.

Specifically, a tone plan of 240 MHz may be basically configured using three methods.

Option 1: a combination of three 80 MHz tone plans (80+80+80)

Option 2: a combination of two 80 MHz tone plans and one new 160 MHz tone plan (160+80/80+160)

Option 3: an alternative 240 MHz tone plan (240)

Non-contiguous may be a case where different bands are used. The index of an RU subcarrier may be corrected based on a location.

The index of a 240 MHz pilot subcarrier may be corrected based on a location as follows.

160 MHz: the existing 80 MHz±512 (same is true of an RU tone index)

240 MHz: the existing 80 MHz±1024, the existing 80 MHz (same is true of an RU tone index), new 160 MHz±512 (same is true of an RU tone index)

Tone Plan 1

If a full band is used, a new RU may be proposed by considering a guard tone and a DC tone. In 80 MHz and 160 MHz of the existing 11ax, 12 right and 11 left guard tones are used, and may be used even in 240 MHz as they are. When interference from a neighbor channel or interference toward a neighbor channel is considered, there is no great problem although 12 right and 11 left guard tones are used. Furthermore, DCs equal to or greater than 5 or 7, that is, the number of DCs used in the existing 80 MHz, need to be used. If a DC offset is considered, there is no great problem although 5 or 7 DCs are used. If this is considered, a tone plan may be proposed as follows. Hereinafter, G means a guard tone, and N means a null tone.

1. Alternative 240 MHz Tone Plan 1

<Full Band Tone Plan>

12/11 guard, DC 5 or 7, RU 3044 or 3042

<OFMDA Tone Plan>

12G+996RU+1N+26RU+1N+996RU (5 DC)+1N+26RU+1N+996RU+11G

Both sides 996RU=484RU+1N+26RU+1N+484RU (ver1) (or 1N+484RU+26RU+484RU+1N(ver2))

The center 996RU (5 DC)=484RU+13RU+7 DC+13RU+484RU (existing 80 MHz and the same)

484RU=242RU+242RU

242RU=1N+106RU+1N+26RU+1N+106RU+1N

106RU=52RU+2N+52RU

52RU=26RU+26RU

In a full band, 5 or 7 DCs are configured based on the influence of a DC offset. The number of DCs may not be smaller than 80 MHz/160 MHz, and may not be greater than 7 in OFDMA.

The two configuration options of both sides 996RU may be considered from viewpoints of performance guarantee of 26RU or performance guarantee of 484RU. Configurations of the center 996RU and a subsequent RU thereof are the same as the existing ax.

Specifically, the configuration of both sides 996RU may be proposed as two structures. The first is a structure capable of reducing interference influence to/from a neighboring RU by placing null tones on both sides of 26RU. The second is a structure capable of reducing interference influence between 484RU and a neighboring RU thereof. An RU using a small number of subcarriers like 26RU may preferably use the first structure because interference has a great influence on performance.

The center 996RU may use the 996RU tone plan of the existing 80 MHz without any change. Furthermore, 484/242/106/52RU may use the structure of the existing 11ax without any change.

4. Examples of Tone Plans

Figure 13:
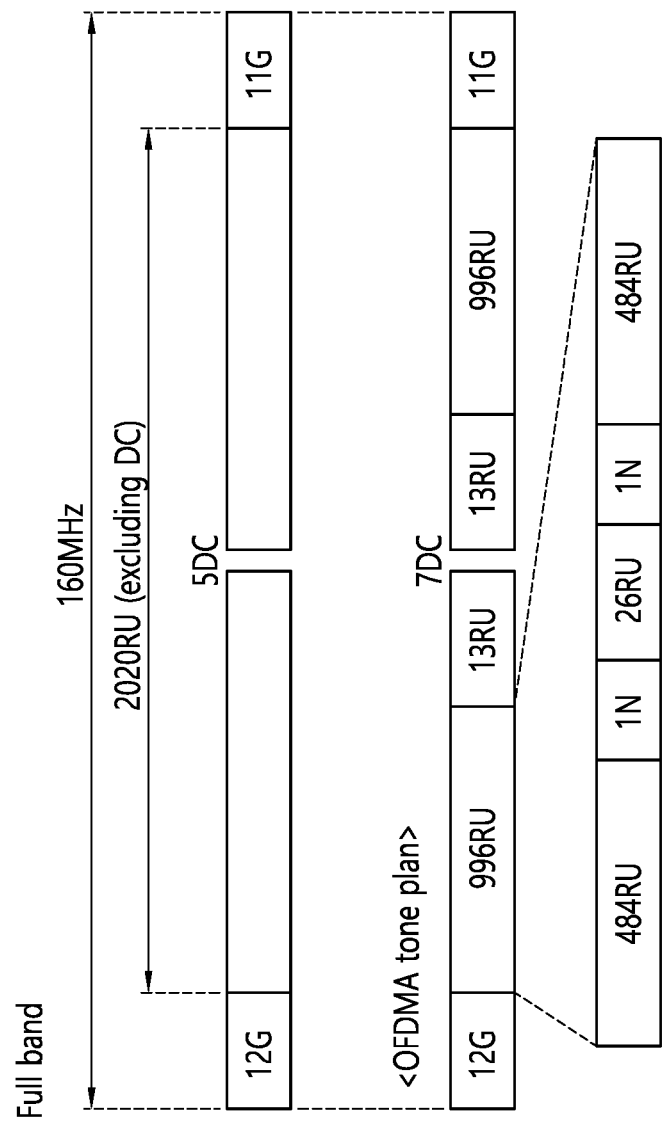
FIG. 13 shows an example of a tone plan in a 160 MHz band according to the present embodiment.

FIG. 13 shows an example of a tone plan in a 160 MHz band according to the present embodiment.

A tone plan in case of a full band and a tone plan in case of applying OFDMA are both illustrated in FIG. 13.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 13 is for one embodiment only, and thus the 12 guard tones and the 11 guard tones may change in locations. When 7 DC tones are located at the center of 160 MHz, the data may be transmitted in 2018RU.

Figure 18:
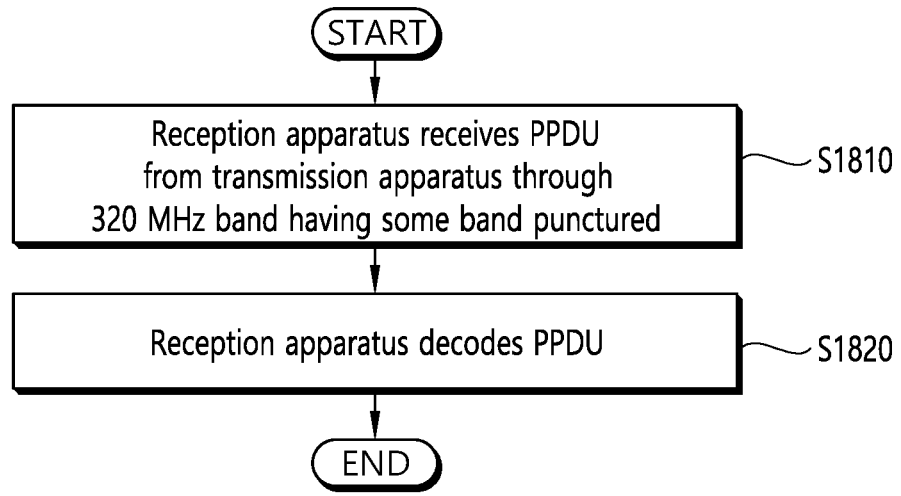
FIG. 18 is a flowchart illustrating a procedure of receiving a PPDU according to the present embodiment.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 18 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 14:
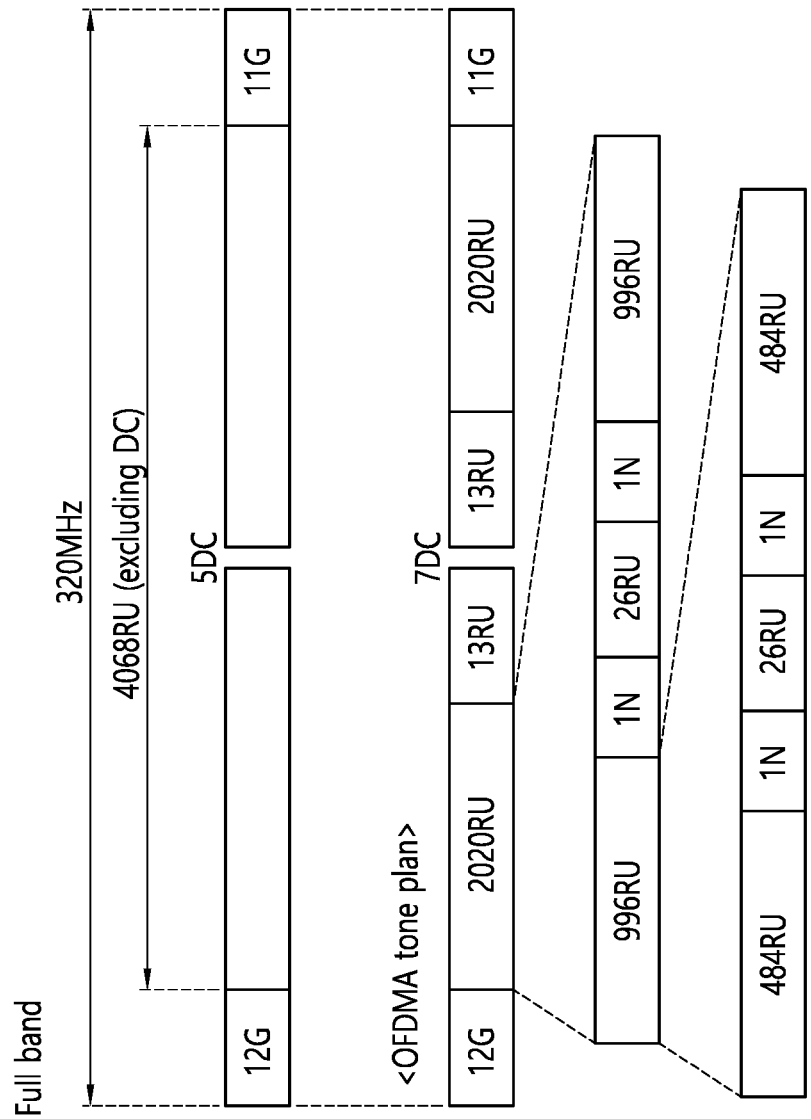
FIG. 14 shows an example of a tone plan in a 320 MHz band according to the present embodiment.

FIG. 14 shows an example of a tone plan in a 320 MHz band according to the present embodiment.

A tone plan in case of a full band and a tone plan in case of applying OFDMA are both illustrated in FIG. 14.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 14 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 14 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 15:
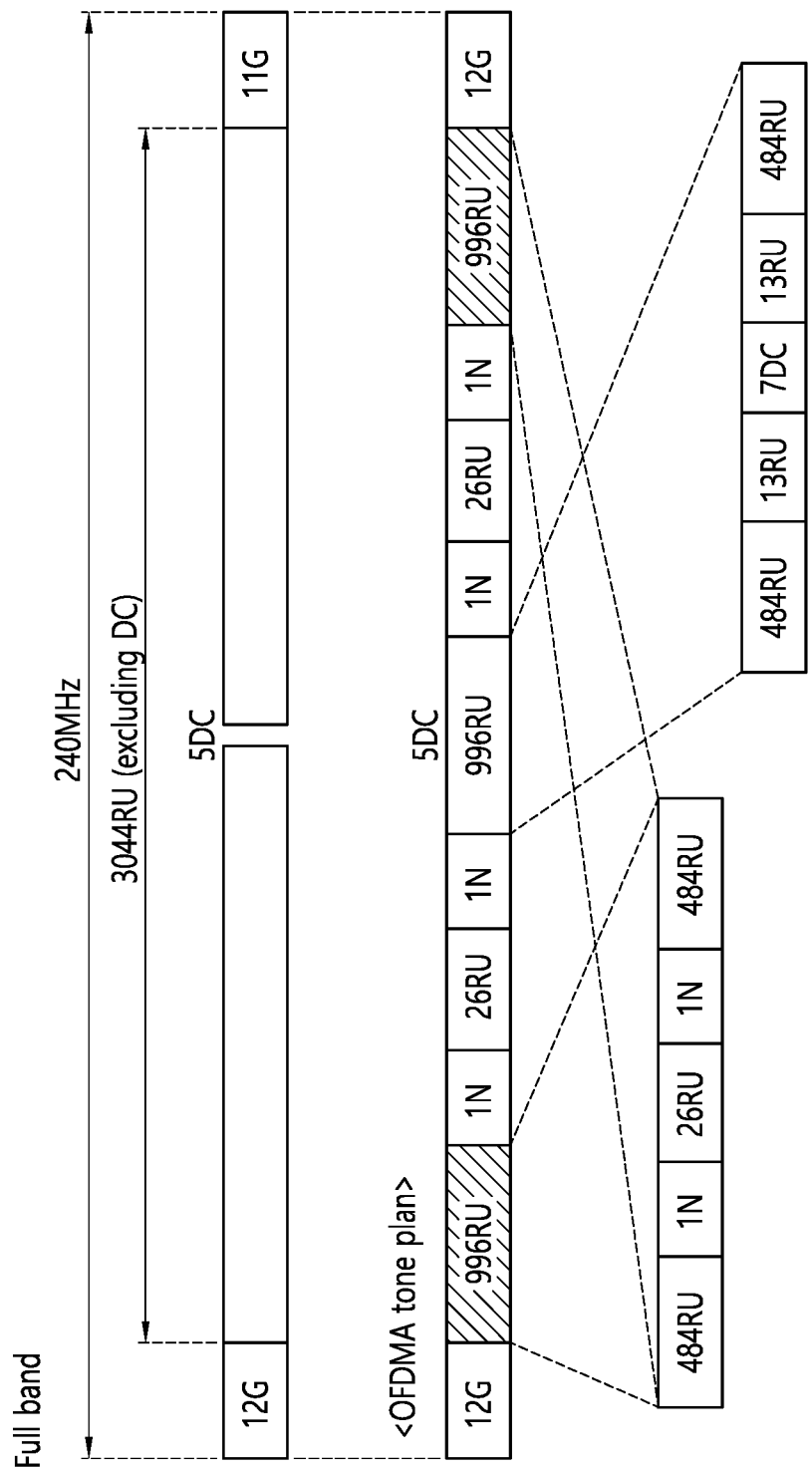
FIG. 15 shows an example of a tone plan in a 240 MHz band according to the present embodiment.

FIG. 15 illustrates an example of tone plans in the 240 MHz band according to the present embodiment.

FIG. 15 illustrates all tone planes in the case of a full band proposed in the aforementioned tone plan 1 and tone plans to which OFDMA is applied.

First, in the case of a full band, a tone plan of 240 MHz may be composed in order of 12 guard tones, 3044RU, 5 DC tones, and 11 guard tones. The 5 DC tones may be located at the center of the 160 MHz, and data may be transmitted in the 3044RU. In this case, FIG. 13 is merely one embodiment. The locations of the 12 guard tones and the 11 guard tones may be changed. If 7 DC tones are located the center of the 240 MHz, data may be transmitted in 3042RU.

If OFDMA is applied, a tone plan of 320 MHz may be composed in order of 12 guard tones, 996RU, 1N, 26RU, 1N, 996RU, 5 DC tones, 1N, 26RU, 1N, 996RU and 11 guard tones.

Furthermore, 996RU at both ends may be composed of 484RU, 1 null tone, 26RU, 1 null tone, and 484RU. 996RU at the center may be composed of 484RU, 13RU, 7 DCs, 13RU, and 484RU. In this case, FIG. 13 is merely one embodiment. The locations of 12 guard tones and 11 guard tones may be changed, and 996RU at both ends may be composed 1 null tone, 484RU, 26RU, 484RU and 1 null tone.

The same structure as the existing 11ax may be present from the 484RU, and is not illustrated.

5. Technical Object to be Achieved by the Present Disclosure

This specification proposes a phase rotation applied to a legacy preamble if a packet is transmitted using 80/160/240/320 MHz in a WLAN system (802.11). In particular, preamble puncturing introduced from 11ax is considered and also extended and applied to 240/320 MHz. In such a situation, an optimized phase rotation is proposed.

In the WLAN 802.11 system, for an increase of peak throughput, the transmission of increased streams is considered using a wider band or more antennas than those of the existing 11ax. Furthermore, a method of aggregating and using various bands or links is also considered.

In this specification, a case where a wide band is considered. That is, a case where a packet is transmitted using 80/160/240/320 MHz is considered. In this case, there is proposed a phase rotation applied to a legacy preamble. In particular, preamble puncturing introduced from 11ax is considered and also extended and applied to 240/320 MHz. In such a situation, an optimized phase rotation is proposed.

First, an encoding procedure of a PPDU may be described as follows.

An L-STF included in the PPDU may be composed of the following procedure.

a) Determine the channel bandwidth from the TXVECTOR parameter CH_BANDWIDTH.

b) Sequence generation: Generate the L-STF sequence over the channel bandwidth as described in 27.3.10.3 (L-STF). Apply a 3 dB power boost if transmitting an HE ER SU PPDU as described in 27.3.10.3 (L-STF).

c) Phase rotation: Apply appropriate phase rotation for each 20 MHz subchannel as described in 27.3.9 (Mathematical description of signals) and 21.3.7.5 (Definition of tone rotation).

d) CSD per STS: If the TXVECTOR parameter BEAM_CHANGE is 0, apply CSD per STS for each space-time stream and frequency segment as described in 27.3.10.2.2 (Cyclic shift for HE modulated fields).

e) Spatial mapping: If the TXVECTOR parameter BEAM_CHANGE is 0, apply the A matrix and the Q matrix as described in 27.3.10.3 (L-STF).

f) IDFT: Compute the inverse discrete Fourier transform.

g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).

h) Insert GI and apply windowing: Prepend a GI ($T_{GI,Pre-HE}$) and apply windowing as described in 27.3.9 (Mathematical description of signals).

i) Analog and RF: Upconvert the resulting complex baseband waveform associated with each transmit chain to an RF signal according to the center frequency of the desired channel and transmit. Refer to 27.3.9 (Mathematical description of signals) and 27.3.10 (HE preamble) for details.

An L-LTF included in the PPDU may be composed of the following procedure.

a) Determine the channel bandwidth from the TXVECTOR parameter CH_BANDWIDTH.

b) Sequence generation: Generate the L-LTF sequence over the channel bandwidth as described in 27.3.10.4 (L-LTF). Apply a 3 dB power boost if transmitting an HE ER SU PPDU as described in 27.3.10.4 (L-LTF).

c) Phase rotation: Apply appropriate phase rotation for each 20 MHz subchannel as described in 27.3.9 (Mathematical description of signals) and 21.3.7.5 (Definition of tone rotation).

d) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.

e) Spatial mapping: If the TXVECTOR parameter BEAM_CHANGE is 0, apply the A matrix and the Q matrix as described in 27.3.10.4 (L-LTF).

f) IDFT: Compute the inverse discrete Fourier transform.

g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).

h) Insert GI and apply windowing: Prepend a GI ($T_{GI,L-LTF}$) and apply windowing as described in 27.3.9 (Mathematical description of signals).

i) Analog and RF: Upconvert the resulting complex baseband waveform associated with each transmit chain to an RF signal according to the carrier frequency of the desired channel and transmit. Refer to 27.3.9 (Mathematical description of signals) and 27.3.10 (HE preamble) for details.

An L-SIG included in the PPDU may be composed of the following procedure.

a) Set the RATE subfield in the SIGNAL field to G Mb/s. Set the LENGTH, Parity, and Tail fields in the SIGNAL field as described in 27.3.10.5 (L-SIG).

b) BCC encoder: Encode the SIGNAL field by a convolutional encoder at the rate of R=½ as described in 27.3.11.5.1 (Binary convolutional coding and puncturing).

c) BCC interleaves: Interleave as described in 17.3.5.7 (BCC interleavers).

d) Constellation Mapper: BPSK modulate as described in 27.3.11.9 (Constellation mapping).

e) Pilot insertion: Insert pilots as described in 27.3.10.5 (L-SIG).

f) Extra lone insertion: Four extra tones are inserted in subcarriers k∈{−28, −27, 27, 28} for channel estimation purpose and the values on these four extra tones are {−1, −1, −1, 1}, respectively. Apply a 3 dB power boost to the four extra tones if transmitting an HE ER SU PPDU as described in 27.3.10.5 (L-SIG).

g) Duplication and phase rotation: Duplicate the L-SIG field over each occupied 20 MHz subchannel of the channel bandwidth. Apply appropriate phase rotation for each occupied 20 MHz subchannel as described in 27.3.9 (Mathematical description of signals) and 21.3.7.5 (Definition of tone rotation).

h) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.

i) Spatial mapping: If the TXVECTOR parameter BEAM_CHANGE is 0, apply the A matrix and Q matrix as described in 27.3.10.5 (L-SIG).

j) IDFT: Compute the inverse discrete Fourier transform.

k) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).

l) Insert GI and apply windowing: Prepend a GI ($T_{GI,Pre-He}$) and apply windowing as described in 27.3.9 (Mathematical description of signals).

m) Analog and RF: Upconvert the resulting complex baseband waveform associated with each transmit chain. Refer to 27.3.9 (Mathematical description of signals) and 27.3.10 (HE preamble) for details.

the L-STF, the L-LTF, and the L-SIG may apply a proper phase rotation in a 20 MHz subchannel unit (refer to c) of the L-STF, c) of the L-LTF and g) of the L-SIG). In this case, when being transmitted in a bandwidth of 40 MHz or more, the L-SIG is duplicated in a 20 MHz unit, and may apply a phase rotation one by one (refer to g) of the L-SIG). The phase rotation may be described as follows.

The following illustrates a legacy preamble in the existing 11ax and a phase rotation used in an HE-SIG-A/B.

A function $Y_{k,BW}$ is used to indicate the rotation of a tone. The $Y_{k,BW}$ may be defined as a phase rotation value. In $Y_{k,BW}$, a bandwidth (BW) is determined by a TXVECTOR parameter CH_BANDWIDTH defined as in the following table. In this case, k is a subcarrier index.

TABLE 11

| CH_BANDWIDTH | $Y_{k,BW}$ |
|---|---|
| CBW20 | $Y_{k,20}$ |
| CBW40 | $Y_{k,40}$ |
| CBW80 | $Y_{k,80}$ |
| CBW160 | $Y_{k,160}$ |
| CBW80 + 80 | $Y_{k,80}$ per frequency segment |

Hereinafter, $Y_{k,BW}$ according to a bandwidth is defined.
For a 20 MHz PPDU transmission,
$Y_{k,20}=1$
For a 40 MHz PPDU transmission, $$Y_{k,40} = \begin{cases} 1, k < 0 \\ j, k \geq 0 \end{cases}$$

For an 80 MHz PPDU transmission, $$Y_{k,80} = \begin{cases} 1, k < -64 \\ -1, k \geq -64 \end{cases}$$

With respect to 80+80 MHz PPDU transmission, each 80 MHz frequency segment needs to use a phase rotation for the 80 MHz PPDU transmission.

For a 160 MHz PPDU transmission.

$$Y_{k,160} = \begin{cases} 1, k < -192 \\ -1, -192 \leq k < 0 \\ 1, 0 \leq k < 64 \\ -1, 64 \leq k \end{cases}$$

As may be seen from the aforementioned contents, 160 MHz needs to repeatedly use a phase rotation of 80 MHz twice.

In Wi-Fi after 11ax, in order to improve peak throughput, a wider band may be used. In this specification, up to 240/320 MHz is considered. Furthermore, although it is unknown which type of packet will be used, it is evident that the start of the packet is a legacy preamble for coexistence with the existing legacy. Furthermore, a situation in which a packet of contiguous 160/240/320 MHz is transmitted through one RF using further improved hardware and RF may also be considered. This specification proposes phase rotations using various methods for minimizing a PAPR in an L-STF and an L-LTF by considering such a situation. In particular, this specification proposes a phase rotation that minimizes a maximum PAPR by considering a preamble puncturing situation proposed in 11ax and a situation extended and applied to 240/320 MHz. In this case, the phase rotation considers a method having one unified form, not a method having a different value depending on a preamble puncturing pattern. For example, if preamble puncturing is considered in 80 MHz of 11ax, primary 20 MHz is always used for PPDU transmission, but secondary 20/40 MHz may not be used for PPDU transmission. In such several preamble puncturing patterns, a maximum PAPR value is extracted by applying a specific phase rotation and calculating a PAPR for each preamble puncturing pattern. Even in a situation in which another phase rotation is applied, a maximum PAPR in each phase rotation may be extracted by repeating the process, and an optimized phase rotation may be selected by comparing such maximum PAPR values. In 11ax, preamble puncturing has been considered up to 160 MHz, which may be extended and applied to 240 MHz and 320 MHz. In such a situation, there is proposed an optimized phase rotation for each bandwidth. That is, even in a wide bandwidth, assuming that another 20 MHz other than primary 20 MHz may not be used or may be used for PPDU transmission, an optimized phase rotation is proposed from a PAPR viewpoint.

Meanwhile, in 11ax, a good PAPR cannot be guaranteed because preamble puncturing is not considered and a phase rotation of the existing 1 1 ac has been applied to 80/160 MHz without any change. Accordingly, this specification proposes a scheme capable of lowering a PAPR and further improving hardware efficiency by proposing a new phase rotation in which preamble puncturing has been considered even 80/160 MHz situations in addition to 240/320 MHz.

The following illustrates an L-STF and L-LTF sequence corresponding to 20 MHz, which is applied to each 20 MHz bandwidth in a wide bandwidth without any change.

L-STF=sqrt(½)*[0 0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0]

L-LTF [0 0 0 0 0 0 1 1 −1 −1 1 1 −1 1 −1 1 1 1 1 1 1 −1 −1 1 1 1 −1 1 −1 1 1 1 1 1 0 1 −1 −1 1 1 −1 1 −1 1 1 −1 −1 −1 −1 −1 1 1 −1 −1 1 1 −1 1 1 −1 1 1 1 1 0 0 0 0 0]

As described above, a signal repeated in a frequency domain may have a very large PAPR. In order to reduce the PAPR, a phase rotation is applied and proposed as follows. Furthermore, in a proposed phase rotation situation, a maximum PAPR in an L-STF and an L-LTF in which preamble puncturing has been considered is proposed as follows.

A. 80 MHz (if an 80 MHz Band is Indicated as a Subcarrier Index, it Results in −128≤k<127, Wherein k is a Subcarrier Index)

1) The Existing Phase Rotation is Applied without any Change

As follows, the existing phase rotation may be applied without any change. However, this may not be preferred because it has a relatively large maximum PAPR (refer to Table 12) compared to A. 2), 3) proposals to be described in a situation in which preamble puncturing has been considered.

Gamma_k,80=1 if k<−64
−1 if −64≤k

TABLE 12

| L-STF | L-LTF |
|---|---|
| 6.8606 | 7.9370 |

Gamma_k,BW means a phase rotation value in a k subcarrier index of a contiguous BW bandwidth.

2) PAPR Optimization Phase Rotation Applied for Each 20 MHz Bandwidth

The following illustrates a phase rotation and a PAPR applied in a 20 MHz bandwidth unit that optimizes a PAPR in an L-STF.

Gamma_k,80=1 if k<−64
j if −64≤k<0
1 if 0≤k<64
j if 64≤k
or
Gamma_k,80=1 if k<−64
−j if −64≤k<0
1 if 0≤k<64
−j if 64≤k

TABLE 13

| L-STF | L-LTF |
|---|---|
| 5.8219 | 6.8980 |

The following illustrates a phase rotation and a PAPR applied in a 20 MHz bandwidth unit that minimizes a PAPR in an L-LTF.

Gamma_k,80=1 if k<−64
1 if −64≤k<0
−1 if 0≤k<64
−1 if 64≤k

TABLE 14

| L-STF | L-LTF |
|---|---|
| 5.8847 | 6.6178 |

The three phase rotations have similar PAPRs within respective fields. If one of the three phase rotations is selected, a phase rotation that optimizes an L-LTF having a greater PAPR from a viewpoint of the entire packet may be preferred.

3) Phase Rotation of Performance Similar to that of a PAPR Optimization Phase Rotation Applied for Each 20 MHz Bandwidth The following illustrates a phase rotation having a PAPR similar to that of the phase rotations proposed in A. 2) and a PAPR at this time.

Gamma_k,80=1 if k<−64
−1 if −64≤k<0
−1 if 0≤k<64
1 if 64≤k

TABLE 15

| L-STF | L-LTF |
|---|---|
| 5.9681 | 6.7153 |

B. 160 MHz (if a 160 MHz Band is Indicated as a Subcarrier Index, it Results in −256≤k<255)

160 MHz includes both contiguous 160 MHz/non-contiguous 160 MHz, and non-contiguous 160 MHz may be 80+80 MHz. In particular, in the case of non-contiguous, each channel may be located to a different band. Even in such a case, a phase rotation is applied for unification without any change and it is evident to use a different RE A phase rotation may be applied based on a channel size used within the band because there is no influence on a PAPR. This may also be likewise applied to the following 240/320 MHz.

Contiguous/non-contiguous 160 MHz phase rotations proposed hereinafter may be applied to a 160 MHz portion of non-contiguous transmission situation of wider 240/320 MHz without any change.

1) 80 MHz Phase Rotation Repetition

This is the same approach as the method used in the existing 11ax. A phase rotation can be unified in a situation in which a contiguous 160 MHz packet is transmitted using one RF and in a situation in which a contiguous/non-contiguous 160 MHz packet is transmitted for each 80 MHz using two RFs. That is, the phase rotation proposed in 80 MHz may be repeated twice and applied. In contiguous 160 MHz, the phase rotation may be represented as follows, and a maximum PAPR is also as follows.

Gamma_k,160=1 if k<−192
1 if −192≤k<−128
−1 if −128≤k<−64
−1 if −64≤k<0
1 if 0≤k<64
1 if 64≤k<128
−1 if 128≤k<192
−1 if 192<k

TABLE 16

| L-STF | L-LTF |
|---|---|
| 8.4454 | 9.1864 |

Gamma_k,160=1 if k<−192
−1 if −192≤−128
−1 if −128≤−64
1 if −64≤k<0
1 if 0≤k<64
−1 if 64≤k<128

−1 if 128≤k<192
1 if 192≤k

TABLE 17

| L-STF | L-LTF |
|---|---|
| 8.4874 | 9.1864 |

Gamma_k,160=1 if k<−192
j if −192≤k<−128
1 if −128≤k<−64
j if −64≤k<0
1 if 0≤k<64
j if 64≤k<128
1 if 128≤k<192
j if 192≤k

TABLE 18

| L-STF | L-LTF |
|---|---|
| 8.3369 | 9.4172 |

Gamma_k,160=1 if k<−192
−j if −192≤k<−128
1 if −128≤k<−64
−j if −64≤k<0
1 if 0≤k<64
−j if 64≤k<128
1 if 128≤k<192
−j if 192≤k

TABLE 19

| L-STF | L-LTF |
|---|---|
| 8.3369 | 9.4172 |

Gamma_k,160=1 if k<−192
−1 if −192≤k<−128
−1 if −128≤k<−64
−1 if −64≤k<0
1 if 0≤k<64
−1 if 64≤k<128
−1 if 128≤k<192
−1 if 192≤k

TABLE 20

| L-STF | L-LTF |
|---|---|
| 9.8709 | 10.9473 |

If non-contiguous 160 MHz, that is, 80+80 MHz, is considered, the proposal of A has only to be applied to each 80 MHz without any change.

In the above various proposals, the repetition of the existing phase rotation not having a good PAPR in 80 MHz (a phase rotation in the existing 160 MHz) has a poor PAPR compared to another phase rotation, and thus may not be preferred.

2) 80 MHz Phase Rotation Repetition and Phase Rotation Addition in 80 MHz Bandwidth Unit This is a method of further optimizing a PAPR by repeating the phase rotation of 80 MHz twice and additionally adding a phase rotation in each 80 MHz unit. Since the 80 MHz unit is maintained, this method can unify a phase rotation in a situation in which a contiguous 160 MHz packet is transmitted using one RF and a situation in which a contiguous/non-contiguous 160 MHz packet is transmitted for each 80 MHz using two RFs.

In this case, if the existing 80 MHz phase rotation is applied, this is the same as B. 1) except the fifth phase rotation of (B. 1). A case where the existing 80 MHz phase rotation is repeated and a phase rotation is added in the 80 MHz bandwidth unit is as follows.

Gamma_k,160=1 if k<−192
−1 if −192≤k<−128
−1 if −128≤k<−64
−1 if −64≤k<0
−1 if 0≤k<64
1 if 64≤k<128
1 if 128≤k<192
1 if 192≤k

TABLE 21

| L-STF | L-LTF |
|---|---|
| 8.1473 | 9.1912 |

From the viewpoint of the unification of a phase rotation of contiguous/non-contiguous 160 MHz and the entire packet, the first two phase rotations of B. 1) that minimizes the PAPR of an L-LTF having a greater PAPR may be preferred, and the first phase rotation of B. 1) may be preferred when up to an L-STF is considered.

3) PAPR Optimization Phase Rotation Applied for Each 20 MHz Bandwidth

This method is a phase rotation applied in a 20 MHz bandwidth unit that optimizes a PAPR when a contiguous 160 MHz packet is transmitted using one RF, and is as follows. A subcarrier index may be corrected and applied to non-contiguous 160 MHz (i.e., in the following equation (i.e., a phase rotation of −256≤k<0 may be applied to 80 MHz having a low frequency and a phase rotation of 0≤k<256 may be applied to 80 MHz having a high frequency), but may not be optimal from a viewpoint of the PAPR.

In an L-STF, an optimized phase rotation is as follows.
Gamma_k,160=1 if k<−192
j if −192≤k<−128
1 if −128≤k<−64
j if −64≤k<0
−j if 0≤k<64
−1 if 64≤k<128
−j if 128≤k<192
−1 if 192≤k
or
Gamma_k,160=1 if k<−192
−j if −192≤k<−128
1 if −128≤k<−64
−j if −64≤k<0
j if 0≤k<64
−1 if 64≤k<128
j if 128≤k<192
−1 if 192≤k

TABLE 22

| L-STF | L-LTF |
|---|---|
| 8.0872 | 9.3379 |

In an L-LTF, an optimized phase rotation is as follows.
Gamma_k,160=1 if k<−192
1 if −192≤k<−128
−1 if −128≤k<−64
−1 if −64≤k<0
−j if 0≤k<64
j if 64≤k<128
j if 128≤k<192
−j if 192≤k
or
Gamma_k,160=1 if k<−192
1 if −192≤k<−128
−1 if −128≤k<−64
−1 if −64≤k<0
j if 0≤k<64
−j if 64≤k<128
−j if 128≤k<192
j if 192≤k
or
Gamma_k,160=1 if k<−192
−1 if −192≤k<−128
−1 if −128≤k<−64
1 if −64≤k<0
j if 0≤k<64
j if 64≤k<128
−j if 128≤k<192
−j if 192<k
or
Gamma_k,160=1 if k<−192
−1 if −192≤k<−128
−1 if −128≤k<−64
1 if −64≤k<0
−j if 0≤k<64
−j if 64≤k<128
j if 128≤k<192
j if 192≤k

TABLE 23

| L-STF | L-LTF |
|---|---|
| 8.4274 | 9.0720 |

If only the PAPR of contiguous 160 MHz is considered, from the viewpoint of the entire packet, a phase rotation of a second bundle of B. 3) that minimizes the PAPR of an L-LTF having a greater PAPR may be preferred.

C. 240 MHz (if a 240 MHz Band is Indicated as a Subcarrier Index, it Results in −384≤k<383)

240 MHz includes both contiguous 240 MHz/non-contiguous 240 MHz, and non-contiguous 240 MHz may be 160+80/80+160/80+80+80 MHz. Contiguous/non-contiguous 240 MHz phase rotations proposed below may be applied to a 240 MHz portion of a non-contiguous transmission situation of wider 320 MHz without any change.

1) 80 MHz Phase Rotation Repetition

This is the same approach as the method used in the existing 11ax, and can unify a phase rotation in a situation in which a contiguous 240 MHz packet is transmitted using one RF and a situation in which a contiguous/non-contiguous 240 MHz packet is transmitted for each 80 MHz using several RFs. That is, the phase rotation proposed in the 80 MHz may be repeated three times and applied. This may be represented as follows in contiguous 240 MHz, and a maximum PAPR is also as follows.

Gamma_k,240=1 if k<−320
1 if −320≤k<−256
−1 if −256≤k<−192
−1 if −192≤k<−128
1 if −128≤k<−64
1 if −64≤k<0
−1 if 0≤k<64
−1 if 64≤k<128
1 if 128≤k<192
1 if 192≤k<256
−1 if 256≤k<320
−1 if 320≤k

TABLE 24

| L-STF | L-LTF |
|---|---|
| 10.0255 | 10.9473 |

Gamma_k,240=1 if k<−320
−1 if −320≤k<−256
−1 if −256≤k<−192
1 if −192≤k<−128
1 if −128≤k<−64
−1 if −64≤k<0
−1 if 0≤k<64
1 if 64≤k<128
1 if 128≤k<192
−1 if 192≤k<256
−1 if 256≤k<320
1 if 320≤k

TABLE 25

| L-STF | L-LTF |
|---|---|
| 10.0535 | 10.9473 |

Gamma_k,240=1 if k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k

TABLE 26

| L-STF | L-LTF |
|---|---|
| 10.0209 | 10.9826 |

Gamma_k,240=1 if k<−320
−j if −320≤k<−256
1 if −256≤k<−192
−j if −192≤k<−128
1 if −128≤k<−64
−j if −64≤k<0
1 if 0≤k<64

−j if 64≤k<128
1 if 128≤k<192
−j if 192≤k<256
1 if 256≤k<320
−j if 320≤k

TABLE 27

| L-STF | L-LTF |
|---|---|
| 10.0209 | 10.9826 |

Gamma_k,240=1 if k<−320
−1 if −320≤k<−256
−1 if −256≤k<−192
−1 if −192≤k<−128
1 if −128≤k<−64
−1 if −64≤k<0
−1 if 0≤k<64
−1 if 64≤k<128
1 if 128≤k<192
−1 if 192≤k<256
−1 if 256≤k<320
−1 if 320≤k

TABLE 28

| L-STF | L-LTF |
|---|---|
| 11.6318 | 12.7082 |

In non-contiguous 240 MHz, a phase rotation of each contiguous 80/160 MHz may be proposed like 1) of A and B.

A simple repetition phase rotation, such as the above various proposals, has a relatively poor PAPR compared to the proposal of 2) below. In particular, the repetition of the existing phase rotation has a poorer PAPR compared to another phase rotation. Accordingly, the above proposals may not be preferred.

2) 80 MHz Phase Rotation Repetition and Phase Rotation Addition in 80 MHz Bandwidth Unit This is a method of further optimizing a PAPR by repeating the phase rotation of 80 MHz three times and additionally adding and applying the phase rotation in an 80 MHz unit. Since the 80 MHz unit is maintained, this method can unify a phase rotation in a situation in which a contiguous 240 MHz packet is transmitted using one RF and a situation in which a contiguous/non-contiguous 240 MHz packet is transmitted for each 80 MHz using several RFs.

The following illustrates a phase rotation in which an optimized phase rotation is added in the 80 MHz bandwidth unit in an L-STF and a PAPR.

Gamma_k,240=1 if k<−320
1 if −320≤k<−256
−1 if −256≤k<−192
−1 if −192≤k<−128
1 if −128≤k<−64
1 if −64≤k<0
−1 if 0≤k<64
−1 if 64≤k<128
−1 if 128≤k<192
−1 if 192≤k<256
1 if 256≤k<320
1 if 320≤k
or Gamma_k,240=1 if k<−320
1 if −320≤k<−256
−1 if −256≤k<−192
−1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k

TABLE 29

| L-STF | L-LTF |
|---|---|
| 9.8709 | 10.9473 |

Gamma_k,240=1 if k<−320
−1 if −320≤k<−256
−1 if −256≤k<−192
1 if −192≤k<−128
1 if −128≤k<−64
−1 if −64≤k<0
−1 if 0≤k<64
1 if 64≤k<128
−1 if 128≤k<192
1 if 192≤k<256
1 if 256≤k<320
−1 if 320≤k
or
Gamma_k,240=1 if k<−320
−1 if −320≤k<−256
−1 if −256≤k<−192
1 if −192≤k<−128
−1 if −128≤k<−64
1 if −64≤k<0
1 if 0≤k<64
−1 if 64≤k<128
−1 if 128≤k<192
1 if 192≤k<256
1 if 256≤k<320
−1 if 320≤k

TABLE 30

| L-STF | L-LTF |
|---|---|
| 9.9255 | 10.9473 |

Gamma_k,240=1 if k<−320
j if −320≤k<−256
1 if −256≤k<−192
j if −192≤k<−128
j if −128≤k<−64
−1 if −64≤k<0
j if 0≤k<64
−1 if 64≤k<128
1 if 128≤k<192
j if 192≤k<256
1 if 256≤k<320
j if 320≤k
or
Gamma_k,240=1 if k<−320
j if −320≤k<−256
1 if −256≤k<−192
j if −192≤k<−128

−j if −128≤k<−64
1 if −64≤k<0
−j if 0≤k<64
1 if 64≤k<128
1 if 128≤k<192
j if 192≤k<256
1 if 256≤k<320
j if 320≤k

TABLE 31

| L-STF | L-LTF |
|---|---|
| 9.8709 | 10.9473 |

Gamma_k,240=1 if k<−320
−j if −320≤k<−256
1 if −256≤k<−192
−j if −192≤k<−128
j if −128≤k<−64
1 if −64≤k<0
j if 0≤k<64
1 if 64≤k<128
1 if 128≤k<192
−j if 192≤k<256
1 if 256≤k<320
−j if 320≤k
or
Gamma_k,240=1 if k<−320
−j if −320≤k<−256
1 if −256≤k<−192
−j if −192≤k<−128
−j if −128≤k<−64
−1 if −64≤k<0
−j if 0≤k<64
−1 if 64≤k<128
1 if 128≤k<192
−j if 192≤k<256
1 if 256≤k<320
−j if 320≤k

TABLE 32

| L-STF | L-LTF |
|---|---|
| 9.8709 | 10.9473 |

Gamma_k,240=1 if k<−320
−1 if −320≤k<−256
−1 if −256≤k<−192
−1 if −192≤k<−128
j if −128≤k<−64
−j if −64≤k<0
−j if 0≤k<64
−j if 64≤k<128
−j if 128≤k<192
j if 192≤k<256
j if 256≤k<320
j if 320≤k
or
Gamma_k,240=1 if k<−320
−1 if −320≤k<−256
−1 if −256≤k<−192
−1 if −192≤k<−128
j if −128≤k<−64
−j if −64≤k<0
−j if 0≤k<64
−j if 64≤k<128
1 if 128≤k<192
−1 if 192≤k<256
−1 if 256≤k<320
−1 if 320≤k
or
Gamma_k,240=1 if k<−320
−1 if −320≤k<−256
−1 if −256≤k<−192
−1 if −192≤k<−128
−j if −128≤k<−64
j if −64≤k<0
j if 0≤k<64
j if 64≤k<128
1 if 128≤k<192
−1 if 192≤k<256
−1 if 256≤k<320
−1 if 320≤k.
or
Gamma_k,240=1 if k<−320
−1 if −320≤k<−256
−1 if −256≤k<−192
−1 if −192≤k<−128
−j if −128≤k<−64
j if −64≤k<0
j if 0≤k<64
j if 64≤k<128
j if 128≤k<192
−j if 192≤k<256
−j if 256≤k<320
−j if 320≤k

TABLE 33

| L-STF | L-LTF |
|---|---|
| 10.0844 | 11.1641 |

The following illustrates a phase rotation to which an optimized phase rotation is added in an 80 MHz bandwidth unit in an L-LTF and a PAPR.

Gamma_k,240=1 if k<−320
1 if −320≤k<−256
−1 if −256≤k<−192
−1 if −192≤k<−128
−j if −128≤k<−64
−j if −64≤k<0
j if 0≤k<64
j if 64≤k<128
1 if 128≤k<192
1 if 192≤k<256
−1 if 256≤k<320
−1 if 320≤k
or
Gamma_k,240=1 if k<−320
1 if −320≤k<−256
−1 if −256≤k<−192
−1 if −192≤k<−128
j if −128≤k<−64
j if −64≤k<0
−j if 0≤k<64
−j if 64≤k<128
1 if 128≤k<192
1 if 192≤k<256
−1 if 256≤k<320
−1 if 320≤k

TABLE 34

| L-STF | L-LTF |
|---|---|
| 10.0209 | 10.6187 |

Gamma_k,240=1 if k<−320
−1 if −320≤k<−256
−1 if −256≤k<−192
1 if −192≤k<−128
j if −128≤k<−64
−j if −64≤k<0
−j if 0≤k<64
j if 64≤k<128
1 if 128≤k<192
−1 if 192≤k<256
−1 if 256≤k<320
1 if 320≤k
or
Gamma_k,240=1 if k<−320
−1 if −320≤k<−256
−1 if −256≤k<−192
1 if −192≤k<−128
−j if −128≤k<−64
j if −64≤k<0
j if 0≤k<64
−j if 64≤k<128
1 if 128≤k<192
−1 if 192≤k<256
−1 if 256≤k<320
1 if 320≤k

TABLE 35

| L-STF | L-LTF |
|---|---|
| 10.0209 | 10.6030 |

Gamma_k,240=1 if k<−320
j if −320≤k<−256
1 if −256≤k<−192
j if −192≤k<−128
−1 if −128≤k<−64
−j if −64≤k<0
−1 if 0≤k<64
−j if 64≤k<128
−1 if 128≤k<192
−j if 192≤k<256
−1 if 256≤k<320
−j if 320≤k
or
Gamma_k,240=1 if k<−320
j if −320≤k<−256
1 if −256≤k<−192
j if −192≤k<−128
1 if −128≤k<−64
j if −64≤k<0
1 if 0≤k<64
j if 64≤k<128
−1 if 128≤k<192
−j if 192≤k<256
−1 if 256≤k<320
−j if 320≤k

TABLE 36

| L-STF | L-LTF |
|---|---|
| 10.0209 | 10.8554 |

Gamma_k,240=1 if k<−320
−j if −320≤k<−256
1 if −256≤k<−192
−j if −192≤k<−128
1 if −128≤k<−64
−j if −64≤k<0
1 if 0≤k<64
−j if 64≤k<128
−1 if 128≤k<192
j if 192≤k<256
−1 if 256≤k<320
j if 320≤k
or
Gamma_k,240=1 if k<−320
−j if −320≤k<−256
1 if −256≤k<−192
−j if −192≤k<−128
−1 if −128≤k<−64
j if −64≤k<0
−1 if 0≤k<64
j if 64≤k<128
−1 if 128≤k<192
j if 192≤k<256
−1 if 256≤k<320
j if 320≤k

TABLE 37

| L-STF | L-LTF |
|---|---|
| 10.0209 | 10.9826 |

Gamma_k,240=1 if k<−320
−1 if −320≤k<−256
−1 if −256≤k<−192
−1 if −192≤k<−128
j if −128≤k<−64
−j if −64≤k<0
−j if 0≤k<64
−j if 64≤k<128
1 if 128≤k<192
−1 if 192≤k<256
−1 if 256≤k<320
−1 if 320≤k
or
Gamma_k,240=1 if k<−320
−1 if −320≤k<−256
−1 if −256≤k<−192
−1 if −192≤k<−128
−j if −128≤k<−64
j if −64≤k<0
j if 0≤k<64
j if 64≤k<128
1 if 128≤k<192
−1 if 192≤k<256
−1 if 256≤k<320
−1 if 320≤k
or
Gamma_k,240=1 if k<−320
−1 if −320≤k<−256
−1 if −256≤k<−192
−1 if −192≤k<−128 j if $-128 \leq k < -64$
−j if $-64 \leq k < 0$
−j if $0 \leq k < 64$
−j if $64 \leq k < 128$
−j if $128 \leq k < 192$
j if $192 \leq k < 256$
j if $256 \leq k < 320$
j if $320 \leq k$
or
Gamma_k,240=1 if $k < -320$
−1 if $-320 \leq k < -256$
−1 if $-256 \leq k < -192$
−1 if $-192 \leq k < -128$
−j if $-128 \leq k < -64$
j if $-64 \leq k < 0$
j if $0 \leq k < 64$
j if $64 \leq k < 128$
j if $128 \leq k < 192$
−j if $192 \leq k < 256$
−j if $256 \leq k < 320$
−j if $320 \leq k$

TABLE 38

| L-STF | L-LTF |
|---|---|
| 10.0844 | 11.1641 |

A subcarrier index may be corrected and applied to non-contiguous 240 MHz. In the above equation, the phase rotation of $-384 \leq k < -128$ may be applied to 80 MHz having the lowest frequency, the phase rotation of $-128 \leq k < 128$ may be applied to 80 MHz having a next low frequency, and the phase rotation of $128 \leq k < 384$ may be applied to 80 MHz having the highest frequency.

From the viewpoint of unification and the entire packet of a phase rotation of contiguous/non-contiguous 240 MHz, a phase rotation of the seventh bundle that minimizes the PAPR of an L-LTF having a greater PAPR may be preferred.

D. 320 MHz (if a 320 MHz Band is Indicated as a Subcarrier Index, it Results in $-512 \leq k < 511$)

320 MHz includes both contiguous 320 MHz/non-contiguous 320 MHz, and non-contiguous 320 MHz may be 240+80/80+240/160+160/160+80+80/80+160+80/80+80+160/80+80+80+80 MHz.

1) 80 MHz Phase Rotation Repetition

This is the same approach as the method used in the existing 11ax, and can unify a phase rotation in a situation in which a contiguous 320 MHz packet is transmitted using one RF and a situation in which a contiguous/non-contiguous 320 MHz packet is transmitted for each 80 MHz using several RFs. That is, the phase rotation proposed in the above 80 MHz may be repeated four times and applied. In contiguous 320 MHz, the phase rotation may be represented as follows, and a maximum PAPR is also is as follows.

Gamma_k,320=1 if $k < -448$
1 if $-448 \leq k < -384$
−1 if $-384 \leq k < -320$
−1 if $-320 \leq k < -256$
1 if $-256 \leq k < -192$
1 if $-192 \leq k < -128$
−1 if $-128 \leq k < -64$
−1 if $-64 \leq k < 0$
1 if $0 \leq k < 64$
1 if $64 \leq k < 128$
−1 if $128 \leq k < 192$
−1 if $192 \leq k < 256$
1 if $256 \leq k < 320$
1 if $320 \leq k < 384$
−1 if $384 \leq k < 448$
−1 if $448 \leq k < 512$

TABLE 39

| L-STF | L-LTF |
|---|---|
| 11.2703 | 12.1967 |

Gamma_k,320=1 if $k < -448$
−1 if $-448 \leq k < -384$
−1 if $-384 \leq k < -320$
1 if $-320 \leq k < -256$
1 if $-256 \leq k < -192$
−1 if $-192 \leq k < -128$
−1 if $-128 \leq k < -64$
1 if $-64 \leq k < 0$
1 if $0 \leq k < 64$
−1 if $64 \leq k < 128$
−1 if $128 \leq k < 192$
1 if $192 \leq k < 256$
1 if $256 \leq k < 320$
−1 if $320 \leq k < 384$
−1 if $384 \leq k < 448$
1 if $448 \leq k < 512$

TABLE 40

| L-STF | L-LTF |
|---|---|
| 11.2703 | 12.1967 |

Gamma_k,320=1 if $k < -448$
j if $-448 \leq k < -384$
1 if $-384 \leq k < -320$
j if $-320 \leq k < -256$
1 if $-256 \leq k < -192$
j if $-192 \leq k < -128$
1 if $-128 \leq k < -64$
j if $-64 \leq k < 0$
1 if $0 \leq k < 64$
j if $64 \leq k < 128$
1 if $128 \leq k < 192$
j if $192 \leq k < 256$
1 if $256 \leq k < 320$
j if $320 \leq k < 384$
1 if $384 \leq k < 448$
j if $448 \leq k < 512$

TABLE 41

| L-STF | L-LTF |
|---|---|
| 11.2703 | 12.1967 |

Gamma_k,320=1 if $k < -448$
−j if $-448 \leq k < -384$
1 if $-384 \leq k < -320$
−j if $-320 \leq k < -256$
1 if $-256 \leq k < -192$
−j if $-192 \leq k < -128$
1 if $-128 \leq k < -64$
−j if $-64 \leq k < 0$
1 if $0 \leq k < 64$
−j if $64 \leq k < 128$
1 if $128 \leq k < 192$ −j if 192≤k<256
1 if 256≤k<320
−j if 320≤k<384
1 if 384≤k<448
−j if 448≤k<512

TABLE 42

| L-STF | L-LTF |
|---|---|
| 11.2703 | 12.1967 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

TABLE 43

| L-STF | L-LTF |
|---|---|
| 12.8812 | 13.9576 |

In non-contiguous 320 MHz, a phase rotation of each contiguous 80/160/240 MHz may be proposed like 1) of A and B and 1) of C.

A simple repetition phase rotation, such as the above various proposals, has a relatively poor PAPR compared to the proposal of 2) below. In particular, the repetition of the existing phase rotation has a poorer PAPR compared to another phase rotation. Accordingly, the above proposals may not be preferred.

2) 80 MHz Phase Rotation Repetition and Phase Rotation Addition in 80 MHz Bandwidth Unit This is a method of further optimizing a PAPR by repeating the phase rotation of 80 MHz four times and additionally adding and applying the phase rotation in each 80 MHz unit. Since the 80 MHz unit is maintained, this method can unify a phase rotation in a situation a contiguous 320 MHz packet is transmitted using one RF and a situation in which a contiguous/non-contiguous 320 MHz packet is transmitted for each 80 MHz using several RFs.

The following illustrates a phase rotation to which an optimized phase rotation is added in the 80 MHz bandwidth unit in an L-STF and a PAPR.

Gamma_k,320=1 if k<−448
1 if −448≤k<−384
−1 if −384≤k<−320
−1 if −320≤k<−256
j if −256≤k<−192
j if −192≤k<−128
−1 if −128≤k<−64
−j if −64≤k<0
−j if 0≤k<64
−j if 64≤k<128
j if 128≤k<192
j if 192≤k<256
−1 if 256≤k<320
−1 if 320≤k<384
1 if 384≤k<448
1 if 448≤k<512
or
Gamma_k,320=1 if k<−448
1 if −448≤k<−384
−1 if −384≤k<−320
−1 if −320≤k<−256
−j if −256≤k<−192
−j if −192≤k<−128
j if −128≤k<−64
j if −64≤k<0
j if 0≤k<64
j if 64≤k<128
−j if 128≤k<192
−j if 192≤k<256
−1 if 256≤k<320
−1 if 320≤k<384
1 if 384≤k<448
1 if 448≤k<512

TABLE 44

| L-STF | L-LTF |
|---|---|
| 10.6648 | 11.7440 |

Gamma_k,320=1 if k<−448
−1 if −448≤k<−384
−1 if −384≤k<−320
1 if −320≤k<−256
j if −256≤k<−192
−j if −192≤k<−128
−j if −128≤k<−64
j if −64≤k<0
−j if 0≤k<64
j if 64≤k<128
j if 128≤k<192
−j if 192≤k<256
−1 if 256≤k<320
1 if 320≤k<384
1 if 384≤k<448
−1 if 448≤k<512
or
Gamma_k,320=1 if k<−448
−1 if −448≤k<−384
−1 if −384≤k<−320
1 if −320≤k<−256
−j if −256≤k<−192
j if −192≤k<−128
j if −128≤k<−64
−j if −64≤k<0
j if 0≤k<64
−j if 64≤k<128
−j if 128≤k<192
j if 192≤k<256
−1 if 256≤k<320
1 if 320≤k<384
1 if 384≤k<448
−1 if 448≤k<512

TABLE 45

| L-STF | L-LTF |
|---|---|
| 10.5969 | 11.7304 |

Gamma_k,320=1 if k<−448
j if −448≤k<−384
1 if −384≤k<−320
j if −320≤k<−256
j if −256≤k<−192
−1 if −192≤k<−128
j if −128≤k<−64
−1 if −64≤k<0
1 if 0≤k<64
j if 64≤k<128
1 if 128≤k<192
j if 192≤k<256
−j if 256≤k<320
1 if 320≤k<384
−j if 384≤k<448
1 if 448≤k<512
or
Gamma_k,320=1 if k<−448
j if −448≤k<−384
1 if −384≤k<−320
j if −320≤k<−256
−j if −256≤k<−192
1 if −192≤k<−128
−j if −128≤k<−64
1 if −64≤k<0
−1 if 0≤k<64
−j if 64≤k<128
−1 if 128≤k<192
−j if 192≤k<256
−j if 256≤k<320
1 if 320≤k<384
−j if 384≤k<448
1 if 448≤k<512

TABLE 46

| L-STF | L-LTF |
|---|---|
| 10.7636 | 11.7781 |

Gamma_k,320=1 if k<−448
−j if −448≤k<−384
1 if −384≤k<−320
−j if −320≤k<−256
j if −256≤k<−192
1 if −192≤k<−128
j if −128≤k<−64
1 if −64≤k<0
−1 if 0≤k<64
j if 64≤k<128
−1 if 128≤k<192
j if 192≤k<256
j if 256≤k<320
1 if 320≤k<384
j if 384≤k<448
1 if 448≤k<512
or
Gamma_k,320=1 if k<−448
−j if −448≤k<−384
1 if −384≤k<−320
−j if −320≤k<−256
−j if −256≤k<−192
−1 if −192≤k<−128
−j if −128≤k<−64
−1 if −64≤k<0
1 if 0≤k<64
−j if 64≤k<128
1 if 128≤k<192
−j if 192≤k<256
j if 256≤k<320
1 if 320≤k<384
j if 384≤k<448
1 if 448≤k<512

TABLE 47

| L-STF | L-LTF |
|---|---|
| 10.7636 | 11.7781 |

Gamma_k,320=1 if k<−448
−1 if −448≤k<−384
−1 if −384≤k<−320
−1 if −320≤k<−256
j if −256≤k<−192
−j if −192≤k<−128
−j if −128≤k<−64
−j if −64≤k<0
1 if 0≤k<64
−1 if 64≤k<128
−1 if 128≤k<192
−1 if 192≤k<256
j if 256≤k<320
−j if 320≤k<384
−j if 384≤k<448
−j if 448≤k<512
or
Gamma_k,320=1 if k<−448
−1 if −448≤k<−384
−1 if −384≤k<−320
−1 if −320≤k<−256
−j if −256≤k<−192
j if −192≤k<−128
j if −128≤k<−64
j if −64≤k<0
1 if 0≤k<64
−1 if 64≤k<128
−1 if 128≤k<192
−1 if 192≤k<256
−j if 256≤k<320
j if 320≤k<384
j if 384≤k<448
j if 448≤k<512

TABLE 48

| L-STF | L-LTF |
|---|---|
| 10.7392 | 11.8183 |

The following illustrates a phase rotation to which an optimized phase rotation is added in an 80 MHz bandwidth unit in an L-LTF and a PAPR.
Gamma_k,320=1 if k<−448
1 if −448≤k<−384
−1 if −384≤k<−320
−1 if −320≤k<−256
1 if −256≤k<−192

1 if −192≤k<−128
−1 if −128≤k<−64
−1 if −64≤k<0
j if 0≤k<64
j if 64≤k<128
−j if 128≤k<192
−j if 192≤k<256
−j if 256≤k<320
−j if 320≤k<384
j if 384≤k<448
j if 448≤k<512
or
Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
−j if 0≤k<64
−j if 64≤k<128
j if 128≤k<192
j if 192≤k<256
j if 256≤k<320
j if 320≤k<384
−j if 384≤k<448
−j if 448≤k<512
or
Gamma_k,320=1 if k<−448
1 if −448≤k<−384
−1 if −384≤k<−320
−1 if −320≤k<−256
−1 if −256≤k<−192
−1 if −192≤k<−128
1 if −128≤k<−64
1 if −64≤k<0
j if 0≤k<64
j if 64≤k<128
−j if 128≤k<192
−j if 192≤k<256
j if 256≤k<320
j if 320≤k<384
−j if 384≤k<448
−j if 448≤k<512
or
Gamma_k,320=1 if k<−448
1 if −448≤k<−384
−1 if −384≤k<−320
−1 if −320.51<−256
−1 if −256≤k<−192
−1 if −192≤k<−128
1 if −128≤k<−64
1 if −64≤k<0
−j if 0≤k<64
−j if 64≤k<128
j if 128≤k<192
j if 192≤k<256
−j if 256≤k<320
−j if 320≤k<384
j if 384≤k<448
j if 448≤k<512

TABLE 49

| L-STF | L-LTF |
|---|---|
| 10.8912 | 11.7023 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
j if 0≤k<64
−j if 64≤k<128
−j if 128≤k<192
j if 192≤k<256
−j if 256≤k<320
j if 320≤k<384
j if 384≤k<448
−j if 448≤k<512
or
Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
−j if 0≤k<64
j if 64≤k<128
j if 128≤k<192
−j if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
−1 if −256≤k<−192
1 if −192≤k<−128
1 if −128≤k<−64
−1 if −64≤k<0
j if 0≤k<64
−j if 64≤k<128
−j if 128≤k<192
j if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
−1 if −256≤k<−192
1 if −192≤k<−128
1 if −128≤k<−64
−1 if −64≤k<0
−j if 0≤k<64
j if 64≤k<128 j if 128≤k<192
−j if 192≤k<256
−j if 256≤k<320
j if 320≤k<384
j if 384≤k<448
−j if 448≤k<512

TABLE 50

| L-STF | L-LTF |
|---|---|
| 10.9746 | 11.7219 |

Gamma_k,320=1 if k<−448
j if −448≤k<−384
1 if −384≤k<−320
j if −320≤k<−256
j if −256≤k<−192
−1 if −192≤k<−128
j if −128≤k<−64
−1 if −64≤k<0
−j if 0≤k<64
1 if 64≤k<128
−j if 128≤k<192
1 if 192≤k<256
−1 if 256≤k<320
−j if 320≤k<384
−1 if 384≤k<448
−j if 448≤k<512
or
Gamma_k,320=1 if k<−448
j if −448≤k<−384
1 if −384≤k<−320
j if −320≤k<−256
−j if −256≤k<−192
1 if −192≤k<−128
−j if −128≤k<−64
1 if −64≤k<0
j if 0≤k<64
−1 if 64≤k<128
j if 128≤k<192
−1 if 192≤k<256
−1 if 256≤k<320
−j if 320≤k<384
−1 if 384≤k<448
−j if 448≤k<512

TABLE 51

| L-STF | L-LTF |
|---|---|
| 10.8137 | 11.5583 |

Gamma_k,320=1 if k<−448
−j if −448≤k<−384
1 if −384≤k<−320
−j if −320≤k<−256
j if −256≤k<−192
1 if −192≤k<−128
j if −128≤k<−64
1 if −64≤k<0
−j if 0≤k<64
−1 if 64≤k<128
−j if 128≤k<192
−1 if 192≤k<256
−1 if 256≤k<320
j if 320≤k<384
−1 if 384≤k<448
j if 448≤k<512
or
Gamma_k,320=1 if k<−448
−j if −448≤k<−384
1 if −384≤k<−320
−j if −320≤k<−256
−j if −256≤k<−192
−1 if −192 −128
−j if −128≤k<−64
−1 if −64≤k<0
j if 0≤k<64
1 if 64≤k<128
j if 128≤k<192
1 if 192≤k<256
−1 if 256≤k<320
j if 320≤k<384
−1 if 384≤k<448
j if 448≤k<512

TABLE 52

| L-STF | L-LTF |
|---|---|
| 10.8137 | 11.5583 |

Gamma_k,320=1 if k<−448
−1 if −448≤k<−384
−1 if −384≤k<−320
−1 if −320≤k<−256
j if −256≤k<−192
−j if −192≤k<−128
−j if −128≤k<−64
−j if −64≤k<0
1 if 0≤k<64
−1 if 64≤k<128
−1 if 128≤k<192
−1 if 192≤k<256
j if 256≤k<320
−j if 320≤k<384
−j if 384≤k<448
−j if 448≤k<512
or
Gamma_k,320=1 if k<−448
−1 if −448≤k<−384
−1 if −384≤k<−320
−1 if −320≤k<−256
−j if −256≤k<−192
j if −192≤k<−128
j if −128≤k<−64
j if −64≤k<0
1 if 0≤k<64
−1 if 64≤k<128
−1 if 128≤k<192
−1 if 192≤k<256
−j if 256≤k<320
j if 320≤k<384
j if 384≤k<448
j if 448≤k<512

TABLE 53

| L-STF | L-LTF |
|---|---|
| 10.7392 | 11.8183 |

TABLE 54

| L-STF | L-LTF |
|---|---|
| 10.7332 | 12.1712 |

A subcarrier index may also be corrected and applied to non-contiguous 320 MHz. In the above equation, a phase rotation of −512<−256 may be applied to 80 MHz having the lowest frequency, a phase rotation of −256<0 may be applied to 80 MHz having a next lower frequency, a phase rotation of 0≤k<256 may be applied to 80 MHz having a next lower frequency, and a phase rotation of 256≤k<512 may be applied to 80 MHz having the highest frequency.

From the viewpoint of unification and the entire packet of the phase rotation of contiguous/non-contiguous 320 MHz, a phase rotation of the eighth bundle or ninth bundle that minimizes the PAPR of an L-LTF having a greater PAPR may be preferred.

3) 160 MHz Phase Rotation Repetition

This can unify a phase rotation in a situation in which a phase rotation (phase rotation proposed in B) of 160 MHz is repeated twice and applied and a contiguous 320 MHz packet is transmitted using one RF and a situation in which a contiguous/non-contiguous 320 MHz packet is transmitted for each 160 MHz using two RFs. In contiguous 320 MHz, the phase rotation may be represented as follows, and a maximum PAPR is also as follows.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
1 if 0≤k<64
j if 64≤k<128
1 if 128≤k<192
j if 192≤k<256
−j if 256≤k<320
−1 if 320≤k<384
−j if 384≤k<448
−1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
1 if 0≤k<64
−j if 64≤k<128
1 if 128≤k<192
−j if 192≤k<256
j if 256≤k<320
−1 if 320≤k<384
j if 384≤k<448
−1 if 448≤k<512

Gamma_k,320=1 if k<−448
1 if −448≤k<−384
−1 if −384≤k<−320
−1 if −320≤k<−256
−j if −256≤k<−192
j if −192≤k<−128
j if −128≤k<−64
−j if −64≤k<0
1 if 0≤k<64
1 if 64≤k<128
−1 if 128≤k<192
−1 if 192≤k<256
−j if 256≤k<320
j if 320≤k<384
j if 384≤k<448
−j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
1 if 0≤k<64
1 if 64≤k<128
−1 if 128≤k<192
−1 if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
1 if 0≤k<64
−1 if 64≤k<128
−1 if 128≤k<192
1 if 192≤k<256
j if 256≤k<320
j if 320≤k<384
−j if 384≤k<448
−j if 448≤k<512
or
Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
1 if 0≤k<64
−1 if 64≤k<128

−1 if 128≤k<192
1 if 192≤k<256
−j if 256≤k<320
−j if 320≤k<384
j if 384≤k<448
j if 448≤k<512

TABLE 55

| L-STF | L-LTF |
|---|---|
| 11.2703 | 11.8144 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

TABLE 56

| L-STF | L-LTF |
|---|---|
| 12.8812 | 13.9576 |

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k<384
−1 if 384≤k<448
−1 if 448≤k<512

TABLE 57

| L-STF | L-LTF |
|---|---|
| 11.2703 | 12.1967 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
1 if 0≤k<64

−1 if 64≤k<128
−1 if 128≤k<192
1 if 192≤k<256
1 if 256≤k<320
−1 if 320≤k<384
−1 if 384≤k<448
1 if 448≤k<512

TABLE 58

| L-STF | L-LTF |
|---|---|
| 11.2703 | 12.1967 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k<384
1 if 384≤k<448
j if 448≤k<512

TABLE 59

| L-STF | L-LTF |
|---|---|
| 11.2703 | 12.1967 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k<384
1 if 384≤k<448
−j if 448≤k<512

TABLE 60

| L-STF | L-LTF |
|---|---|
| 11.2703 | 12.1967 |

Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0

1 if 0≤k<64
−1 if 64≤k<128
−1 if 128≤k<192
−1 if 192≤k<256
−1 if 256≤k<320
1 if 320≤k<384
1 if 384≤k<448
1 if 448≤k<512

TABLE 61

| L-STF | L-LTF |
|---|---|
| 11.1203 | 12.1967 |

A subcarrier index may be corrected and applied to any type of non-contiguous 320 MHz. In the above equation, a phase rotation of −512≤k<−256 may be applied to 80 MHz having the lowest frequency, a phase rotation of −256≤k<0 may be applied to 80 MHz having a next lower frequency, a phase rotation of 0≤k<256 may be applied to 80 MHz having a next lower frequency, and a phase rotation of 256≤k<512 may be applied to 80 MHz having the highest frequency. In this case, in all the cases, the phase rotation does not always have a good PAPR.

A simple repetition phase rotation, such as the above various proposals, has a relatively poor PAPR compared to a proposal of 4) below. Accordingly, the above proposals may not be preferred.

4) 160 MHz Phase Rotation Repetition and Phase Rotation Addition in 160 MHz Bandwidth Unit This is a method of further optimizing a PAPR by repeating a phase rotation (phase rotation proposed in B) of 160 MHz twice and additionally adding and applying the phase rotation in each 160 MHz unit. Since the 160 MHz unit is maintained, this method can unify a phase rotation in a situation in which a contiguous 320 MHz packet is transmitted using one RF and a situation in which a contiguous/non-contiguous 320 MHz packet is transmitted for each 160 MHz using two RFs.

The following illustrates a phase rotation to which an optimized phase rotation is added in the 160 MHz bandwidth unit in an L-STF and a PAPR.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
1 if 0≤k<64
j if 64≤k<128
1 if 128≤k<192
j if 192≤k<256
−j if 256≤k<320
−1 if 320≤k<384
−j if 384≤k<448
−1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
1 if 0≤k<64
−j if 64≤k<128
1 if 128≤k<192
−j if 192≤k<256
j if 256≤k<320
−1 if 320≤k<384
j if 384≤k<448
−1 if 448≤k<512

TABLE 62

| L-STF | L-LTF |
|---|---|
| 10.7332 | 12.1712 |

Gamma_k,320=1 if k<−448
1 if −448≤k<−384
−1 if −384≤k<−320
−1 if −320≤k<−256
−j if −256≤k<−192
j if −192≤k<−128
j if −128≤k<−64
−j if −64≤k<0
−1 if 0≤k<64
−1 if 64≤k<128
1 if 128≤k<192
1 if 192≤k<256
j if 256≤k<320
−j if 320≤k<384
−j if 384≤k<448
j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
−j if −64≤k<0
−1 if 0≤k<64
−1 if 64≤k<128
1 if 128≤k<192
1 if 192≤k<256
−j if 256≤k<320
j if 320≤k<384
j if 384≤k<448
−j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
−1 if 0≤k<64
1 if 64≤k<128
1 if 128≤k<192
−1 if 192≤k<256
−j if 256≤k<320
−j if 320≤k<384
j if 384≤k<448
j if 448≤k<512
or Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
j if −64≤k<0
−1 if 0≤k<64
1 if 64≤k<128
1 if 128≤k<192
−1 if 192≤k<256
j if 256≤k<320
j if 320≤k<384
−j if 384≤k<448
−j if 448≤k<512

TABLE 63

| L-STF | L-LTF |
|---|---|
| 11.2437 | 11.9909 |

Gamma_k,320=1 if k<−448
−1 if −448≤k<−384
−1 if −384≤k<−320
−1 if −320≤k<−256
1 if −256≤k<−192
−1 if −192 −128
−1 if −128≤k<−64
−1 if −64≤k<0
−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 64

| L-STF | L-LTF |
|---|---|
| 11.1203 | 12.1967 |

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
−1 if 0≤k<64
−1 if 64≤k<128
1 if 128≤k<192
1 if 192≤k<256
−1 if 256≤k<320
−1 if 320≤k<384
1 if 384≤k<448
1 if 448≤k<512

TABLE 65

| L-STF | L-LTF |
|---|---|
| 11.1203 | 12.1967 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
−1 if 0≤k<64
1 if 64≤k<128
1 if 128≤k<192
−1 if 192≤k<256
−1 if 256≤k<320
1 if 320≤k<384
1 if 384≤k<448
−1 if 448≤k<512

TABLE 66

| L-STF | L-LTF |
|---|---|
| 11.1570 | 12.1967 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
−j if 0≤k<64
1 if 64≤k<128
−j if 128≤k<192
1 if 192≤k<256
−j if 256≤k<320
1 if 320≤k<384
−j if 384≤k<448
1 if 448≤k<512

TABLE 67

| L-STF | L-LTF |
|---|---|
| 11.1203 | 12.4082 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
j if 0≤k<64
1 if 64≤k<128
j if 128≤k<192
1 if 192≤k<256
j if 256≤k<320
1 if 320≤k<384
j if 384≤k<448
1 if 448≤k<512

TABLE 68

| L-STF | L-LTF |
|---|---|
| 11.1203 | 12.4082 |

Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0
1 if 0≤k<64
−1 if 64≤k<128
−1 if 128≤k<192
−1 if 192≤k<256
−1 if 256≤k<320
1 if 320≤k<384
1 if 384≤k<448
1 if 448≤k<512
or
Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0
−1 if 0≤k<64
1 if 64≤k<128
1 if 128≤k<192
1 if 192≤k<256
1 if 256≤k<320
−1 if 320≤k<384
−1 if 384≤k<448
−1 if 448≤k<512

TABLE 69

| L-STF | L-LTF |
|---|---|
| 11.1203 | 12.1967 |

The following illustrates a phase rotation to which an optimized phase rotation is added in the 160 MHz bandwidth unit in an L-LTF and a PAPR.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
1 if 0≤k<64
j if 64≤k<128
1 if 128≤k<192
j if 192≤k<256
−j if 256≤k<320
−1 if 320≤k<384
−j if 384≤k<448
−1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
1 if 0≤k<64
−j if 64≤k<128
1 if 128≤k<192
−j if 192≤k<256
j if 256≤k<320
−1 if 320≤k<384
j if 384≤k<448
−1 if 448≤k<512

TABLE 70

| L-STF | L-LTF |
|---|---|
| 10.7332 | 12.1712 |

Gamma_k,320=1 if k<−448
1 if −448≤k<−384
−1 if −384≤k<−320
−1 if −320≤k<−256
−j if −256≤k<−192
j if −192≤k<−128
j if −128≤k<−64
−j if −64≤k<0
1 if 0≤k<64
1 if 64≤k<128
−1 if 128≤k<192
−1 if 192≤k<256
−j if 256≤k<320
j if 320≤k<384
j if 384≤k<448
−j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
1 if 0≤k<64
1 if 64≤k<128
−1 if 128≤k<192
−1 if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
1 if 0≤k<64
−1 if 64≤k<128
−1 if 128≤k<192

1 if 192≤k<256
j if 256≤k<320
j if 320≤k<384
−j if 384≤k<448
−j if 448≤k<512
or
Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
j if −64≤k<0
1 if 0≤k<64
−1 if 64≤k<128
−1 if 128≤k<192
1 if 192≤k<256
−j if 256≤k<320
−j if 320≤k<384
j if 384≤k<448
j if 448≤k<512

TABLE 71

| L-STF | L-LTF |
|---|---|
| 11.2703 | 11.8144 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 72

| L-STF | L-LTF |
|---|---|
| 11.1203 | 12.1967 |

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
j if 0≤k<64
j if 64≤k<128
−j if 128≤k<192
−j if 192≤k<256
j if 256≤k<320
j if 320≤k<384
−j if 384≤k<448
−j if 448≤k<512
or
Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
−j if 0≤k<64
−j if 64≤k<128
j if 128≤k<192
j if 192≤k<256
−j if 256≤k<320
−j if 320≤k<384
j if 384≤k<448
j if 448≤k<512

TABLE 73

| L-STF | L-LTF |
|---|---|
| 11.4557 | 12.0130 |

Gamma_k,320=1 if k<−448
−1 if −448≤k<−384
−1 if −384≤k<−320
1 if −320≤k<−256
1 if −256≤k<−192
−1 if −192 −128
−1 if −128≤k<−64
1 if −64≤k<0
−j if 0≤k<64
j if 64≤k<128
j if 128≤k<192
−j if 192≤k<256
−j if 256≤k<320
j if 320≤k<384
j if 384≤k<448
−j if 448≤k<512
or
Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
j if 0≤k<64
−j if 64≤k<128
−j if 128≤k<192
j if 192≤k<256
j if 256≤k<320
−j if 320≤k<384
−j if 384≤k<448
j if 448≤k<512

TABLE 74

| L-STF | L-LTF |
|---|---|
| 11.4977 | 12.1422 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
−1 if 0≤k<64
−j if 64≤k<128
−1 if 128≤k<192
−j if 192≤k<256
−1 if 256≤k<320
−j if 320≤k<384
−1 if 384≤k<448
−j if 448≤k<512

TABLE 75

| L-STF | L-LTF |
|---|---|
| 11.2703 | 12.0872 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
−1 if 0≤k<64
j if 64≤k<128
−1 if 128≤k<192
j if 192≤k<256
−1 if 256≤k<320
j if 320≤k<384
−1 if 384≤k<448
j if 448≤k<512

TABLE 76

| L-STF | L-LTF |
|---|---|
| 11.2703 | 12.0872 |

Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0
1 if 0≤k<64
−1 if 64≤k<128
−1 if 128≤k<192
−1 if 192≤k<256
−1 if 256≤k<320
1 if 320≤k<384
1 if 384≤k<448
1 if 448≤k<512 or
Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0
−1 if 0≤k<64
1 if 64≤k<128
1 if 128≤k<192
1 if 192≤k<256
1 if 256≤k<320
−1 if 320≤k<384
−1 if 384≤k<448
−1 if 448≤k<512

TABLE 77

| L-STF | L-LTF |
|---|---|
| 11.1203 | 12.1967 |

A subcarrier index may be corrected and applied to any type of non-contiguous 320 MHz. In the above equation, a phase rotation of −512≤k<−256 may be applied to 80 MHz having the lowest frequency, a phase rotation of −256≤k<0 may be applied to 80 MHz having a next lower frequency, a phase rotation of 0≤k<256 may be applied to 80 MHz having a next lower frequency, and a phase rotation of 256≤k<512 may be applied to 80 MHz having the highest frequency. In this case, in all the cases, the phase rotation does not always have a good PAPR.

If a 160 MHz packet is transmitted using one RF, a phase rotation of contiguous/non-contiguous 320 MHz may have a gain from a unification aspect, but may not be preferred because it may not have a good PAPR compared to the proposals of D. 2) from each 80 MHz and 320 MHz aspect.

The proposed phase rotation value may be multiplied by the same value and used (e.g., 1 or −1 or j or −j is multiplied and used), the sequence may be changed and used (e.g., [1 −1 −1 −1 1 −1 −1 −1] is used as [−1 −1 −1 1 −1 −1 −1 1] in order from a low frequency to a high frequency), and the same value may be multiplied and used (e.g., the sequence of [1 −1 −1 −1 1 −1 −1 −1] is changed from a low frequency to a high frequency sequence, and is multiplied by −1 and used as [1 1 1 −1 1 1 1 −1]). In such a case, the phase rotation has the same PAPR.

Figure 16:
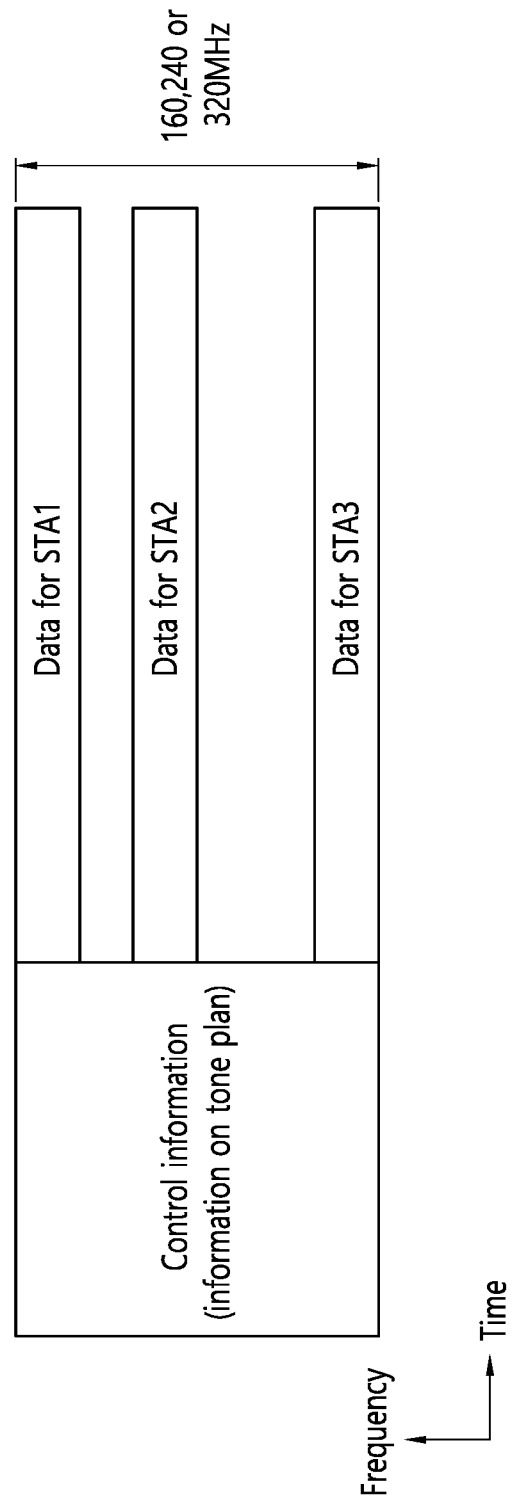
FIG. 16 is a PAPR of an L-SIG in a contiguous 160 MHz to which phase rotation is not applied.

FIG. 16 illustrates an example in which OFDMA transmission is performed in a 160 MHz, 240 MHz or 320 MHz band according to the present embodiment.

Referring to FIG. 16, an AP may transmit a PPDU to a STA 1 to a STA 3.

The PPDU may include control information including information on a tone plan. The STA 1 to the STA 3 may transmit and receive data in an RU unit based on the information on the tone plan in 160 MHz, 240 MHz or 320 MHz.

That is, the AP may transmit the information on the tone plan to all STAs within a BSS in 160 MHz, 240 MHz or 320 MHz. The STA may obtain scheduling information of its data based on the information on the tone plan. Accordingly, the STA 1 to the STA 3 that have data among all the STAs within the BSS may transmit and receive data through RUs assigned based on the information on the tone plan. The data may include both downlink data and uplink data.

Figure 17:
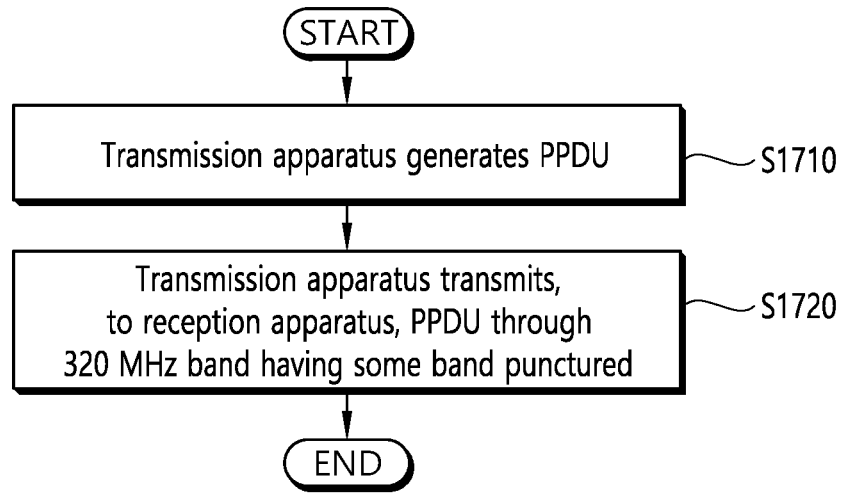
FIG. 17 is a flowchart illustrating a procedure of transmitting a PPDU according to the present embodiment.

FIG. 17 is a flowchart illustrating a procedure of transmitting a PPDU according to the present embodiment.

An example of FIG. 17 may be performed in a network environment a next-generation WLAN system is supported. The next-generation WLAN system is an improved WLAN system of an 802.11ax system, and may satisfy backward compatibility with the 802.11ax system. The next-generation WLAN system may correspond to an extreme high throughput (EHT) WLAN system or an 802.11be WLAN system.

The example of FIG. 17 is performed in a transmission apparatus. The transmission apparatus may correspond to an AP. A reception apparatus may correspond to a (non-AP STA) STA.

The present embodiment relates to a method and apparatus for setting a phase rotation value applied to a legacy preamble for an optimized PAPR if a PPDU is transmitted through an 80, 160, 240, or 320 MHz band and preamble puncturing introduced in 11ax is performed on the band. In this case, only the 320 MHz band is limited and described.

In step S1710, the transmission apparatus generates the physical protocol data unit (PPDU).

In step S1720, the transmission apparatus transmits, to the reception apparatus, the PPDU through the 320 MHz band having some band punctured.

The PPDU includes a legacy preamble and an extreme high throughput (EHT) field. The legacy preamble includes a legacy-short training field (L-STF) and a legacy-long training field (L-LTF). Furthermore, the legacy preamble may further include a legacy-signal (L-SIG). The EHT field may include an EHT-SIG, an EHT-STF, an EHT-LTF and a data field. The legacy field is a field supported by a WLAN system prior to 802.11be, and the EHT field may be a field supported by an 802.11be WLAN system.

The legacy preamble is generated by applying a first phase rotation value or a second phase rotation value. That is, one of the first phase rotation value or the second phase rotation value may be applied to all fields, included in the legacy preamble, in common. The first phase rotation value is a phase rotation value defined for an optimal PAPR of the L-LTF. The second phase rotation value is a phase rotation value defined for an optimal PAPR of the L-STF. For example, if the PAPR of the L-LTF is great, in order to minimize the PAPR, the first phase rotation value may be applied to the legacy preamble. If the PAPR of the L-STF is great, in order to minimize the PAPR, the second phase rotation value may be applied to the legacy preamble.

The first phase rotation value is obtained based on a third phase rotation value and a fourth phase rotation value.

The third phase rotation value is a phase rotation value obtained by repeating a phase rotation value defined for an 80 MHz band in the 802.11ax system. Since the PPDU is transmitted through the 320 MHz band, the third phase rotation value may be obtained by optimizing a PAPR in the L-LTF and repeating the phase rotation value of the 80 MHz band applied in units of a 20 MHz band four times. If the PPDU is transmitted through the 160 MHz band, the third phase rotation value may be obtained by repeating the phase rotation value of the 80 MHz band twice (a PAPR is optimized in the L-LTF and a phase rotation value is applied in units of the 20 MHz band). If the PPDU is transmitted through the 240 MHz band, the third phase rotation value may be obtained by repeating the phase rotation value (the PAPR is optimized in the L-LTF and the phase rotation value is applied in units of the 20 MHz band) three times.

The fourth phase rotation value is a phase rotation value defined in units of an 80 MHz band in the 320 MHz band based on an optimal PAPR of the L-LTF. The 320 MHz band may be divided into four 80 MHz bands. The fourth phase rotation value may be defined for each of the four 80 MHz bands. If the PPDU is transmitted through the 160 MHz band, the fourth phase rotation value may be defined for each of the two 80 MHz bands based on an optimal PAPR of the L-LTF. If the PPDU is transmitted through the 240 MHz band, the fourth phase rotation value may be defined for each of the three 80 MHz bands based on an optimal PAPR of the L-LTF.

That is, the present embodiment proposes a method of additionally performing a phase rotation (the fourth phase rotation value is applied in the L-LTF, and the fifth phase rotation value is applied in the L-STF) in each 80 MHz unit in a full band, while applying a phase rotation value defined in the 80 MHz band (the third phase rotation value is applied).

Hereinafter, a subcarrier range to which a phase rotation value is applied is described.

The 320 MHz band may be composed of subcarriers having subcarrier indices from −512 to 511.

The third phase rotation value may be [1 −1 −1 −1 1 −1 −1 −1 1 −1 −1 −1 1 −1 −1 −1]. The reason for this is that a phase rotation value [1 −1 −1 −1] of an 80 MHz band defined in the 802.11ax system has been repeated four times.

The first 1 of the third phase rotation value may be applied to subcarriers having subcarrier indices from −512 to −449, the second −1 of the third phase rotation value may be applied to subcarriers having subcarrier indices from −448 to −385, the third −1 of the third phase rotation value may be applied to subcarriers having subcarrier indices from −384 to −321, and the fourth −1 of the third phase rotation value may be applied to subcarriers having subcarrier indices from −320 to −257. That is, [1 −1 −1 −1], that is, the first to fourth values of the third phase rotation value, may be applied to the first 80 MHz band of the 320 MHz band.

The fifth 1 of the third phase rotation value may be applied to subcarriers having subcarrier indices from −256 to −193, the sixth −1 of the third phase rotation value may be applied to subcarriers having subcarrier indices from −192 to −129, the seventh −1 of the third phase rotation value may be applied to subcarriers having subcarrier indices from −128 to −65, and the eighth −1 of the third phase rotation value may be applied to subcarriers having subcarrier indices from −64 to −1. That is, [1 −1 −1 −1], that is, the fifth to eighth values of the third phase rotation value, may be applied to the second 80 MHz band of the 320 MHz band.

The ninth 1 of the third phase rotation value may be applied to subcarriers having subcarrier indices from 0 to 63, the tenth −1 of the third phase rotation value may be applied to subcarriers having subcarrier indices from 64 to 127, the eleventh −1 of the third phase rotation value may be applied to subcarriers having subcarrier indices from 128 to 191, and the twelfth −1 of the third phase rotation value may be applied to subcarriers having subcarrier indices from 192 to 255. That is, [1 −1 −1 −1], that is, the ninth to twelfth values of the third phase rotation value, may be applied to the third 80 MHz band of the 320 MHz band.

The thirteenth 1 of the third phase rotation value may be applied to subcarriers having subcarrier indices from 256 to 319, the fourteenth −1 of the third phase rotation value may be applied to subcarriers having subcarrier indices from 320 to 383, the fifteenth −1 of the third phase rotation value may be applied to subcarriers having subcarrier indices from 384 to 447, and the sixteenth −1 of the third phase rotation value may be applied to subcarriers having subcarrier indices from 448 to 511. That is, [1 −1 −1 −1], that is, the thirteenth to sixteenth values of the third phase rotation value, may be applied to the fourth 80 MHz band of the 320 MHz band.

For example, the fourth phase rotation value may be [1 j 1 j]. Since the 320 MHz band has the four 80 MHz bands, the fourth phase rotation value may be defined for each of the four 80 MHz bands.

The first 1 of the fourth phase rotation value may be applied to the first 80 MHz band of the 320 MHz band, the second j of the fourth phase rotation value may be applied to the second 80 MHz band of the 320 MHz band, the third 1 of the fourth phase rotation value may be applied to the third 80 MHz band of the 320 MHz band, and the fourth j of the fourth phase rotation value may be applied to the fourth 80 MHz band of the 320 MHz band.

The first phase rotation value may be obtained based on the product of the third phase rotation value and the fourth phase rotation value. That is, the first phase rotation value may be obtained by multiplying the third phase rotation value and the fourth phase rotation value in a way to be suitable for a frequency band (or subcarrier index). In this case, the first phase rotation value may be [1 −1 −1 −1 j −j −j −j 1 −1 −1 −1 j −j −j −j].

For another example, the fourth phase rotation value may be [1 −j 1 −j].

The first 1 of the fourth phase rotation value may be applied to the first 80 MHz band of the 320 MHz band, the second −j of the fourth phase rotation value may be applied to the second 80 MHz band of the 320 MHz band, the third 1 of the fourth phase rotation value may be applied to the third 80 MHz band of the 320 MHz band, and the fourth −j of the fourth phase rotation value may be applied to the fourth 80 MHz band of the 320 MHz band.

The first phase rotation value may be obtained based on the product of the third phase rotation value and the fourth phase rotation value. That is, the first phase rotation value may be obtained by multiplying the third phase rotation value and the fourth phase rotation value in a way to be suitable for a frequency band (or subcarrier index). In this case, the first phase rotation value may be [1 −1 −1 −1 −j j j j 1 −1 −1 −1 −j j j j].

Furthermore, the second phase rotation value may be obtained based on the third phase rotation value and the fifth phase rotation value.

The fifth phase rotation value may be a phase rotation value defined in units of an 80 MHz band in the 320 MHz band based on an optimal PAPR of the L-STF. The 320 MHz band may be divided into four 80 MHz bands. The fifth phase rotation value may be defined for each of the four 80 MHz bands. If the PPDU is transmitted through the 160 MHz band, the fifth phase rotation value may be defined for each of the two 80 MHz bands based on the optimal PAPR of the L-STF. If the PPDU is transmitted through the 240 MHz band, the fifth phase rotation value may be defined for each of the three 80 MHz bands based on the optimal PAPR of the L-STF.

For example, the fifth phase rotation value may be [1 j 1 j]. Since the 320 MHz band has the four 80 MHz bands, the fifth phase rotation value may be defined for each of the four 80 MHz bands.

The first 1 of the fifth phase rotation value may be applied to the first 80 MHz band of the 320 MHz band, the second j of the fifth phase rotation value may be applied to the second 80 MHz band of the 320 MHz band, the third 1 of the fifth phase rotation value may be applied to the third 80 MHz band of the 320 MHz band, and the fourth j of the fifth phase rotation value may be applied to the fourth 80 MHz band of the 320 MHz band.

The second phase rotation value may be obtained based on the product of the third phase rotation value and the fifth phase rotation value. That is, the second phase rotation value may be obtained by multiplying the third phase rotation value and the fifth phase rotation value in a way to be suitable for a frequency band (or subcarrier index). In this case, the second phase rotation value may be [1 −1 −1 −1 j −j −j −j 1 −1 −1 −1 j −j −j −j].

The some band may include all 20 MHz bands except a primary 20 MHz band. That is, the primary 20 MHz band may be always used for PPDU transmission, but the remaining all the 20 MHz bands except the primary 20 MHz band may not be used for PPDU transmission.

The first and second phase rotation values may be obtained based on a preamble puncturing pattern. The preamble puncturing pattern may be a band pattern obtained by puncturing at least one 20 MHz band of all the 20 MHz bands except the primary 20 MHz band in the 320 MHz band. That is, the preamble puncturing pattern may correspond to patterns in all the cases where at least one 20 MHz band is punctured in the 320 MHz band. In this case, the first and second phase rotation values have one unified form not a method having different values according to the preamble puncturing pattern.

The L-STF may be generated by applying the first phase rotation value or the second phase rotation value to an L-STF sequence. Furthermore, the L-LTF may be generated by applying the first phase rotation value or the second phase rotation value to an L-LTF sequence.

The L-STF sequence may be a sequence in which an L-STF sequence defined for a 20 MHz band is repeated. Since the L-STF is transmitted through the 320 MHz band, the L-STF sequence may be obtained by repeating the L-STF sequence of the 20 MHz band defined in the existing 802.11ax. Likewise, if the L-STF is transmitted through the 160 MHz band, the L-STF sequence of the 20 MHz band defined in the existing 802.11ax may be repeated twice. If the L-STF is transmitted through the 240 MHz band, the L-STF sequence of the 20 MHz band defined in the existing 802.11ax may be repeated three times.

The L-STF sequence defined for the 20 MHz band may be sqrt(½)*[0 0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0].

The L-LTF sequence may be a sequence in which an L-LTF sequence defined for a 20 MHz band is repeated. Since the L-LTF is transmitted through the 320 MHz band, the L-LTF sequence may be obtained by repeating the L-LTF sequence of the 20 MHz band defined in the existing 802.11ax. Likewise, if the L-LTF is transmitted through the 160 MHz band, the L-LTF sequence of the 20 MHz band defined in the existing 802.11ax may be repeated twice. If the L-LTF is transmitted through the 240 MHz band, the L-LTF sequence of the 20 MHz band defined in the existing 802.11ax may be repeated three times.

The L-LTF sequence defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0].

In the aforementioned embodiment, even if the PPDU is transmitted through an 80 MHz, 160 MHz or 240 MHz band, a phase rotation value may be defined and applied to a legacy preamble in the same way.

The EHT-SIG may include an EHT-SIG-A and an EHT-SIG-B. The EHT-SIG-B may include the RU information. That is, an AP may provide notification of information on a tone plan in 160/240/320 MHz through an EHT-SIG-B within a PPDU. Furthermore, the EHT-STF, the EHT-LTF, and the data field included in the EHT field may be transmitted and received in a band (RU) according to a tone plan in 160/240/320 MHz.

Furthermore, the EHT-SIG may be generated by applying the first phase rotation value or the second phase rotation value. If the EHT PPDU has a preamble structure such as 11ax, a field may be generated by applying the same phase rotation value up to the EHT-SIG-B.

FIG. 18 is a flowchart illustrating a procedure of receiving a PPDU according to the present embodiment.

An example of FIG. 18 may be performed in a network environment in which a next-generation WLAN system is supported. The next-generation WLAN system is an improved WLAN system of an 802.11ax system, and may satisfy backward compatibility with the 802.11ax system. The next-generation WLAN system may correspond to an extreme high throughput (EHT) WLAN system or an 802.11be WLAN system.

The example of FIG. 18 is performed in a reception apparatus. The reception apparatus may correspond to a (non-AP STA) STA. A transmission apparatus may correspond to an AP.

The present embodiment relates to a method and apparatus for setting a phase rotation value applied to a legacy preamble for an optimized PAPR if a PPDU is transmitted through an 80, 160, 240, or 320 MHz band and preamble puncturing introduced from 11ax has been performed on the band. In this case, only the 320 MHz band is limited and described.

In step S1810, the reception apparatus receives the PPDU from the transmission apparatus through a 320 MHz band having some band punctured.

In step S1820, the reception apparatus decodes the PPDU.

The PPDU includes a legacy preamble and an extreme high throughput (EHT) field.

The legacy preamble includes a legacy-short training field (L-STF) and a legacy-long training field (L-LTF). Furthermore, the legacy preamble may further include a legacy-signal (L-SIG). The EHT field may include an EHT-SIG, an EHT-STF, an EHT-LTF, and a data field . The legacy field may be a field supported by a WLAN system prior to 802.11be. The EHT field may be a field supported by an 802.11be WLAN system.

The legacy preamble is generated by applying a first phase rotation value or a second phase rotation value. That is, one of the first phase rotation value or the second phase rotation value may be applied to all the fields included in the legacy preamble in common. The first phase rotation value is a phase rotation value defined for an optimal PAPR of an L-LTF. The second phase rotation value is a phase rotation value defined for an optimal PAPR of an L-STF. For example, if the PAPR of the L-LTF is great, in order to minimize the PAPR, the first phase rotation value may be applied to the legacy preamble. If the PAPR of the L-STF is great, in order to minimize the PAPR, the second phase rotation value may be applied to the legacy preamble.

The first phase rotation value is obtained based on a third phase rotation value and a fourth phase rotation value.

The third phase rotation value is a phase rotation value obtained by repeating a phase rotation value defined for an 80 MHz band in an 802.11ax system. Since the PPDU is transmitted through the 320 MHz band, the third phase rotation value may be obtained by optimizing a PAPR in the L-LTF and repeating the phase rotation value of the 80 MHz band applied in units of a 20 MHz band. If the PPDU is transmitted through the 160 MHz band, the third phase rotation value may be obtained by repeating the phase rotation value of the 80 MHz band (the PAPR is optimized in the L-LTF and the phase rotation value is applied in units of the 20 MHz band) twice. If the PPDU is transmitted through the 240 MHz band, the third phase rotation value may be obtained by repeating the phase rotation value three times (a PAPR is optimized in the L-LTF and a phase rotation value is applied in units of the 20 MHz band).

The fourth phase rotation value is a phase rotation value defined in units of an 80 MHz band in the 320 MHz band based on an optimal PAPR of the L-LTF. The 320 MHz band may be divided into four 80 MHz bands. The fourth phase rotation value may be defined for each of the four 80 MHz bands. If the PPDU is transmitted through the 160 MHz band, the fourth phase rotation value may be defined for each of the two 80 MHz bands based on an optimal PAPR of the L-LTF. If the PPDU is transmitted through the 240 MHz band, the fourth phase rotation value may be defined for each of the three 80 MHz bands based on an optimal PAPR of the L-LTF.

That is, the present embodiment proposes a method of additionally performing a phase rotation (the fourth phase rotation value is applied in the L-LTF, and the fifth phase rotation value is applied in the L-STF) in each 80 MHz unit in a full band, while applying a phase rotation value defined in an 80 MHz band (the third phase rotation value is applied).

Hereinafter, a subcarrier range to which a phase rotation value is applied is described.

The 320 MHz band may be composed of subcarriers having subcarrier indices from −512 to 511.

The third phase rotation value may be [1 −1 −1 −1 1 −1 −1 −1 1 −1 −1 −1 1 −1 −1 −1]. The reason for this is that the phase rotation values [1 −1 −1 −1] of the 80 MHz band defined in the 802.11ax system have been repeated four times.

The first 1 of the third phase rotation value may be applied to subcarriers having subcarrier indices from −512 to −449, the second −1 of the third phase rotation value may be applied to subcarriers having subcarrier indices from −448 to −385, the third −1 of the third phase rotation value may be applied to subcarriers having subcarrier indices from −384 to −321, and the fourth −1 of the third phase rotation value may be applied to subcarriers having subcarrier indices from −320 to −257. That is, [1 −1 −1 −1], that is, the first to fourth values of the third phase rotation value, may be applied to the first 80 MHz band of the 320 MHz band.

The fifth 1 of the third phase rotation value may be applied to subcarriers having subcarrier indices from −256 to −193, the sixth −1 of the third phase rotation value may be applied to subcarriers having subcarrier indices from −192 to −129, the seventh −1 of the third phase rotation value may be applied to subcarriers having subcarrier indices from −128 to −65, and the eighth −1 of the third phase rotation value may be applied to subcarriers having subcarrier indices from −64 to −1. That is, [1 −1. −1 −1], that is, the fifth to eighth values of the third phase rotation value, may be applied to the second 80 MHz band of the 320 MHz band.

The ninth 1 of the third phase rotation value may be applied to subcarriers having subcarrier indices from 0 to 63, the tenth −1 of the third phase rotation value may be applied to subcarriers having subcarrier indices from 64 to 127, the eleventh −1 of the third phase rotation value may be applied to subcarriers having subcarrier indices from 128 to 191, and the twelfth −1 of the third phase rotation value may be applied to subcarriers having subcarrier indices from 192 to 255. That is, [1 −1 −1 −1], that is, the ninth to twelfth values of the third phase rotation value may be applied to the third 80 MHz band of the 320 MHz band.

The thirteenth 1 of the third phase rotation value may be applied to subcarriers having subcarrier indices from 256 to 319, the fourteenth −1 of the third phase rotation value may be applied to subcarriers having subcarrier indices from 320 to 383, the fifteenth −1 of the third phase rotation value may be applied to subcarriers having subcarrier indices from 384 to 447, and the sixteenth −1 of the third phase rotation value may be applied to subcarriers having subcarrier indices from 448 to 511. That is, [1 −1 −1 −1], that is, the thirteenth to sixteenth values of the third phase rotation value, may be applied to the fourth 80 MHz band of the 320 MHz band.

For example, the fourth phase rotation value may be [1 j 1 j]. Since the 320 MHz band has the four 80 MHz bands, the fourth phase rotation value may be defined for each of the four 80 MHz bands.

The first 1 of the fourth phase rotation value may be applied to the first 80 MHz band of the 320 MHz band, the second j of the fourth phase rotation value may be applied to the second 80 MHz band of the 320 MHz band, the third 1 of the fourth phase rotation value may be applied to the third 80 MHz band of the 320 MHz band, and the fourth j of the fourth phase rotation value may be applied to the fourth 80 MHz band of the 320 MHz band.

The first phase rotation value may be obtained based on the product of the third phase rotation value and the fourth phase rotation value. That is, the first phase rotation value may be obtained by multiplying the third phase rotation value and the fourth phase rotation value in a way to be suitable for a frequency band (or subcarrier index). In this case, the first phase rotation value may be [1 −1 −1 −1 j −j −j −j 1 −1 −1 −1 j −j −j −j].

For another example, the fourth phase rotation value may be [1 −j 1 −j].

The first 1 of the fourth phase rotation value may be applied to the first 80 MHz band of the 320 MHz band, the second −j of the fourth phase rotation value may be applied to the second 80 MHz band of the 320 MHz band, the third 1 of the fourth phase rotation value may be applied to the third 80 MHz band of the 320 MHz band, and the fourth −j of the fourth phase rotation value may be applied to the fourth 80 MHz band of the 320 MHz band.

The first phase rotation value may be obtained based on the product of the third phase rotation value and the fourth phase rotation value. That is, the first phase rotation value may be obtained by multiplying the third phase rotation value and the fourth phase rotation value in a way to be suitable for a frequency band (or subcarrier index). In this case, the first phase rotation value may be [1 −1 −1 −1 −j j j j 1 −1 −1 −1 −j j j j].

Furthermore, the second phase rotation value may be obtained based on the third phase rotation value and the fifth phase rotation value.

The fifth phase rotation value may be a phase rotation value defined in units of an 80 MHz band in the 320 MHz band based on an optimal PAPR of the L-STF. The 320 MHz band may be divided into four 80 MHz bands. The fifth phase rotation value may be defined for each of the four 80 MHz bands. If the PPDU is transmitted through the 160 MHz band, the fifth phase rotation value may be defined for each of the two 80 MHz bands based on the optimal PAPR of the L-STF. If the PPDU is transmitted through the 240 MHz band, the fifth phase rotation value may be defined for each of the three 80 MHz bands based on the optimal PAPR of the L-STF.

For example, the fifth phase rotation value may be [1 j 1 j]. Since the 320 MHz band has the four 80 MHz bands, the fifth phase rotation value may be defined for each of the four 80 MHz bands.

The first 1 of the fifth phase rotation value may be applied to the first 80 MHz band of the 320 MHz band, the second j of the fifth phase rotation value may be applied to the second 80 MHz band of the 320 MHz band, the third −1 of the fifth phase rotation value may be applied to the third 80 MHz band of the 320 MHz band, and the fourth −j of the fifth phase rotation value may be applied to the fourth 80 MHz band of the 320 MHz band.

The second phase rotation value may be obtained based on the product of the third phase rotation value and the fifth phase rotation value. That is, the second phase rotation value may be obtained by multiplying the third phase rotation value and the fifth phase rotation value in a way to be suitable for a frequency band (or subcarrier index). In this case, the second phase rotation value may be [1 −1 −1 −1 j −j −j −j 1 −1 −1 −1 j −j −j j].

The some band may include all 20 MHz bands except a primary 20 MHz band. That is, the primary 20 MHz band may be always used for PPDU transmission, but the remaining all the 20 MHz bands except the primary 20 MHz band may not be used for PPDU transmission.

The first and second phase rotation values may be obtained based on a preamble puncturing pattern. The preamble puncturing pattern may be a band pattern obtained by puncturing at least one 20 MHz band of all the 20 MHz bands except the primary 20 MHz band in the 320 MHz band. That is, the preamble puncturing pattern may correspond to patterns in all the cases where at least one 20 MHz band in the 320 MHz band is punctured. In this case, the first and second phase rotation values have one unified form not a method having different values according to the preamble puncturing pattern.

The L-STF may be generated by applying the first phase rotation value or the second phase rotation value to an L-STF sequence. Furthermore, the L-LTF may be generated by applying the first phase rotation value or the second phase rotation value to an L-LTF sequence.

The L-STF sequence may be a sequence in which an L-STF sequence defined for a 20 MHz band is repeated. Since the L-STF is transmitted through the 320 MHz band, the L-STF sequence may be obtained by repeating the L-STF sequence of a 20 MHz band defined in the existing 802.11ax. Likewise, if the L-STF is transmitted through the 160 MHz band, the L-STF sequence of the 20 MHz band defined in the existing 802.11ax may be repeated twice. If the L-STF is transmitted through the 240 MHz band, the L-STF sequence of the 20 MHz band defined in the existing 802.11ax may be repeated three times.

The L-STF sequence defined for a 20 MHz band is sqrt(½)*[0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0].

The L-LTF sequence may be a sequence in which an L-LTF sequence defined for a 20 MHz band is repeated. Since the L-LTF is transmitted through the 320 MHz band, the L-LTF sequence may be obtained by repeating the L-LTF sequence of the 20 MHz band defined in the existing 802.11ax. Likewise, if the L-LTF is transmitted through the 160 MHz band, the L-LTF sequence of the 20 MHz band defined in the existing 802.11ax may be repeated twice. If the L-LTF is transmitted through the 240 MHz band, the L-LTF sequence of the 20 MHz band defined in the existing 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0].

In the aforementioned embodiment, even if the PPDU is transmitted through an 80 MHz, 160 MHz or 240 MHz band, a phase rotation value may be defined and applied to a legacy preamble in the same way.

The EHT-SIG may include an EHT-SIG-A and an EHT-SIG-B. The EHT-SIG-B may include the RU information. That is, an AP may provide notification of information on a tone plan in 160/240/320 MHz through the EHT-SIG-B within the PPDU. Furthermore, the EHT-STF, the EHT-LTF, and the data field included in the EHT field may be transmitted and received in a band (RU) according to a tone plan in 160/240/320 MHz.

Furthermore, the EHT-SIG may be generated by applying the first phase rotation value or the second phase rotation value. If the EHT PPDU has the same preamble structure as 11ax, a field may be generated by applying the same phase rotation value up to the EHT-SIG-B.

5. Apparatus Configuration

Figure 19:
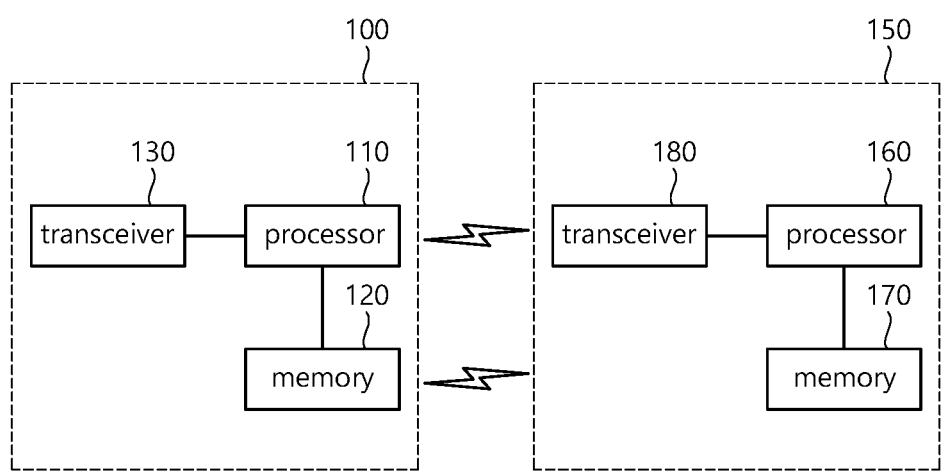
FIG. 19 is a diagram for describing a device for implementing the above-described method.

FIG. 19 is a diagram for describing an apparatus for implementing the aforementioned method.

A wireless apparatus 100 of FIG. 19 is a transmission apparatus capable of implementing the aforementioned embodiment, and may operate as an AP STA. A wireless apparatus 150 of FIG. 19 is a reception apparatus capable of implementing the aforementioned embodiment, and may operate as a non-AP STA.

The transmitting device 100 may include a processor 110, a memory 120, and a transmitting/receiving unit 130, and the receiving device 150 may include a processor 160, a memory 170, and a transmitting/receiving unit 180. The transmitting/receiving unit 130, 180 transmits/receives a radio signal and may be operated in a physical layer of IEEE 802.11/3GPP, and so on. The processor 110, 160 may be operated in the physical layer and/or MAC layer and may be operatively connected to the transmitting/receiving unit 130, 180.

The processor 110, 160 and/or the transmitting/receiving unit 130, 180 may include application-specific integrated circuit (ASIC), other chipset, logic circuit and/or data processor. The memory 120, 170 may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory 120, 170 and executed by the processor 110, 160. The memory 120, 170 can be implemented (or positioned) within the processor 110, 160 or external to the processor 110, 160. Also, the memory 120, 170 may be operatively connected to the processor 110, 160 via various means known in the art.

The processor 110, 160 may implement the functions, processes and/or methods proposed in the present disclosure. For example, the processor 110, 160 may perform the operation according to the present embodiment.

An operation of the processor 110 of the transmission apparatus is specifically as follows. The processor 110 of the transmission apparatus generates a PPDU, and transmits the PPDU through a 160/240/320 MHz band having some band punctured.

An operation of the processor 160 of the reception apparatus specifically is as follows. The processor 160 of the reception apparatus receives a PPDU, generated by the transmission apparatus, through a 160/240/320 MHz band having some band punctured, and decodes the PPDU with respect to a band supported by the reception apparatus.

Figure 20:
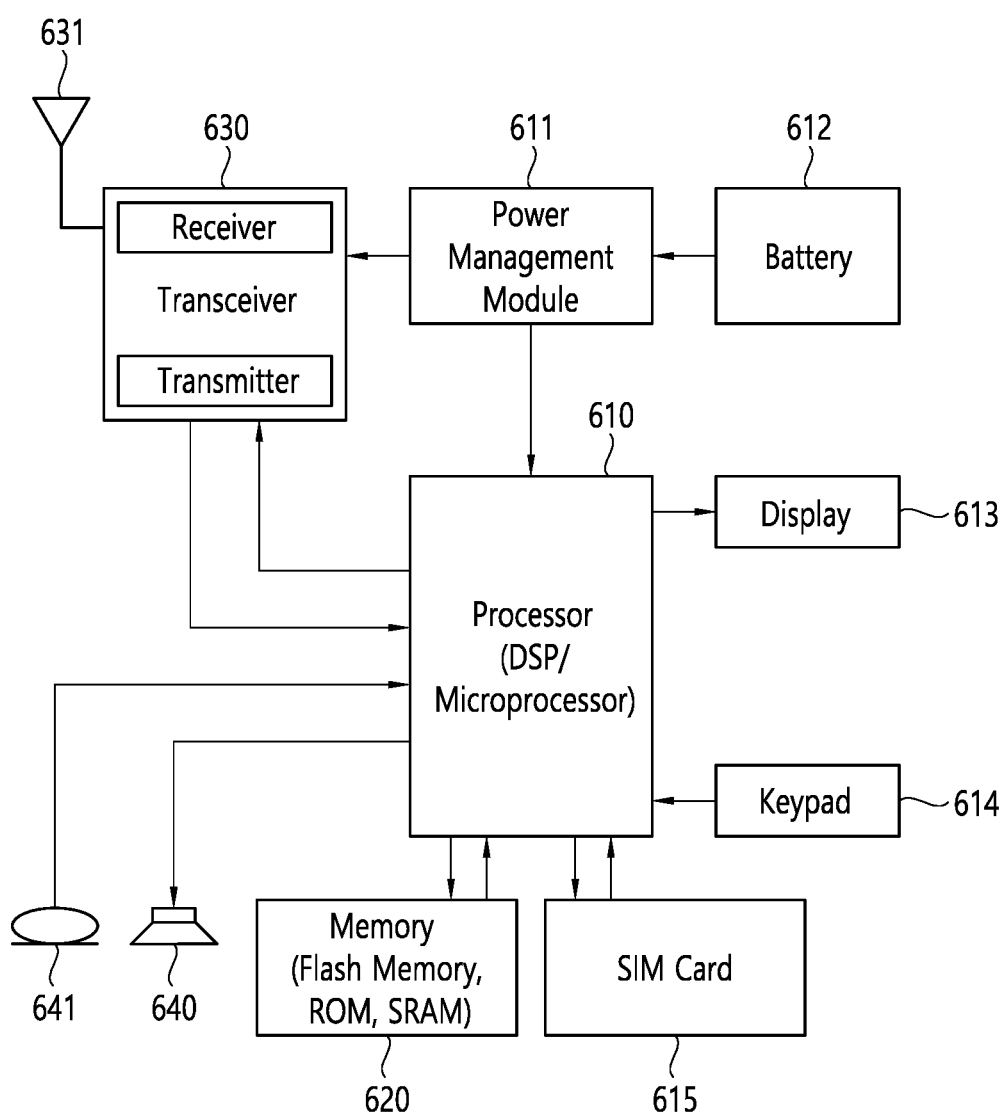
FIG. 20 illustrates a more detailed wireless device for implementing the embodiment of the present disclosure.

FIG. 20 shows a UE to which the technical features of the present disclosure can be applied.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In the case of the transmission apparatus, the processor 610 generates a PPDU and transmits the PPDU through a 160/240/320 MHz band having some band punctured.

In the case of the reception apparatus, the processor 610 receives a PPDU, generated by the transmission apparatus, through a 160/240/320 MHz band having some band punctured, and decodes the PPDU with a band supported by the reception apparatus.

The PPDU includes a legacy preamble and an extreme high throughput (EHT) field. The legacy preamble includes a legacy-short training field (L-STF) and a legacy-long training field (L-LTF). Furthermore, the legacy preamble may further include a legacy-signal (L-SIG). The EHT field may include an EHT-SIG, an EHT-STF, an EHT-LTF, and a data field. The legacy field is a field supported by a WLAN system prior to 802.11be. The EHT field may be a field supported by an 802.11be WLAN system.

The legacy preamble is generated by applying a first phase rotation value or a second phase rotation value. That is, one of the first phase rotation value or the second phase rotation value may be applied to all the fields included in the legacy preamble in common. The first phase rotation value is a phase rotation value defined for an optimal PAPR of the L-LTF. The second phase rotation value is a phase rotation value defined for an optimal PAPR of the L-STF. For example, if the PAPR of the L-LTF is great, in order to minimize the PAPR, the first phase rotation value may be applied to the legacy preamble. If the PAPR of the L-STF is great, in order to minimize the PAPR, the second phase rotation value may be applied to the legacy preamble.

The first phase rotation value is obtained based on a third phase rotation value and a fourth phase rotation value.

The third phase rotation value is a phase rotation value obtained by repeating a phase rotation value defined for an 80 MHz band in an 802.11ax system. Since the PPDU is transmitted through the 320 MHz band, the third phase rotation value may be obtained by optimizing a PAPR in the L-LTF and repeating the phase rotation value of the 80 MHz band applied in units of a 20 MHz band. If the PPDU is transmitted through the 160 MHz band, the third phase rotation value may be obtained by repeating the phase rotation value of the 80 MHz band (the PAPR is optimized in the L-LTF and the phase rotation value is applied in units of the 20 MHz band) twice. If the PPDU is transmitted through the 240 MHz band, the third phase rotation value may be obtained by repeating the phase rotation value (the PAPR is optimized in the L-LTF and the phase rotation value is applied in units of the 20 MHz band) three times.

The fourth phase rotation value is a phase rotation value defined in units of an 80 MHz band in the 320 MHz band based on an optimal PAPR of the L-LTF. The 320 MHz band may be divided into four 80 MHz bands. The fourth phase rotation value may be defined for each of the four 80 MHz bands. If the PPDU is transmitted through the 160 MHz band, the fourth phase rotation value may be defined for each of the two 80 MHz bands based on the optimal PAPR of the L-LTF. If the PPDU is transmitted through the 240 MHz band, the fourth phase rotation value may be defined for each of the three 80 MHz bands based on the optimal PAPR of the L-LTF.

That is, the present embodiment proposes a method of additionally performing a phase rotation (the fourth phase rotation value is applied in the L-LTF, and the fifth phase rotation value is applied in the L-STF) in each 80 MHz unit in a full band, while applying a phase rotation value defined in the 80 MHz band (the third phase rotation value is applied).

Hereinafter, a subcarrier range to which a phase rotation value is applied is described.

The 320 MHz band may be composed of subcarriers having subcarrier indices from −512 to 511.

The third phase rotation value may be [1 −1 −1 −1 1 −1 −1 −1 1 −1 −1 −1 1 −1 −1 −1]. The reason for this is that the phase rotation values [1 −1 −1 −1] of the 80 MHz band defined in the 802.11ax system have been repeated four times.

The first 1 of the third phase rotation value may be applied to subcarriers having subcarrier indices from −512 to −449, the second −1 of the third phase rotation value may be applied to subcarriers having subcarrier indices from −448 to −385, the third −1 of the third phase rotation value may be applied to subcarriers having subcarrier indices from −384 to −321, the fourth −1 of the third phase rotation value may be applied to subcarriers having subcarrier indices from −320 to −257. That is, [1 −1 −1 −1], that is, the first to fourth values of the third phase rotation value, may be applied to the first 80 MHz band of the 320 MHz band.

The fifth 1 of the third phase rotation value may be applied to subcarriers having subcarrier indices from −256 to −193, the sixth −1 of the third phase rotation value may be applied to subcarriers having subcarrier indices from −192 to −129, the seventh −1 of the third phase rotation value may be applied to subcarriers having subcarrier indices from −128 to −65, and the eighth −1 of the third phase rotation value may be applied to subcarriers having subcarrier indices from −64 to −1. That is, [1 −1 −1 −1], that is, the fifth to eighth values of the third phase rotation value, may be applied to the second 80 MHz band of the 320 MHz band.

The ninth 1 of the third phase rotation value may be applied to subcarriers having subcarrier indices from 0 to 63, the tenth −1 of the third phase rotation value may be applied to subcarriers having subcarrier indices from 64 to 127, the eleventh −1 of the third phase rotation value may be applied to subcarriers having subcarrier indices from 128 to 191, and the twelfth −1 of the third phase rotation value may be applied to subcarriers having subcarrier indices from 192 to 255. That is, [1 −1 −1 −1], that is, the ninth to twelfth values of the third phase rotation value, may be applied to the third 80 MHz band of the 320 MHz band.

The thirteenth 1 of the third phase rotation value may be applied to subcarriers having subcarrier indices from 256 to 319, the fourteenth −1 of the third phase rotation value may be applied to subcarriers having subcarrier indices from 320 to 383, the fifteenth −1 of the third phase rotation value may be applied to subcarriers having subcarrier indices from 384 to 447, and the sixteenth −1 of the third phase rotation value may be applied to subcarriers having subcarrier indices from 448 to 511. That is, [1 −1 −1 −1], that is, the thirteenth to sixteenth values of the third phase rotation value, may be applied to the fourth 80 MHz band of the 320 MHz band.

For example, the fourth phase rotation value may be [1 j 1 j]. Since the 320 MHz band has the four 80 MHz bands, the fourth phase rotation value may be defined for each of the four 80 MHz bands.

The first 1 of the fourth phase rotation value may be applied to the first 80 MHz band of the 320 MHz band, the second j of the fourth phase rotation value may be applied to the second 80 MHz band of the 320 MHz band, the third 1 of the fourth phase rotation value may be applied to the third 80 MHz band of the 320 MHz band, and the fourth j of the fourth phase rotation value may be applied to the fourth 80 MHz band of the 320 MHz band.

The first phase rotation value may be obtained based on the product of the third phase rotation value and the fourth phase rotation value. That is, the first phase rotation value may be obtained by multiplying the third phase rotation value and the fourth phase rotation value in a way to be suitable for a frequency band (or subcarrier index). In this case, the first phase rotation value may be [1 −1 −1 −1 j −j −j −j 1 −1 −1 −1 j −j −j j].

For another example, the fourth phase rotation value may be [1 −j 1 j].

The first 1 of the fourth phase rotation value may be applied to the first 80 MHz band of the 320 MHz band, the second −j of the fourth phase rotation value may be applied to the second 80 MHz band of the 320 MHz band, the third 1 of the fourth phase rotation value may be applied to the third 80 MHz band of the 320 MHz band, and the fourth −j of the fourth phase rotation value may be applied to the fourth 80 MHz band of the 320 MHz band.

The first phase rotation value may be obtained based on the product of the third phase rotation value and the fourth phase rotation value. That is, the first phase rotation value may be obtained by multiplying the third phase rotation value and the fourth phase rotation value in a way to be suitable for a frequency band (or subcarrier index). In this case, the first phase rotation value may be [1 −1 −1 −1 −j j j j 1 −1 −1 −1 −j j j j].

Furthermore, the second phase rotation value may be obtained based on the third phase rotation value and the fifth phase rotation value.

The fifth phase rotation value may be a phase rotation value defined in units of an 80 MHz band in the 320 MHz band based on an optimal PAPR of the L-STF. The 320 MHz band may be divided into four 80 MHz bands. The fifth phase rotation value may be defined for each of the four 80 MHz bands. If the PPDU is transmitted through the 160 MHz band, the fifth phase rotation value may be defined for each of the two 80 MHz bands based on the optimal PAPR of the L-STF. If the PPDU is transmitted through the 240 MHz band, the fifth phase rotation value may be defined for each of the three 80 MHz bands based on the optimal PAPR of the L-STF.

For example, the fifth phase rotation value may be [1 j 1 j]. Since the 320 MHz band has the four 80 MHz bands, the fifth phase rotation value may be defined for each of the four 80 MHz bands.

The first 1 of the fifth phase rotation value may be applied to the first 80 MHz band of the 320 MHz band, the second j of the fifth phase rotation value may be applied to the second 80 MHz band of the 320 MHz band, the third 1 of the fifth phase rotation value may be applied to the third 80 MHz band of the 320 MHz band, and the fourth j of the fifth phase rotation value may be applied to the fourth 80 MHz band of the 320 MHz band.

The second phase rotation value may be obtained based on the product of the third phase rotation value and the fifth phase rotation value. That is, the second phase rotation value may be obtained by multiplying the third phase rotation value and the fifth phase rotation value in a way to be suitable for a frequency band (or subcarrier index). In this case, the second phase rotation value may be [1 −1 −1 −1 j −j −j −j 1 −1 −1 −1 j −j −j −j].

The some band may include all 20 MHz bands except a primary 20 MHz band. That is, the primary 20 MHz band may be always used for PPDU transmission, but the remaining all the 20 MHz bands except the primary 20 MHz band may not be used for PPDU transmission.

The first and second phase rotation values may be obtained based on a preamble puncturing pattern. The preamble puncturing pattern may be a band pattern obtained by puncturing at least one 20 MHz band of all the 20 MHz bands except the primary 20 MHz band in the 320 MHz band. That is, the preamble puncturing pattern may correspond to patterns in all the cases where at least one 20 MHz band in the 320 MHz band is punctured. In this case, the first and second phase rotation values have one unified form, not a method having different values according to the preamble puncturing pattern.

The L-STF may be generated by applying the first phase rotation value or the second phase rotation value to an L-STF sequence. Furthermore, the L-LTF may be generated by applying the first phase rotation value or the second phase rotation value to an L-LTF sequence.

The L-STF sequence may be a sequence in which an L-STF sequence defined for a 20 MHz band is repeated. Since the L-STF is transmitted through the 320 MHz band, the L-STF sequence may be obtained by repeating the L-STF sequence of the 20 MHz band defined in the existing 802.11ax. Likewise, if the L-STF is transmitted through the 160 MHz band, the L-STF sequence of the 20 MHz band defined in the existing 802.11ax may be repeated twice. If the L-STF is transmitted through the 240 MHz band, the L-STF sequence of the 20 MHz band defined in the existing 802.11ax may be repeated three times.

The L-STF sequence defined for a 20 MHz band is sqrt(½)*[0 0 0 0 0 0 0 0 1 +j 0 0 0 −1 −j 0 0 0 1 +j 0 0 0 −1 −j 0 0 0 −1 −j 0 0 0 1 +j 0 0 0 0 0 0 −1 −j 0 0 0 −1 −j 0 0 0 1 +j 0 0 0 1 +j 0 0 0 1 +j 0 0 0 1 +j 0 0 0 0 0 0].

The L-LTF sequence may be a sequence in which an L-LTF sequence defined for a 20 MHz band is repeated. Since the L-LTF is transmitted through the 320 MHz band, the L-LTF sequence may be obtained by repeating the L-LTF sequence of the 20 MHz band defined in the existing 802.11ax. Likewise, if the L-LTF is transmitted through the 160 MHz band, the L-LTF sequence of the 20 MHz band defined in the existing 802.11ax may be repeated twice. If the L-LTF is transmitted through the 240 MHz band, the L-LTF sequence of the 20 MHz band defined in the existing 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 1 −1 −1 −1 −1 −1 1 1 −1 −1 1 −1 1 −1 1 1 1 1 0 0 0 0 0].

In the aforementioned embodiment, even if the PPDU is transmitted through an 80 MHz, 160 MHz or 240 MHz band, the phase rotation value may be defined and applied to a legacy preamble in the same way.

The EHT-SIG may include an EHT-SIG-A and an EHT-SIG-B. The EHT-SIG-B may include the RU information. That is, an AP may provide notification of information on a tone plan in 160/240/320 MHz through the EHT-SIG-B within the PPDU. Furthermore, the EHT-STF, the EHT-LTF, and the data field included in the EHT field may be transmitted and received in a band (RU) according to a tone plan in 160/240/320 MHz.

Furthermore, the EHT-SIG may be generated by applying the first phase rotation value or the second phase rotation value. If the EHT PPDU has the same preamble structure as that of 11ax, a field may be generated by applying the same phase rotation value up to the EHT-SIG-B.

What is claimed is:

1. A method of transmitting a physical protocol data unit (PPDU) in a WLAN system, comprising:
generating, by a transmission apparatus, the PPDU; and
transmitting, by the transmission apparatus, the PPDU to a reception apparatus through a 320 MHz band having some band punctured,
wherein the PPDU comprises a legacy preamble and an extreme high throughput (EHT) field,
the legacy preamble comprises a legacy-short training field (L-STF) and a legacy-long training field (L-LTF),
the legacy preamble is generated by applying a first phase rotation value or a second phase rotation value,
the first phase rotation value is obtained based on a third phase rotation value and a fourth phase rotation value,
the third phase rotation value is a phase rotation value obtained by repeating a phase rotation value defined for an 80 MHz band in an 802.11ax system,
the fourth phase rotation value is a phase rotation value defined in units of an 80 MHz band in the 320 MHz band based on an optimal PAPR of the L-LTF,
the 320 MHz band are composed of subcarriers having subcarrier indices from −512 to 511,
the third phase rotation value is [1 −1 −1 −1 1 −1 −1 −1 1 −1 −1 −1 1 −1 −1 −1],
a first 1 of the third phase rotation value is applied to subcarriers having subcarrier indices from −512 to −449,
a second −1 of the third phase rotation value is applied to subcarriers having subcarrier indices from −448 to −385,
a third −1 of the third phase rotation value is applied to subcarriers having subcarrier indices from −384 to −321,
a fourth −1 of the third phase rotation value is applied to subcarriers having subcarrier indices from −320 to −257,
a fifth 1 of the third phase rotation value is applied to subcarriers having subcarrier indices from −256 to −193,
a sixth −1 of the third phase rotation value is applied to subcarriers having subcarrier indices from −192 to −129,
a seventh −1 of the third phase rotation value is applied to subcarriers having subcarrier indices from −128 to −65,
an eighth −1 of the third phase rotation value is applied to subcarriers having subcarrier indices from −64 to −1,
a ninth 1 of the third phase rotation value is applied to subcarriers having subcarrier indices from 0 to 63,
a tenth −1 of the third phase rotation value is applied to subcarriers having subcarrier indices from 64 to 127,
an eleventh −1 of the third phase rotation value is applied to subcarriers having subcarrier indices from 128 to 191,
a twelfth −1 of the third phase rotation value is applied to subcarriers having subcarrier indices from 192 to 255,
a thirteenth 1 of the third phase rotation value is applied to subcarriers having subcarrier indices from 256 to 319,
a fourteenth −1 of the third phase rotation value is applied to subcarriers having subcarrier indices from 320 to 383,
a fifteenth −1 of the third phase rotation value is applied to subcarriers having subcarrier indices from 384 to 447, and
a sixteenth −1 of the third phase rotation value is applied to subcarriers having subcarrier indices from 448 to 511.

2. The method of claim 1, wherein:
the fourth phase rotation value is [1 j 1 j],
a first 1 of the fourth phase rotation value is applied to a first 80 MHz band of the 320 MHz,
a second j of the fourth phase rotation value is applied to a second 80 MHz band of the 320 MHz band,
a third 1 of the fourth phase rotation value is applied to a third 80 MHz band of the 320 MHz band, and
a fourth j of the fourth phase rotation value is applied to a fourth 80 MHz band of the 320 MHz band.

3. The method of claim 2, wherein:
the first phase rotation value is obtained based on a product of the third phase rotation value and the fourth phase rotation value, and
the first phase rotation value is [1 −1 −1 −1 j −j −j −j 1 −1 −1 −1 j −j −j −j].

4. The method of claim 1, wherein:
the fourth phase rotation value is [1 −j 1 −j],
a first 1 of the fourth phase rotation value is applied to a first 80 MHz band of the 320 MHz band,
a second −j of the fourth phase rotation value is applied to a second 80 MHz band of the 320 MHz band,
a third 1 of the fourth phase rotation value is applied to a third 80 MHz band of the 320 MHz band, and
a fourth −j of the fourth phase rotation value is applied to a fourth 80 MHz band of the 320 MHz band.

5. The method of claim 4, wherein:
the first phase rotation value is obtained based on a product of the third phase rotation value and the fourth phase rotation value, and
the first phase rotation value is [1 −1 −1 −1 −j j j j 1 −1 −1 −1 −j j j j].

6. The method of claim 1, wherein:
the second phase rotation value is obtained based on the third phase rotation value and the fifth phase rotation value, and
the fifth phase rotation value is a phase rotation value defined in units of an 80 MHz band in the 320 MHz band based on an optimal PAPR of the L-STF.

7. The method of claim 6, wherein:
the fifth phase rotation value is [1 j 1 j],
a first 1 of the fifth phase rotation value is applied to a first 80 MHz band of the 320 MHz band,
a second j of the fifth phase rotation value is applied to a second 80 MHz band of the 320 MHz band,
a third 1 of the fifth phase rotation value is applied to a third 80 MHz band of the 320 MHz band, and
a fourth j of the fifth phase rotation value is applied to a fourth 80 MHz band of the 320 MHz band.

8. The method of claim 7, wherein:
the second phase rotation value is obtained based on a product of the third phase rotation value and the fifth phase rotation value, and
the second phase rotation value is [1 −1 −1 −1 j −j −j −j 1 −1 −1 −1 j −j −j −j].

9. The method of claim 6, wherein:
the some band comprises all 20 MHz bands except a primary 20 MHz band,
the first phase rotation value is obtained based on a preamble puncturing pattern, and
the preamble puncturing pattern is a band pattern obtained by puncturing at least one 20 MHz band of all the 20 MHz bands except the primary 20 MHz band in the 320 MHz band.

10. A transmission apparatus transmitting a physical protocol data unit (PPDU) in a WLAN system, the transmission apparatus comprising:
a memory;
a transceiver; and
a processor operatively coupled to the memory and the transceiver, wherein the processor generates the PPDU, and
transmits the PPDU to a reception apparatus through a 320 MHz band having some bands punctured,
wherein the PPDU comprises a legacy preamble and an extreme high throughput (EHT) field,
the legacy preamble comprises a legacy-short training field (L-STF) and a legacy-long training field (L-LTF),
the legacy preamble is generated by applying a first phase rotation value or a second phase rotation value,
the first phase rotation value is obtained based on a third phase rotation value and a fourth phase rotation value,
the third phase rotation value is a phase rotation value obtained by repeating a phase rotation value defined for an 80 MHz band in an 802.11ax system,
the fourth phase rotation value is a phase rotation value defined in units of an 80 MHz band in the 320 MHz band based on an optimal PAPR of the L-LTF,
the 320 MHz band are composed of subcarriers having subcarrier indices from −512 to 511,
the third phase rotation value is [1 −1 −1 −1 1 −1 −1 −1 1 −1 −1 −1 1 −1 −1 −1],
a first 1 of the third phase rotation value is applied to subcarriers having subcarrier indices from −512 to −449,
a second −1 of the third phase rotation value is applied to subcarriers having subcarrier indices from −448 to −385,
a third −1 of the third phase rotation value is applied to subcarriers having subcarrier indices from −384 to −321,
a fourth −1 of the third phase rotation value is applied to subcarriers having subcarrier indices from −320 to −257,
a fifth 1 of the third phase rotation value is applied to subcarriers having subcarrier indices from −256 to −193,
a sixth −1 of the third phase rotation value is applied to subcarriers having subcarrier indices from −192 to −129,
a seventh −1 of the third phase rotation value is applied to subcarriers having subcarrier indices from −128 to −65,
an eighth −1 of the third phase rotation value is applied to subcarriers having subcarrier indices from −64 to −1,
a ninth 1 of the third phase rotation value is applied to subcarriers having subcarrier indices from 0 to 63,
a tenth −1 of the third phase rotation value is applied to subcarriers having subcarrier indices from 64 to 127,
an eleventh −1 of the third phase rotation value is applied to subcarriers having subcarrier indices from 128 to 191,
a twelfth −1 of the third phase rotation value is applied to subcarriers having subcarrier indices from 192 to 255,
a thirteenth 1 of the third phase rotation value is applied to subcarriers having subcarrier indices from 256 to 319,
a fourteenth −1 of the third phase rotation value is applied to subcarriers having subcarrier indices from 320 to 383,
a fifteenth −1 of the third phase rotation value is applied to subcarriers having subcarrier indices from 384 to 447, and
a sixteenth −1 of the third phase rotation value is applied to subcarriers having subcarrier indices from 448 to 511.

11. The transmission apparatus of claim 10, wherein:
the fourth phase rotation value is [1 j 1 j],
a first 1 of the fourth phase rotation value is applied to a first 80 MHz band of the 320 MHz,
a second j of the fourth phase rotation value is applied to a second 80 MHz band of the 320 MHz band,
a third 1 of the fourth phase rotation value is applied to a third 80 MHz band of the 320 MHz band, and
a fourth j of the fourth phase rotation value is applied to a fourth 80 MHz band of the 320 MHz band.

12. The transmission apparatus of claim 11, wherein:
the first phase rotation value is obtained based on a product of the third phase rotation value and the fourth phase rotation value, and
the first phase rotation value is [1 −1 −1 −1 j −j −j −j 1 −1 −1 −1 j −j −j −j].

13. A method of receiving a physical protocol data unit (PPDU) in a WLAN system, comprising:
receiving, by a reception apparatus, the PPDU through a 320 MHz band having some band punctured from a transmission apparatus; and
decoding, by the reception apparatus, the PPDU,
the PPDU comprises a legacy preamble and an extreme high throughput (EHT) field,
the legacy preamble comprises a legacy-short training field (L-STF) and a legacy-long training field (L-LTF),
the legacy preamble is generated by applying a first phase rotation value or a second phase rotation value,
the first phase rotation value is obtained based on a third phase rotation value and a fourth phase rotation value,
the third phase rotation value is a phase rotation value obtained by repeating a phase rotation value defined for an 80 MHz band in an 802.11ax system,
the fourth phase rotation value is a phase rotation value defined in units of an 80 MHz band in the 320 MHz band based on an optimal PAPR of the L-LTF,
the 320 MHz band are composed of subcarriers having subcarrier indices from −512 to 511,
the third phase rotation value is [1 −1 −1 −1 1 −1 −1 −1 1 −1 −1 −1 1 −1 −1 −1],
a first 1 of the third phase rotation value is applied to subcarriers having subcarrier indices from −512 to −449,
a second −1 of the third phase rotation value is applied to subcarriers having subcarrier indices from −448 to −385,
a third −1 of the third phase rotation value is applied to subcarriers having subcarrier indices from −384 to −321,
a fourth −1 of the third phase rotation value is applied to subcarriers having subcarrier indices from −320 to −257,
a fifth 1 of the third phase rotation value is applied to subcarriers having subcarrier indices from −256 to −193,
a sixth −1 of the third phase rotation value is applied to subcarriers having subcarrier indices from −192 to −129,
a seventh −1 of the third phase rotation value is applied to subcarriers having subcarrier indices from −128 to −65, an eighth −1 of the third phase rotation value is applied to subcarriers having subcarrier indices from −64 to −1, a ninth 1 of the third phase rotation value is applied to subcarriers having subcarrier indices from 0 to 63, a tenth −1 of the third phase rotation value is applied to subcarriers having subcarrier indices from 64 to 127, an eleventh −1 of the third phase rotation value is applied to subcarriers having subcarrier indices from 128 to 191, a twelfth −1 of the third phase rotation value is applied to subcarriers having subcarrier indices from 192 to 255, a thirteenth 1 of the third phase rotation value is applied to subcarriers having subcarrier indices from 256 to 319, a fourteenth −1 of the third phase rotation value is applied to subcarriers having subcarrier indices from 320 to 383, a fifteenth −1 of the third phase rotation value is applied to subcarriers having subcarrier indices from 384 to 447, and a sixteenth −1 of the third phase rotation value is applied to subcarriers having subcarrier indices from 448 to 511.

\* \* \* \* \*